US008281572B2

(12) United States Patent
Chi et al.

(10) Patent No.: US 8,281,572 B2
(45) Date of Patent: Oct. 9, 2012

(54) APPARATUS, SYSTEM, AND METHOD FOR REDUCING NO$_x$ EMISSIONS FROM AN ENGINE SYSTEM

(75) Inventors: John N. Chi, Columbus, IN (US); Joe V. Hill, Middlesbrough (GB); Joan M. Wills, Nashville, IN (US); Lisa A. Farrell, Columbus, IN (US); Timothy R. Frazier, Columbus, IN (US); Hasan Mohammed, Bloomington, IN (US)

(73) Assignee: Cummins IP, Inc., Minneapolis, MN (US)

( * ) Notice: Subject to any disclaimer, the term of this patent is extended or adjusted under 35 U.S.C. 154(b) by 632 days.

(21) Appl. No.: 12/433,767

(22) Filed: Apr. 30, 2009

(65) Prior Publication Data
US 2010/0024397 A1  Feb. 4, 2010

Related U.S. Application Data

(63) Continuation-in-part of application No. 12/433,730, filed on Apr. 30, 2009, and a continuation-in-part of application No. 12/112,500, filed on Apr. 30, 2008, now Pat. No. 8,109,079, and a continuation-in-part of application No. 12/112,622, filed on Apr. 30, 2008, now Pat. No. 8,074,445, and a continuation-in-part of application No. 12/112,678, filed on Apr. 30, 2008, now Pat. No. 8,181,450, and a continuation-in-part of application No. 12/112,795, filed on Apr. 30, 2008, now Pat. No. 8,161,730.

(51) Int. Cl.
*F01N 3/00* (2006.01)

(52) U.S. Cl. ............. 60/286; 60/274; 60/297; 60/301; 60/303

(58) Field of Classification Search ............... 60/274, 60/277, 285, 286, 297, 301, 303
See application file for complete search history.

(56) References Cited

U.S. PATENT DOCUMENTS
5,552,128 A    9/1996   Chang et al.
(Continued)

FOREIGN PATENT DOCUMENTS
EP    1129278 B1    8/2003
(Continued)

OTHER PUBLICATIONS
PCT/US2010/048502, International Search Report and Written Opinion, May 23, 2011.
(Continued)

*Primary Examiner* — Binh Q Tran
(74) *Attorney, Agent, or Firm* — Kunzler Law Group, PC

(57) ABSTRACT

Various embodiments of an apparatus, system, and method are disclosed for controlling NO$_x$ conversion in a selective catalytic reduction (SCR) system. According to one representative embodiment, an apparatus includes a duty cycle factor module and a NO$_x$ conversion mode selection module. The duty cycle factor module is configured to determine a duty cycle factor of an internal combustion engine where the duty cycle factor represents predicted driving conditions of a vehicle in which the internal combustion engine is housed. The NO$_x$ conversion mode selection module is configured to command NO$_x$ conversion in the SCR system according to a first NO$_x$ conversion mode if the duty cycle factor is within a duty cycle factor range and according to a second NO$_x$ conversion mode if the duty cycle factor is not within the duty cycle factor range.

20 Claims, 26 Drawing Sheets

U.S. PATENT DOCUMENTS

| | | | |
|---|---|---|---|
| 5,809,775 A | 9/1998 | Tarabulski et al. | |
| 6,109,024 A | 8/2000 | Kinugasa et al. | |
| 6,125,629 A * | 10/2000 | Patchett | 60/286 |
| 6,182,443 B1 * | 2/2001 | Jarvis et al. | 60/274 |
| 6,266,955 B1 | 7/2001 | Liang et al. | |
| 6,269,633 B1 | 8/2001 | van Nieuwstadt et al. | |
| 6,295,809 B1 | 10/2001 | Hammerle et al. | |
| 6,311,484 B1 | 11/2001 | Roth et al. | |
| 6,375,828 B2 | 4/2002 | Ando et al. | |
| 6,415,602 B1 | 7/2002 | Patchett et al. | |
| 6,446,430 B1 | 9/2002 | Roth et al. | |
| 6,546,720 B2 | 4/2003 | van Nieuwstadt | |
| 6,581,374 B2 | 6/2003 | Patchett et al. | |
| 6,662,553 B2 | 12/2003 | Patchett et al. | |
| 6,701,707 B1 | 3/2004 | Upadhyay et al. | |
| 6,713,030 B1 | 3/2004 | Chandler et al. | |
| 6,742,326 B2 | 6/2004 | Xu et al. | |
| 6,742,330 B2 | 6/2004 | Genderen | |
| 6,829,885 B2 | 12/2004 | Surnilla et al. | |
| 6,882,929 B2 | 4/2005 | Liang et al. | |
| 6,892,530 B2 | 5/2005 | Montreuil et al. | |
| 6,901,745 B2 | 6/2005 | Schnaibel et al. | |
| 6,928,806 B2 * | 8/2005 | Tennison et al. | 60/286 |
| 6,981,368 B2 | 1/2006 | van Nieuwstadt et al. | |
| 6,993,900 B2 | 2/2006 | Upadhyay et al. | |
| 7,017,389 B2 | 3/2006 | Gouma | |
| 7,063,642 B1 | 6/2006 | Hu et al. | |
| 7,093,427 B2 | 8/2006 | van Nieuwstadt et al. | |
| 7,113,835 B2 | 9/2006 | Boyden et al. | |
| 7,117,046 B2 | 10/2006 | Boyden et al. | |
| 7,150,145 B2 | 12/2006 | Patchett et al. | |
| 7,168,243 B2 | 1/2007 | Endicott et al. | |
| 7,178,328 B2 | 2/2007 | Solbrig | |
| 7,204,081 B2 | 4/2007 | Yasui et al. | |
| 7,213,395 B2 | 5/2007 | Hu et al. | |
| 7,263,825 B1 | 9/2007 | Wills et al. | |
| 7,320,781 B2 | 1/2008 | Lambert et al. | |
| 7,332,135 B2 | 2/2008 | Gandhi et al. | |
| 7,485,272 B2 | 2/2009 | Driscoll et al. | |
| 7,603,846 B2 | 10/2009 | Lueders et al. | |
| 7,628,009 B2 * | 12/2009 | Hu et al. | 60/285 |
| 7,631,490 B2 * | 12/2009 | Colignon | 60/286 |
| 7,650,746 B2 | 1/2010 | Hu et al. | |
| 7,685,813 B2 * | 3/2010 | McCarthy, Jr. | 60/295 |
| 7,802,419 B2 | 9/2010 | Doring | |
| 7,832,200 B2 | 11/2010 | Kesse et al. | |
| 7,892,508 B2 | 2/2011 | Katoh | |
| 7,997,070 B2 | 8/2011 | Yasui et al. | |
| 8,020,374 B2 | 9/2011 | Walz et al. | |
| 8,061,126 B2 | 11/2011 | Gady et al. | |
| 8,074,445 B2 | 12/2011 | Ofoli et al. | |
| 2002/0044897 A1 | 4/2002 | Kakwani et al. | |
| 2003/0177766 A1 | 9/2003 | Wang et al. | |
| 2003/0182935 A1 | 10/2003 | Kawai et al. | |
| 2004/0098968 A1 | 5/2004 | van Nieuwstadt et al. | |
| 2004/0112046 A1 | 6/2004 | Tumati et al. | |
| 2005/0282285 A1 | 12/2005 | Radhamohan et al. | |
| 2006/0086080 A1 | 4/2006 | Katogi et al. | |
| 2006/0130458 A1 | 6/2006 | Solbrig | |
| 2006/0155486 A1 | 7/2006 | Walsh et al. | |
| 2006/0212140 A1 | 9/2006 | Brackney | |
| 2007/0044456 A1 | 3/2007 | Upadhyay et al. | |
| 2007/0137184 A1 | 6/2007 | Patchett et al. | |
| 2007/0163244 A1 | 7/2007 | Federle | |
| 2007/0214777 A1 | 9/2007 | Allansson et al. | |
| 2007/0295003 A1 | 12/2007 | Dingle et al. | |
| 2008/0022658 A1 | 1/2008 | Viola et al. | |
| 2008/0022659 A1 | 1/2008 | Viola et al. | |
| 2008/0060348 A1 | 3/2008 | Robel et al. | |
| 2008/0066455 A1 | 3/2008 | Viola | |
| 2008/0250774 A1 | 10/2008 | Solbrig | |
| 2008/0250778 A1 | 10/2008 | Solbrig | |
| 2008/0295499 A1 | 12/2008 | Driscoll et al. | |
| 2009/0272099 A1 | 11/2009 | Garimella et al. | |
| 2009/0272101 A1 | 11/2009 | Wills et al. | |
| 2009/0272104 A1 | 11/2009 | Garimella et al. | |
| 2009/0272105 A1 | 11/2009 | Chi et al. | |
| 2009/0301066 A1 | 12/2009 | Sindano et al. | |
| 2010/0024390 A1 | 2/2010 | Wills et al. | |
| 2010/0024393 A1 | 2/2010 | Chi et al. | |
| 2010/0028230 A1 | 2/2010 | Gady et al. | |
| 2010/0229531 A1 | 9/2010 | Chi et al. | |
| 2010/0242440 A1 | 9/2010 | Garimella et al. | |
| 2010/0275583 A1 | 11/2010 | Farrell et al. | |
| 2011/0058999 A1 | 3/2011 | Ettireddy et al. | |
| 2011/0262329 A1 | 10/2011 | Ofoli et al. | |

FOREIGN PATENT DOCUMENTS

| | | |
|---|---|---|
| EP | 1338562 A1 | 8/2003 |
| EP | 1083979 B1 | 6/2004 |
| EP | 1431533 | 6/2004 |
| EP | 1339955 B1 | 8/2005 |
| EP | 1609977 A2 | 12/2005 |
| EP | 1672192 A1 | 6/2006 |
| EP | 1712764 A1 | 10/2006 |
| JP | 10118492 A | 5/1998 |
| JP | 2002-327617 | 11/2002 |
| JP | 2004100700 | 4/2004 |
| JP | 2007255367 | 10/2007 |
| KR | 10-2001-0043138 | 5/2001 |
| KR | 1020030034139 | 5/2003 |
| KR | 1020080030163 A | 4/2008 |
| KR | 1020100061145 | 11/2008 |
| WO | 99/55446 | 11/1999 |
| WO | 0214657 A1 | 2/2002 |
| WO | 04000443 A1 | 12/2003 |
| WO | 2006000877 A3 | 1/2006 |
| WO | 2007014649 A1 | 2/2007 |
| WO | 2007-066502 A1 | 6/2007 |
| WO | 2008009940 A2 | 1/2008 |

OTHER PUBLICATIONS

PCT/US2009/042423 ISR and Written Opinion, Nov. 27, 2009.
D.A. Pena, et al. "Identification of Surface Species on Titania-Supported Manganese, Chromium, and Copper Oxide Low-Temperature SCR Catalysts": Journal of Physical Chemistry B, 108 (2004) 9927-9936.
PCT/US2009/042409, International Search Report and Written Opinion, Nov. 25, 2009.
P.R. Ettireddy et al. "Surface characterization studies of TiO2 supported manganese oxide catalysts for low temperature SCR of NO with NH3" Applied Catalysis B, 76 (2007).
Control of a Urea SCR Catalytic Converter System for a Mobile Heavy Duty Diesel Engine—C.M. Schar, C.H. Onder, H.P. Geering and M. Elsener—SAE 2003-01-0776, Mar. 3-6, 2003.
PCT/US2009/067023, International Search Report and Written Opinion, Jul. 13, 2010.
PCT/US2009/067020, International Search Report and Written Opinion, Jul. 13, 2010.
PCT/US2009/042419, International Search Report and Written Opinion, Jan. 27, 2010.
PCT/US2009/042406 International Search Report and Written Opinion, Dec. 18, 2009.
PCT/US2009/042412 International Search Report and Written Opinion, Dec. 16, 2009.
PCT/US2009/042321 International Search Report and Written Opinion, Dec. 14, 2009.
PCT/US2009/042335 International Search Report and Written Opinion, Dec. 14, 2009.
PCT/US2009/042330 International Search Report and Written Opinion, Dec. 17, 2009.
PCT/US2009/042340 International Search Report and Written Opinion, Dec. 16, 2009.
U.S. Appl. No. 12/433,600 Notice of Allowance Nov. 14, 2011.
U.S. Appl. No. 12/112,500 Office Action Apr. 15, 2011.
U.S. Appl. No. 12/112,500 Notice of Allowance Sep. 29, 2011.
U.S. Appl. No. 12/112,622 Office Action Mar. 3, 2011.
U.S. Appl. No. 12/112,622 Notice of Allowance Aug. 5, 2011.
U.S. Appl. No. 12/112,678 Office Action Feb. 7, 2011.
U.S. Appl. No. 12/112,678 Final Office Action Jul. 22, 2011.
U.S. Appl. No. 12/112,678 Office Action Sep. 30, 2011.
U.S. Appl. No. 12/112,795 Office Action Sep. 20, 2011.
U.S. Appl. No. 12/433,705 Office Action Nov. 8, 2011.

U.S. Appl. No. 12/433,586 Office Action Oct. 24, 2011.
U.S. Appl. No. 12/433,730 Office Action Oct. 7, 2011.
U.S. Appl. No. 12/112,678 Notice of Allowance Feb. 2, 2012.
U.S. Appl. No. 12/433,586 Office Action Mar. 20, 2012.
U.S. Appl. No. 12/632,628 Office Action Apr. 30, 2012.
U.S. Appl. No. 12/112,795 Notice of Allowance Mar. 2, 2012.
U.S. Appl. No. 12/433,705 Notice of Allowance Apr. 2, 2012.
PCT/US2011/033767 International Search Report and Written Opinion, Feb. 8, 2012.

* cited by examiner

APPARATUS, SYSTEM, AND METHOD FOR REDUCING $NO_x$ EMISSIONS FROM AN ENGINE SYSTEM

CROSS-REFERENCE TO RELATED APPLICATIONS

This application is a continuation-in-part application of U.S. patent application Ser. No. 12/112,500, filed Apr. 30, 2008 now U.S. Pat. No. 8,109,079, U.S. patent application Ser. No. 12/112,622, filed Apr. 30, 2008 now U.S. Pat. No. 8,074,445, U.S. patent application Ser. No. 12/112,678, filed Apr. 30, 2008 now U.S. Pat. No. 8,181,450, U.S. patent application Ser. No. 12/112,795, filed Apr. 30, 2008 now U.S. Pat. No. 8,161,730, and U.S. patent application Ser. No. 12/433,730, filed Apr. 30, 2009. These applications are incorporated herein by reference

FIELD

This disclosure relates to controlling nitrogen oxides ($NO_x$) emissions from an internal combustion engine system, and more particularly to apparatus, systems and methods for controlling $NO_x$ emissions using engine controls and an exhaust aftertreatment system.

BACKGROUND

Emissions regulations for internal combustion engines have become more stringent over recent years. The regulated emissions of $NO_x$ and particulates from internal combustion engines are low enough that in many cases the emissions levels cannot be met with improved combustion technologies. Therefore, the use of exhaust aftertreatment systems on engines to reduce harmful exhaust emissions is increasing. For reducing $NO_x$ emissions, $NO_x$ reduction catalysts, including selective catalytic reduction (SCR) systems, are utilized to convert $NO_x$ (NO and $NO_2$ in some fraction) to $N_2$ and other compounds. SCR systems utilize a reductant, typically ammonia, to reduce the $NO_x$. Currently available SCR systems can produce high $NO_x$ conversion rates allowing the combustion technologies to focus on power and efficiency. However, currently available SCR systems also suffer from a few drawbacks.

SCR systems use ammonia to reduce $NO_x$ in the exhaust stream. When just the proper amount of ammonia is available at the SCR catalyst under proper conditions, the ammonia is utilized to reduce $NO_x$. However, if the reduction reaction rate is too slow, or if there is excess ammonia in the exhaust, ammonia can slip out the exhaust pipe. Ammonia is an extreme irritant and an undesirable emission. Accordingly, slips of even a few tens of ppm are problematic. Additionally, due to the undesirability of handling pure ammonia, many systems utilize an alternate compound such as urea, that vaporizes and decomposes to ammonia in the exhaust stream. Presently available SCR systems treat injected urea as injected ammonia, and do not account for the vaporization and hydrolysis of urea to component compounds such as ammonia and isocyanic acid. As a result, the urea can decompose to ammonia downstream of the SCR catalyst, which can cause ammonia slip and may result in less ammonia being available for $NO_x$ reduction than the control mechanism estimates, resulting in higher $NO_x$ emissions at the tailpipe.

Ammonia slippage also poses a problem for $NO_x$ sensor technology, which has been found to exhibit ammonia cross-sensitivity. Thus ammonia slippage could be erroneously interpreted as $NO_x$ emission, thereby calling for increased reductant dosing via a feedback control loop. The resulting positive feedback in that case would have the undesirable effect of further increasing rather than decreasing the ammonia slippage.

SCR systems that utilize urea dosing to generate ammonia depend upon the real-time delivery of urea to the SCR catalyst as engine $NO_x$ emissions emerge. Urea dosers have relatively slow physical dynamics compared to other chemical injectors such as hydrocarbon injectors. Therefore, urea doser dynamics can substantially affect an SCR controls system.

Some currently available SCR systems account for the dynamics of the urea dosing and the generally fast transient nature of the internal combustion engine by utilizing the inherent ammonia storage capacity of many SCR catalyst formulations. One currently available method introduces a time delay at the beginning of an engine $NO_x$ spike before urea dosing begins (or ramps up), and a time delay after the $NO_x$ spike before urea dosing ends (or ramps down). Ordinarily, an engine $NO_x$ spike will cause a temperature increase in the exhaust gas and SCR catalyst, which may result in the release of stored ammonia on the catalyst. This is especially true when engine power output is used as a substitute for directly estimating engine $NO_x$ emissions. The ammonia release provides ammonia for reducing engine out $NO_x$ while delaying urea injection prevents excess ammonia from slipping out the exhaust. On the $NO_x$ decrease, normally the temperature of the engine exhaust and SCR catalyst decrease, and therefore continued urea injection (the delay before ramping down urea injection) provides ammonia to store on the SCR catalyst and recharge the catalyst.

In many ordinary circumstances, the time delay method causes desirable results in the SCR catalyst. However, in some cases the time delay method can produce undesirable results and even responses that are opposite from an optimal response. For example, a decrease in EGR fraction for any reason causes an engine out $NO_x$ spike with a decrease in exhaust temperature. In a time delay system utilizing engine-out power as a substitute for $NO_x$ emissions, the change will likely be ignored and a standard amount of injected urea will cause an increase in $NO_x$ emissions. In a time delay system that recognizes the engine out $NO_x$ spike, the system delays injecting ammonia-creating urea. Because the temperature on the SCR catalyst is relatively lower, the amount of $NO_x$-reducing ammonia released from the catalyst is reduced, which results in a $NO_x$ emissions increase. At the end of the $NO_x$ spike event, the exhaust temperature increases (from restoration of the desired EGR fraction) while the $NO_x$ emissions decreases. The SCR catalyst ejects ammonia from the reduced storage capacity while the urea injector continues to add ammonia to the system without $NO_x$ available for reduction. Therefore, the system can slip significant amounts of ammonia on the down cycle.

Other currently available systems determine whether the SCR catalyst is at an ammonia storing (adsorption) or ammonia ejecting (desorption) temperature. When the SCR catalyst is storing ammonia, the system injects urea until the catalyst is full. When the SCR catalyst is ejecting ammonia, the system halts injection and allows stored ammonia to release and reduce $NO_x$. Presently available systems tracking the SCR catalyst temperature suffer from a few drawbacks. For example, the amount of ammonia stored on the SCR catalyst varies with temperature. However, presently available systems assume a storage amount below a specified temperature, and zero storage above the specified temperature. Therefore, the controls may toggle significantly around the specified temperature, significantly overestimate ammonia storage capacity just below the specified temperature, and significantly underestimate ammonia storage capacity just above the specified temperature.

Several conditions, including the operation of a particulate matter filter, may negatively affect the operation of the SCR catalyst of an SCR system. For example, operation of a particulate matter filter may lead to fluctuations in the NO to $NO_2$ ratio entering the SCR catalyst, sulphur fouling of the SCR catalyst, and hydrocarbon accumulation on the SCR catalyst, which can cause a drop in the $NO_x$ conversion efficiency and ammonia storage capacity of the SCR catalyst. These conditions are typically reversible by running the engine at a proper operating condition. The operation of a particulate matter filter (e.g., particulate matter filter regeneration events) may also cause thermal degradation of the SCR catalyst. Thermal degradation of the SCR catalyst can lead to a drop in both $NO_x$ conversion efficiency and ammonia storage capacity that is not reversible.

Some conventional engine system controllers do not account for the degradation of the SCR catalyst. Therefore, if the SCR catalyst is degraded, the $NO_x$ conversion rate commanded by the controller may be too conservative or too aggressive for a given application. Further, for conventional engine system controllers that account for the degradation of the SCR catalyst, such controllers may not account for the effect of degradation on both $NO_x$ conversion rates and ammonia storage capacity.

Other conventional SCR systems may utilize a "normalized stoichiometric ratio" (NSR) to determine baseline urea injection, but in so doing, they do not account for variances in the $NO_x$ composition and $NH_3$ to isocyanic acid ratio of the urea when determining the NSR. Further, such systems do not account for the incomplete vaporization and hydrolysis of urea that occurs in many systems and may therefore not inject sufficient urea to reduce $NO_x$ and/or provide the desired ammonia for storage.

Also, many known SCR systems do not utilize an ammonia oxidation (AMOX) catalyst downstream of the SCR catalyst to convert at least some ammonia slipping from the SCR catalyst to $N_2$ and other less harmful compounds. For those conventional SCR systems that do employ an AMOX catalyst, the operating conditions and conversion capability of the AMOX catalyst are not factored into the operations of the SCR systems.

The performance of aftertreatment systems are dependent upon the physical and chemical properties of the exhaust gas delivered from an internal combustion engine. The physical and chemical properties of exhaust gas are at least partially based on the engine control system's control of combustion, air-handling, and fuel. In typical systems, the engine control system, and thus the properties of exhaust delivered by an engine, does not consider the performance of the aftertreatment system in controlling the properties of the exhaust delivered by the engine. Rather, exhaust properties are controlled by the engine's control system based upon considerations exclusive of aftertreatment system performance. Accordingly, the components of conventional aftertreatment systems are configured to react to the physical and chemical properties of the exhaust gas according to desired exhaust emission targets. Often, the reactionary nature of conventional aftertreatment systems reduces the efficiency and performance of the aftertreatment system because of the transitory nature of combustion engines and inherent delays associated with broad post-combustion adjustment of the properties of the aftertreatment systems.

For example, SCR systems generate ammonia to reduce the $NO_x$. When just the proper amount of ammonia is available at the SCR catalyst under the proper conditions, the ammonia is utilized to reduce $NO_x$. However, if the reduction reaction rate is too slow, or if there is excess ammonia in the exhaust, ammonia can slip out the exhaust pipe. Further, conventional SCR systems that utilize injected urea to produce ammonia must account for potential delays in the vaporization and hydrolysis of urea to ammonia. Additionally, SCR systems that utilize urea dosing to generate ammonia depend upon the real-time delivery of urea to the SCR catalyst as engine $NO_x$ emissions emerge. Urea dosers have relatively slow physical dynamics compared to other chemical injectors such as hydrocarbon injectors. Therefore, post-combustion adjustments in urea dosing can be delayed due to the urea doser dynamics, e.g., the degradation of the urea doser over time, of conventional SCR controls systems.

The inherent reactionary delays of conventional exhaust aftertreatment control systems are accentuated by transient and unpredicted exhaust properties associated with exhaust aftertreatment systems that do not control the exhaust properties delivered by the engine.

SUMMARY

The subject matter of the present application has been developed in response to the present state of the art, and in particular, in response to the problems and needs in the art that have not yet been fully solved by currently available exhaust aftertreatment systems. Accordingly, the subject matter of the present application has been developed to provide apparatus, systems, and methods for reducing $NO_x$ emissions by an SCR system that overcomes at least some shortcomings of the prior art aftertreatment systems. For example, in one embodiment, an engine system includes an exhaust aftertreatment control system that (i) manipulates the properties of the aftertreatment system to maximize the amount of $NO_x$ reduced by the SCR system for a first engine duty-cycle type; (ii) manipulates the properties of engine exhaust at least partially through the engine's control system to increase the efficiency and performance of the exhaust aftertreatment system for a second engine duty-cycle type; and (iii) manipulates both the properties of the exhaust aftertreatment system and engine output exhaust to maximize the amount of $NO_x$ reduced by the SCR system while maintaining a desired efficiency and performance of the exhaust aftertreatment system for a third engine duty-cycle type.

According to one representative embodiment, an apparatus for controlling $NO_x$ conversion in a selective catalytic reduction (SCR) system of an exhaust aftertreatment system coupled to an internal combustion engine includes a duty cycle factor module and a $NO_x$ conversion mode selection module. The duty cycle factor module is configured to determine a duty cycle factor of the internal combustion engine where the duty cycle factor represents predicted driving conditions of a vehicle in which the internal combustion engine is housed. The $NO_x$ conversion mode selection module is configured to command $NO_x$ conversion in the SCR system according to a first $NO_x$ conversion mode if the duty cycle factor is within a duty cycle factor range and according to a second $NO_x$ conversion mode if the duty cycle factor is not within the duty cycle factor range.

In some implementations, the first $NO_x$ conversion mode is a maximum $NO_x$ conversion mode and the second $NO_x$ conversion mode is a reference tracking $NO_x$ conversion mode. The predicted driving conditions can include city driving conditions, highway driving conditions, and a combination of city and highway driving conditions. The duty cycle factor range can include duty cycle factors representing predominantly city driving conditions. Alternatively, the duty cycle factor range can include duty cycle factors representing combination city and highway driving conditions.

According to certain implementations, the maximum $NO_x$ conversion mode includes recalibrating the aftertreatment system in response to engine exhaust properties generated by the internal combustion engine. The reference tracking $NO_x$ conversion mode can include recalibrating the internal combustion engine in response to requests from the exhaust aftertreatment system.

The maximum $NO_x$ conversion mode can include determining a reductant dosing command based at least partially on outputs from $NH_3$ storage compensation controls, nominal feedforward controls, and feedback controls. The output from the $NH_3$ storage compensation controls can be based at least partially on outputs from a urea hydrolysis model and an ammonia storage model. The output from the nominal feedforward controls can be based at least partially on outputs from a commanded $NO_x$ reduction target model, an SCR bed temperature model, and an SCR catalyst degradation model. The output from the commanded $NO_x$ reduction target model can be based at least partially on outputs from an SCR maximum efficiency model and a desired $NO_x$ reduction efficiency model. The output from the SCR maximum efficiency model can be based at least partially on an output from an ammonia oxidation catalyst (AMOX) capability model. The output from the ammonia oxidation catalyst capability model can be based at least partially on an AMOX catalyst bed temperature model and an AMOX catalyst degradation model. Further, the output from the feedback controls can be based at least partially on an output from a $NO_x$ signal correction model where the output from the $NO_x$ signal correction model is based at least partially on an AMOX capability model.

In some implementations, the maximum $NO_x$ conversion mode includes determining a reductant dosing command based at least partially on outputs from an SCR catalyst degradation module, an AMOX catalyst degradation module, and a urea doser degradation module. The SCR catalyst, AMOX catalyst, and urea doser degradation modules can be decentralized and independent modules. In certain implementations, converting $NO_x$ according to the maximum $NO_x$ conversion mode includes reducing a maximum possible amount of $NO_x$ from an exhaust gas stream. In certain implementations, converting $NO_x$ according to the reference tracking $NO_x$ conversion mode includes reducing a selectively variable amount of $NO_x$ from an exhaust gas stream less than the maximum possible amount of $NO_x$. The reference tracking $NO_x$ conversion mode can include at least one of regulating an engine air intake flow rate, a fuel injection event, an exhaust gas recirculation flow rate, a turbine exhaust flow rate, and compressor exhaust flow rate to achieve a desired engine output exhaust temperature.

In one implementation, the duty cycle factor module determines the duty cycle factor based at least partially on at least one of driving condition historical trends, user input, predetermined driving conditions, and current market values of fuel and reductant.

According to yet another embodiment, a method for controlling $NO_x$ conversion in a selective catalytic reduction (SCR) system of an exhaust aftertreatment system coupled to an internal combustion engine includes determining a duty cycle factor based at least partially on whether the engine will be operating under highway driving conditions, city driving conditions, or a combination of highway and city driving conditions. The method also includes comparing the duty cycle factor to a predetermined duty cycle factor range corresponding to highway driving conditions. Additionally, the method includes controlling $NO_x$ conversion in the SCR system according to a reference tracking $NO_x$ conversion mode if the duty cycle falls within the predetermined duty cycle factor range and controlling $NO_x$ conversion in the SCR system according to an optimal $NO_x$ conversion mode if the duty cycle does not fall within the predetermined duty cycle factor range. In some implementations of the method, the predetermined duty cycle factor range represents a range between approximately 80% and 100% highway driving conditions.

In another representative embodiment, an engine system includes an internal combustion engine generating an exhaust gas stream, a selective catalytic reduction (SCR) catalyst that reduces $NO_x$ emissions in the exhaust gas stream in the presence of a reductant, and a reductant injector that injects reductant into the exhaust gas stream upstream of the SCR catalyst. The system also includes a controller that includes a duty cycle factor module and a $NO_x$ conversion mode selection module. The duty cycle factor module is configured to determine a duty cycle factor of the internal combustion engine where the duty cycle factor represents predicted driving conditions of a vehicle in which the internal combustion engine is housed. The $NO_x$ conversion mode selection module is configured to command $NO_x$ conversion in the SCR system according to a first $NO_x$ conversion mode if the duty cycle factor is within a duty cycle factor range and according to a second $NO_x$ conversion mode if the duty cycle factor is not within the duty cycle factor range. In some implementations, an ammonia sensor is embedded within the SCR catalyst where the ammonia sensor is configured to detect an amount of ammonia stored on the SCR catalyst.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the subject matter of the present disclosure may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments. These features and advantages will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Figure 1:
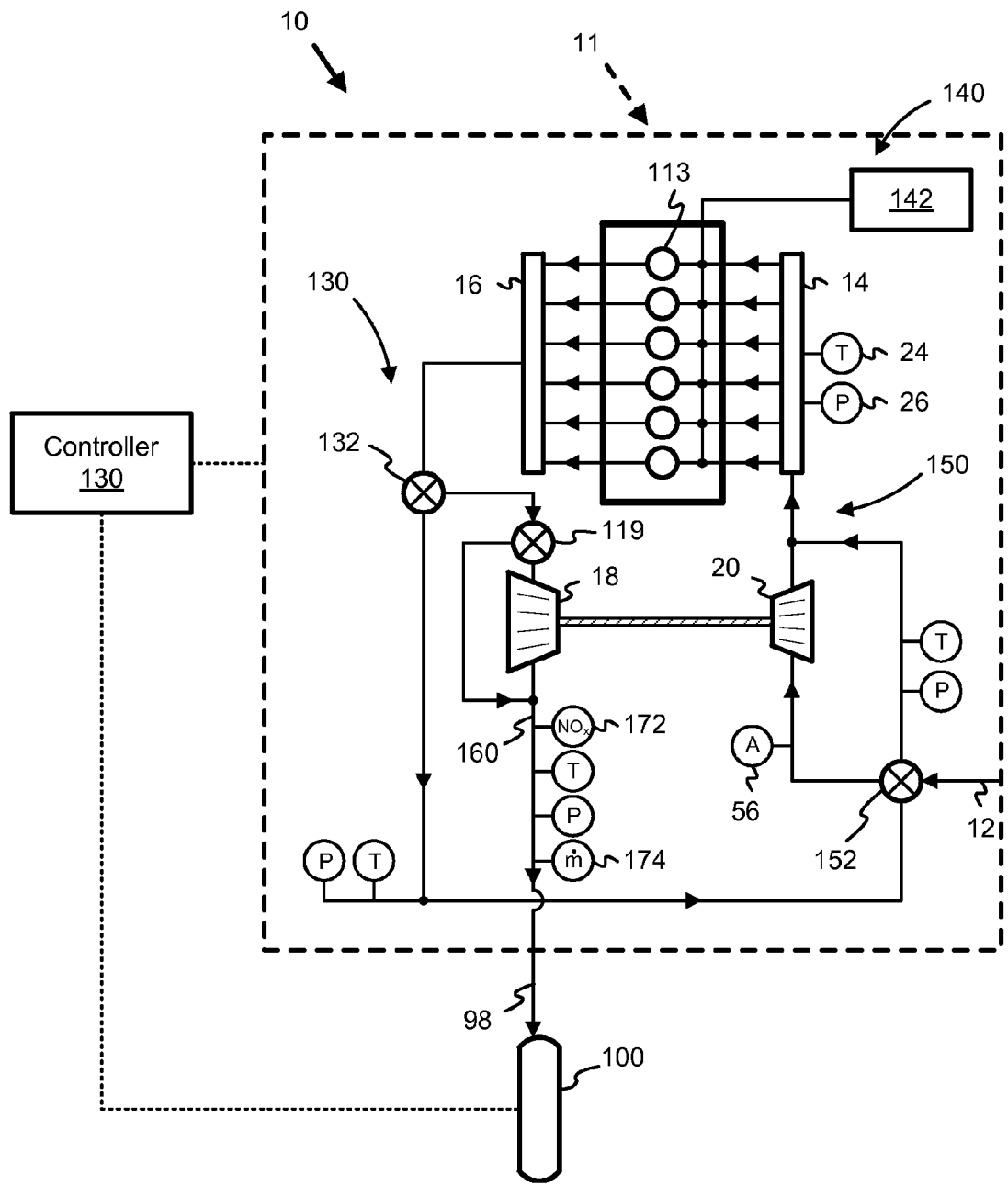
FIG. 1 is a schematic block diagram of an internal combustion engine having an exhaust aftertreatment system according to one representative embodiment.

FIG. 1 depicts one embodiment of an internal combustion engine system 10. The main components of the engine system 10 include an internal combustion engine 11 and an exhaust gas aftertreatment system 100 coupled to the engine. The internal combustion engine 11 can be a compression ignited internal combustion engine, such as a diesel fueled engine, or a spark-ignited internal combustion engine, such as a gasoline fueled engine operated lean. The engine system 10 further includes an air inlet 12, intake manifold 14, exhaust manifold 16, turbocharger turbine 18, turbocharger compressor 20, temperature sensors (e.g., temperature sensor 24), pressure sensors (e.g., pressure sensor 26), and air-flow sensor 56. The air inlet 12 is vented to the atmosphere and connected to an inlet of the intake manifold 14 to enable air to enter the intake manifold. The intake manifold 14 includes an outlet operatively coupled to compression chambers of the internal combustion engine 11 for introducing air into the compression chambers.

Within the internal combustion engine 11, the air from the atmosphere is combined with fuel to power the engine. Combustion of the fuel and air produces exhaust gas that is operatively vented to the exhaust manifold 16. From the exhaust manifold 16, a portion of the exhaust gas may be used to power the turbocharger turbine 18. The turbine 18 drives the turbocharger compressor 20, which may compress at least some of the air entering the air inlet 12 before directing it to the intake manifold 14 and into the compression chambers of the engine 11.

The exhaust gas aftertreatment system 100 is coupled to the exhaust manifold 16 of the engine 11. At least a portion of the exhaust gas exiting the exhaust manifold 16 can pass through the exhaust aftertreatment system 100. In certain implementations, the engine system 10 includes an exhaust gas recirculation (EGR) valve (not shown) configured to open to allow a portion of the exhaust gas to recirculate back into the compression chambers for altering the combustion properties of the engine 11.

Figure 2:
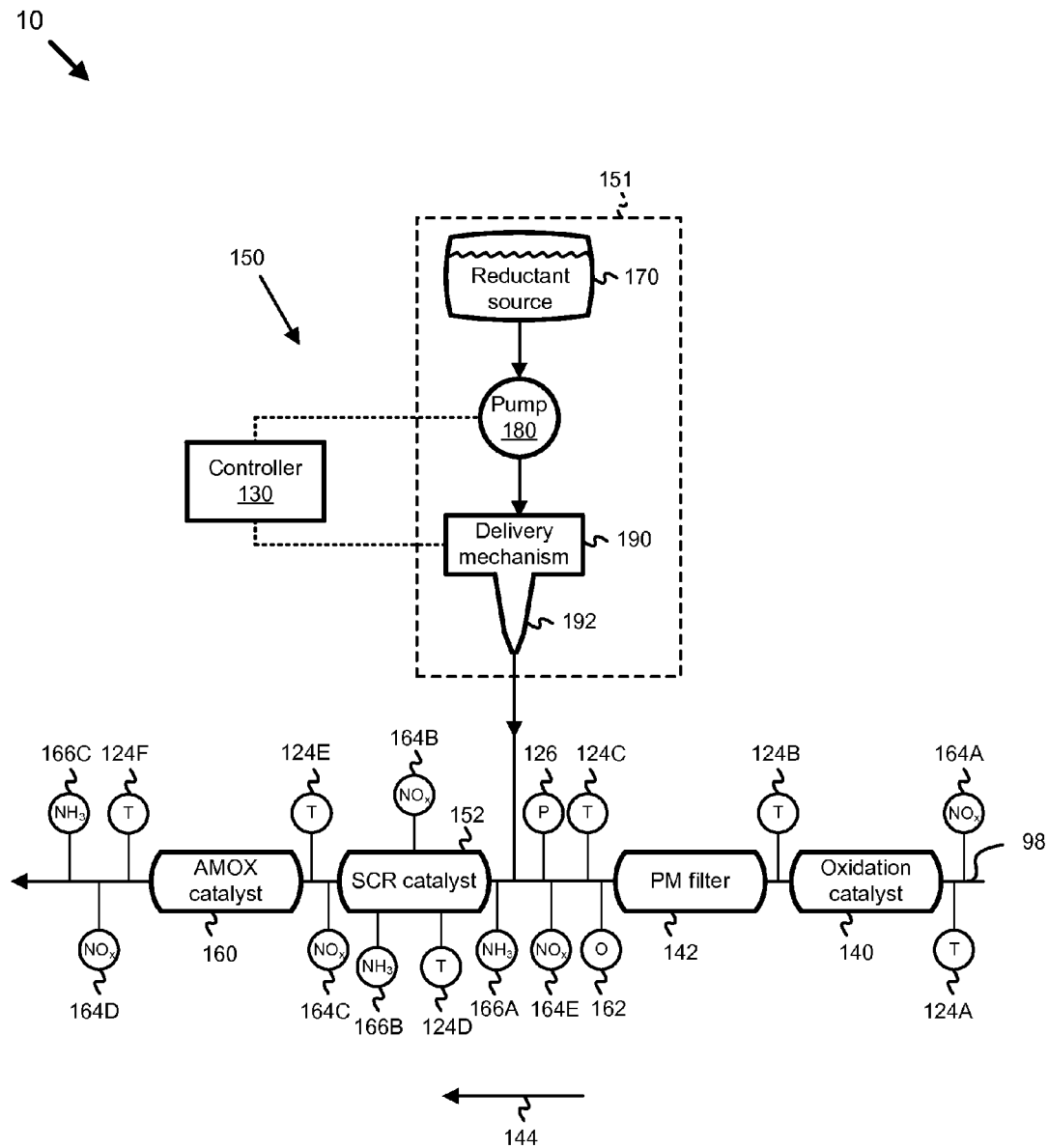
FIG. 2 is a schematic block diagram of the exhaust aftertreatment system of FIG. 1 according to one representative embodiment.

Generally, the exhaust gas aftertreatment system 100 is configured to remove various chemical compound and particulate emissions present in the exhaust gas received from the exhaust manifold 16 and not recirculated back into the engine 11. As illustrated in FIG. 2, the exhaust gas aftertreatment system 100 includes controller 130, oxidation catalyst 140, particulate matter (PM) filter 142, SCR system 150 having an SCR catalyst 152, and ammonia oxidation (AMOX) catalyst 160. In an exhaust flow direction, indicated by directional arrow 144, exhaust may flow from the exhaust manifold 16, through the oxidation catalyst 140, through the particulate filter 142, through the SCR catalyst 152, through the AMOX catalyst 160, and then be expelled into the atmosphere. In other words, the particulate filter 142 is positioned downstream of the oxidation catalyst 140, the SCR catalyst 152 is positioned downstream of the particulate filter 142, and the AMOX catalyst 160 is positioned downstream of the SCR catalyst 152. Generally, exhaust gas treated in the exhaust gas aftertreatment system 100 and released into the atmosphere consequently contains significantly fewer pollutants, such as diesel particulate matter, $NO_x$, hydrocarbons, such as carbon monoxide and carbon dioxide, than untreated exhaust gas.

The oxidation catalyst 140 can be any of various flow-through, diesel oxidation catalysts (DOC) known in the art. Generally, the oxidation catalyst 140 is configured to oxidize at least some particulate matter, e.g., the soluble organic fraction of soot, in the exhaust and reduce unburned hydrocarbons and CO in the exhaust to less environmentally harmful compounds. For example, the oxidation catalyst 140 may sufficiently reduce the hydrocarbon and CO concentrations in the exhaust to meet the requisite emissions standards.

The particulate filter 142 can be any of various particulate filters known in the art configured to reduce particulate matter concentrations, e.g., soot and ash, in the exhaust gas to meet requisite emission standards. The particulate filter 142 can be electrically coupled to a controller, such as controller 130, that controls various characteristics of the particulate filter, such as, for example, the timing and duration of filter regeneration events. In some implementations, the particulate filter 142 and associated control system is similar to, or the same as, the respective particulate filters and control systems described in U.S. patent application Ser. Nos. 11/227,320; 11/227,403; 11/227,857; and 11/301,998, which are incorporated herein by reference.

The SCR system 150 includes a reductant delivery system 151 that includes a reductant source 170, pump 180 and delivery mechanism 190. The reductant source 170 can be a container or tank capable of retaining a reductant, such as, for example, ammonia ($NH_3$), urea, diesel fuel, or diesel oil. The reductant source 170 is in reductant supplying communication with the pump 180, which is configured to pump reductant from the reductant source to the delivery mechanism 190. The delivery mechanism 190 can include a reductant injector schematically shown at 192 positioned upstream of the SCR catalyst 152. The injector is selectively controllable to inject reductant directly into the exhaust gas stream prior to entering the SCR catalyst 152. In some embodiments, the reductant can either be ammonia or urea, which decomposes to produce ammonia. As will be described in more detail below, in these embodiments, the ammonia reacts with $NO_x$ in the presence of the SCR catalyst 152 to reduce the $NO_x$ to less harmful emissions, such as $N_2$ and $H_2O$. The SCR catalyst 152 can be any of various catalysts known in the art. For example, in some implementations, the SCR catalyst 152 is a vanadium-based catalyst, and in other implementations, the SCR catalyst is a zeolite-based catalyst, such as a Cu-Zeolite or a Fe-Zeolite catalyst. In one representative embodiment, the reductant is aqueous urea and the SCR catalyst 152 is a zeolite-based catalyst.

The AMOX catalyst 160 can be any of various flow-through catalysts configured to react with ammonia to produce mainly nitrogen. Generally, the AMOX catalyst 160 is utilized to remove ammonia that has slipped through or exited the SCR catalyst 152 without reacting with $NO_x$ in the exhaust. In certain instances, the system 10 can be operable with or without an AMOX catalyst. Further, although the AMOX catalyst 160 is shown as a separate unit from the SCR catalyst 152, in some implementations, the AMOX catalyst can be integrated with the SCR catalyst, e.g., the AMOX catalyst and the SCR catalyst can be located within the same housing.

The exhaust aftertreatment system 100 includes various sensors, such as temperature sensors 124A-F, pressure sensor 126, oxygen sensor 162, $NO_x$ sensors 164A-D, $NH_3$ sensors 166A-C, dual ammonia/$NO_x$ sensors, and the like, that are disposed throughout the exhaust gas aftertreatment system. The various sensors may be in electrical communication with the controller 130 to monitor operating conditions and control the engine system 10, including the exhaust aftertreatment system 100. In the illustrated embodiment, the exhaust gas aftertreatment system 100 includes $NO_x$ sensor 164A upstream of the oxidation catalyst 140, $NO_x$ sensor 164B coupled to a central portion of and/or embedded within the SCR catalyst 152, $NO_x$ sensor 164C intermediate the SCR catalyst and AMOX catalyst 160, $NO_x$ sensor 164D downstream of the AMOX catalyst, and $NO_x$ sensor 164E downstream of the PM filter 142 and upstream of the reductant injector 192. Further, the illustrated exhaust gas aftertreatment system 100 includes $NH_3$ sensor 166A upstream of the SCR catalyst 125, $NH_3$ sensor 166B embedded within the SCR catalyst 152, and $NH_3$ sensor 166C downstream of the AMOX catalyst 160. Embedding the $NH_3$ sensor 166B within the SCR catalyst 152 provides various advantages. For example, the $NH_3$ sensor 166B can be used to physically measure the amount of $NH_3$ stored on the SCR catalyst.

The controller 130 in FIG. 1 is depicted as a single physical unit, but can include two or more physically separated units or components in some embodiments if desired. Generally, the controller 130 receives multiple inputs, processes the inputs, and transmits multiple outputs. The multiple inputs may include sensed measurements from the sensors and various user inputs. The inputs are processed by the controller 130 using various algorithms, stored data, and other inputs to update the stored data and/or generate output values. The generated output values and/or commands are transmitted to other components of the controller and/or to one or more elements of the engine system 10 to control the system to achieve desired results, and more specifically, achieve desired exhaust gas emissions at the tailpipe.

Although the exhaust aftertreatment system 100 shown includes one of an oxidation catalyst 140, particulate filter 142, SCR catalyst 152, and AMOX catalyst 160 positioned in specific locations relative to each other along the exhaust flow path, in other embodiments, the exhaust aftertreatment system may include more than one of any of the various catalysts positioned in any of various positions relative to each other along the exhaust flow path as desired. Further, although the oxidation catalyst 140 and AMOX catalyst 160 are non-selective catalysts, in some embodiments, the oxidation and AMOX catalysts can be selective catalysts.

The controller 130 controls the operation of the engine system 10 and associated sub-systems, such as the engine 11 and exhaust gas aftertreatment system 100. The controller 130 is depicted in FIG. 2 as a single physical unit, but can include two or more physically separated units or components in some embodiments if desired. Generally, the controller 130 receives multiple inputs, processes the inputs, and transmits multiple outputs. The multiple inputs may include sensed measurements from the sensors and various user inputs. The inputs are processed by the controller 130 using various algorithms, stored data, and other inputs to update the stored data and/or generate output values. The generated output values and/or commands are transmitted to other components of the controller and/or to one or more elements of the engine system 10 to control the system to achieve desired results, and more specifically, achieve desired exhaust gas emissions.

The controller 130 includes various modules for controlling the operation of the engine 11 and engine aftertreatment system 100. In one embodiment, the controller 130 includes modules for controlling the reduction or conversion of $NO_x$ by controlling the operation of the SCR system 150 in response to the outputs of the engine 11 controlling the operation of the engine 11 in response to the needs of the engine aftertreatment system 100. In certain implementations, the controller 130 controls the conversion of $NO_x$ by controlling the SCR system 150, controlling the operation or output of the engine 11, or a combination of both based on the duty cycles of the engine. The duty cycle of the engine can be defined as the percentage a fuel injector is open versus closed. The duty cycle of an engine can change or remain relatively constant depending on the type of driving undergone by the engine or a vehicle in which the engine is housed. For example, the duty cycle of an engine that is operated substantially at freeway driving conditions remains relatively constant and the duty cycle of an engine operated substantially in frequent stop-and-start conditions, such as city driving conditions, frequently changes over time. As defined herein, an engine where the duty cycle remains relatively constant has steady-state duty cycles and an engine where the duty cycle frequently changes has transient duty cycles. Accordingly, engines operated substantially at freeway driving conditions typically have steady-state duty cycles and engines operated substantially at city driving conditions typically have transient duty cycles.

The efficiency or amount of $NO_x$ conversion on the SCR catalyst system 100 is based largely on the conditions of the exhaust exiting the engine, which is dependent on the consistency of the duty cycles of an engine, e.g., the type of driving undergone by the engine. Certain exhaust conditions must be present for $NO_x$ conversion events, which include reductant dosing events and corresponding $NO_x$ reduction on an SCR catalyst, to obtain a desired efficiency and achieve a desired reduction of $NO_x$. Generally, for engines operated in highway driving conditions, exhaust conditions (e.g., exhaust temperatures) conducive to performing $NO_x$ conversion events are readily available for prolonged periods of time. However, for engines operated in city driving conditions, the availability of exhaust conditions conducive to performing $NO_x$ conversion events are not readily available due to the transient nature of engine operation during the frequent stops and starts. Accordingly, for engines operated in city driving conditions, it may be desirable to reduce as much $NO_x$ as possible when an opportunity for performing a $NO_x$ conversion event arises as there may not be many opportunities for $NO_x$ conversion in the future. However, for engines operated in highway driving conditions, a more flexible approach can be followed to efficiently and economically reduce a select amount of $NO_x$ just enough to meet emissions standards because there will be more opportunities to reduce more $NO_x$ in the future as needed. Accordingly, it would be desirable to provide different types of $NO_x$ conversion control depending on the operating condition of the engine to ensure exhaust emission standards are met. In one specific embodiment, the controller 130 is configured to control $NO_x$ reduction events in the SCR system according to an optimal or maximum $NO_x$ conversion/reduction mode during exclusively city driving conditions and combined city and highway driving conditions, and a reference tracking mode during exclusively highway driving conditions.

Optimal $NO_x$ Conversion Mode

In certain embodiments, the controls of the SCR system 150 include three main components: (1) a feedforward component designed to calculate a reductant dosing rate for steady-state operation of the engine 11; (2) a feedback-type component designed to compensate the feedforward component for any long-term degradation of the SCR and AMOX catalysts 152, 160, as well as the reductant doser 190; and (3) an ammonia storage component designed to calculate a reductant dosing rate necessary to fill ammonia storage sites on the SCR catalyst 152 for accommodating transient operation of the engine 11. In certain implementations, the feedback-type component can include an SCR catalyst degradation factor module, a $NO_x$ reduction efficiency module, and/or an AMOX $NH_3$ conversion efficiency module, such as will be described in more detail below.

Figure 3:
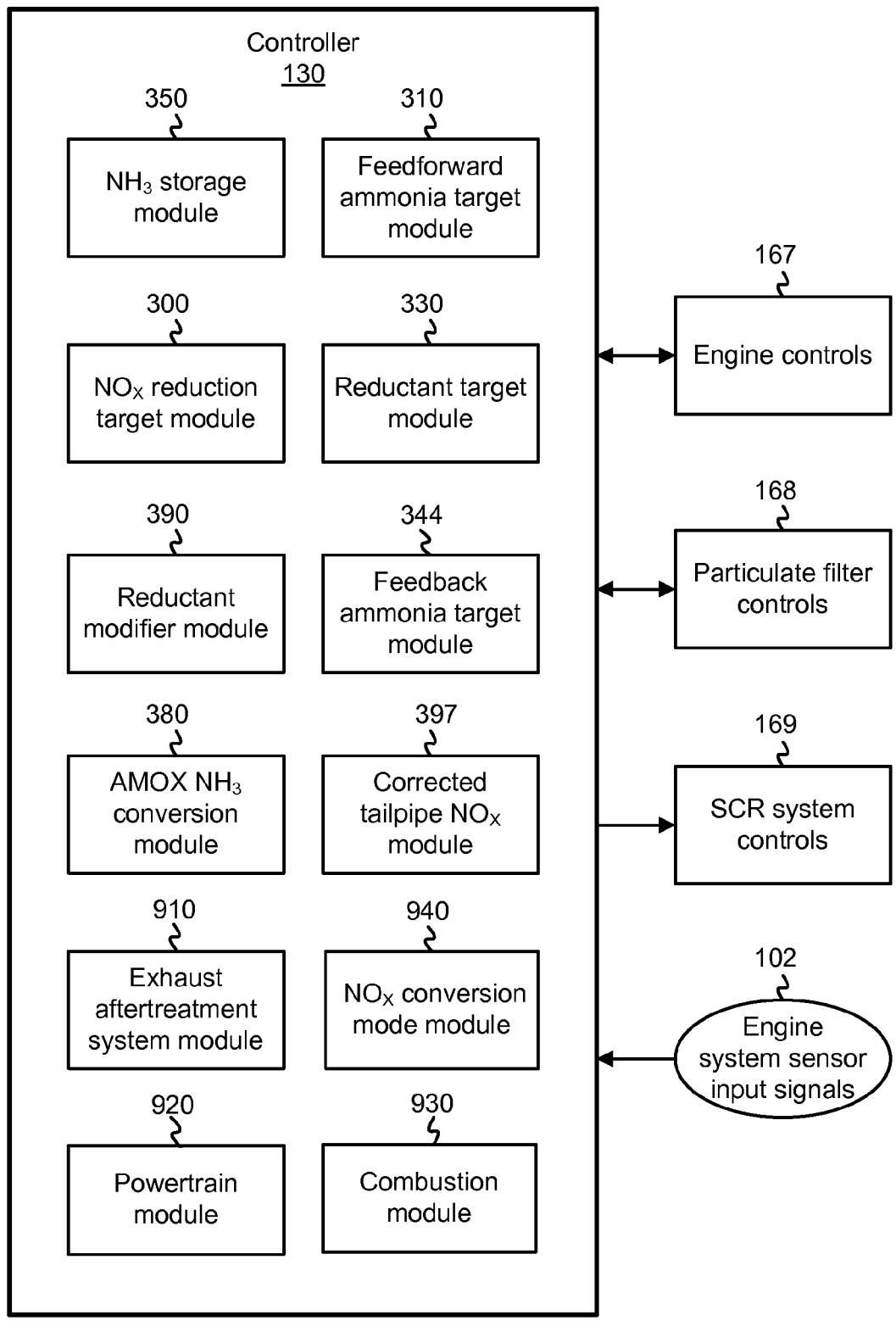
FIG. 3 is a schematic block diagram of a controller of the exhaust aftertreatment system of FIG. 2 according to one representative embodiment.

Referring to FIG. 3, and according to one embodiment, the controller 130 includes several modules for achieving the above three main components and controlling operation of the SCR system 150 to provide efficient reduction of $NO_x$ during transient and steady state operations, while reducing ammonia slip from the tailpipe. More specifically, the controller 130 includes a $NO_x$ reduction target module 300, at least one ammonia target module (e.g., feedforward ammonia target module 310 and feedback ammonia target module 344) a reductant target module 330, an $NH_3$ storage module 350, an AMOX $NH_3$ conversion module 380, a reductant limiting module 390, and a corrected tailpipe $NO_x$ module 397. Generally, the modules are independently and/or cooperatively operated to achieve optimal $NO_x$ conversion efficiency on the SCR catalyst 152 while minimizing ammonia slip and urea consumption. The controller 130 is communicable in data receiving and/or transmitting communication with several sub-systems of the engine system 10, such as engine controls 167, PM filter system controls 168, and SCR system controls 169.

$NO_x$ Reduction Target Module

Figure 4:
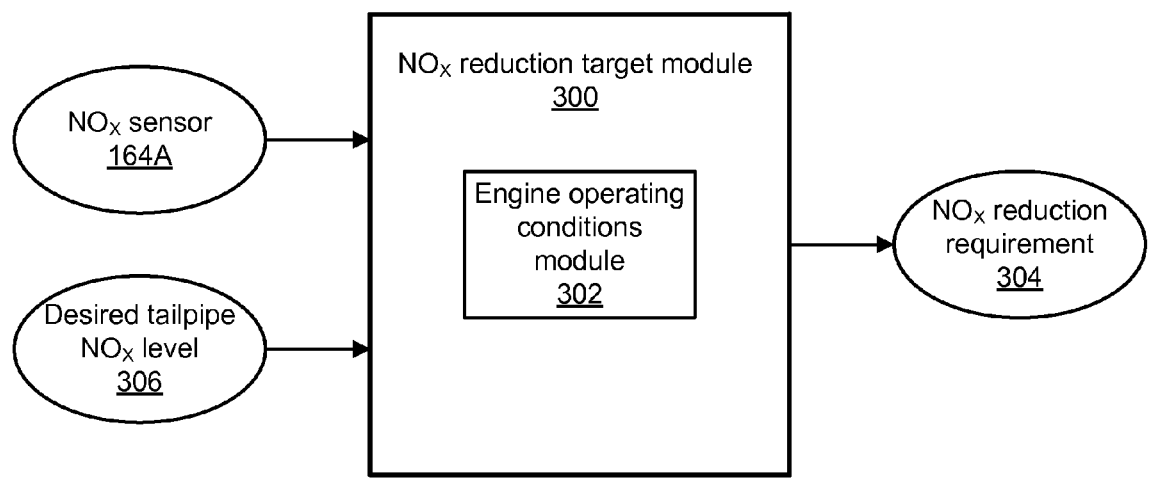
FIG. 4 is a schematic block diagram of a $NO_x$ reduction target module of the controller of FIG. 3 according to one representative embodiment.

Referring to FIG. 4, the $NO_x$ reduction target module 300 is operable to determine a $NO_x$ reduction requirement 304. The $NO_x$ reduction requirement represents the amount of $NO_x$ that should be reduced from the exhaust gas stream on the SCR catalyst 152 to achieve a predetermined exhaust gas emissions limit. In other words, the $NO_x$ reduction target module 300 determines the $NO_x$ reduction requirement 304 necessary to achieve the desired tailpipe $NO_x$ level 306. The desired amount of $NO_x$ at the tailpipe, e.g., desired tailpipe $NO_x$ level 306 (see FIGS. 4 and 16), is representative of the amount of $NO_x$ allowed to exit the tailpipe pursuant to regulated emissions standards.

Generally, the $NO_x$ reduction requirement 304 is expressed as the fraction of the $NO_x$ in the exhaust gas stream to be reduced. The $NO_x$ reduction requirement can also be expressed in terms of a $NO_x$ reduction rate or the rate at which $NO_x$ should be reduced to achieve the predetermined exhaust gas emissions limit. In certain implementations, the $NO_x$ reduction target module 300 is communicable in data receiving communication with the $NO_x$ sensor 164A to determine the amount of $NO_x$ present in the exhaust gas stream prior to entering the SCR catalyst 152. Alternatively, or additionally, in some implementations, the amount of $NO_x$ present in the exhaust gas stream can be estimated via operation of an engine operating conditions module 302. The engine operating conditions module 302 compares the operating conditions of the engine 11 against a stored operating map containing predetermined exhaust $NO_x$ levels for various operating conditions of the engine to determine an estimated amount of $NO_x$ in the exhaust gas stream. The $NO_x$ reduction target module 300 compares the actual or estimated amount of $NO_x$ in the exhaust gas stream at the engine outlet to a desired level of $NO_x$ 306 in the exhaust gas emitted from the tailpipe to determine the $NO_x$ reduction requirement 304.

Ammonia Target Module

The controller 130 includes an ammonia target module operable to determine an ammonia addition requirement. As defined herein, the ammonia addition requirement is the amount of ammonia that should be added to the exhaust gas stream to reduce the $NO_x$ in the exhaust gas stream to the desired level for meeting the emissions standards. In certain embodiments, the controller 130 includes the feedforward ammonia target module 310 for determining an ammonia addition requirement 326 using a feedforward methodology (see FIG. 5A). In other embodiments, the controller 130 includes the feedback ammonia target module 344 for determining an ammonia addition requirement 348 using a feedback methodology (see FIG. 5B). In yet some embodiments, the controller 130 includes both the feedforward ammonia target module 310 and the feedback ammonia target module 344.

Figure 5A:
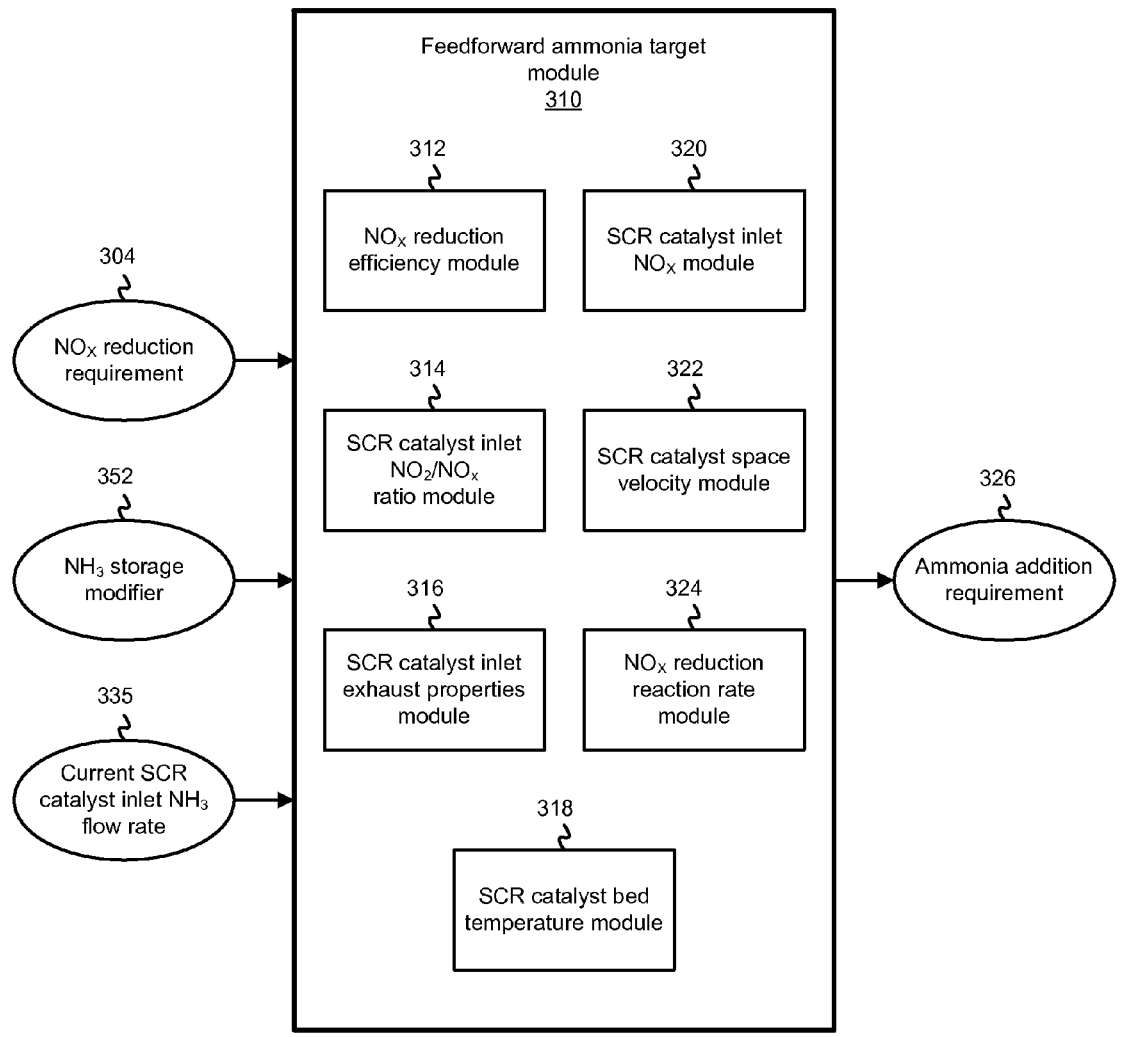
FIG. 5A is a schematic block diagram of a feedforward ammonia target module of the controller of FIG. 3 according to one representative embodiment.

Referring first to FIG. 5A, the feedforward ammonia target module 310 receives as input the $NO_x$ reduction requirement 304 from the $NO_x$ reduction target module 311 (see FIG. 4), an $NH_3$ storage modifier 352 from the $NH_3$ storage module 350 (see FIG. 10), and a current SCR catalyst inlet $NH_3$ flow rate 335 from the reductant hydrolysis module 333 (see FIG. 7) and utilized by the module 310 to determine the ammonia addition requirement 326. In the representative illustrated embodiment, the feedforward ammonia target module 310 includes a $NO_x$ reduction efficiency module 312, an SCR catalyst inlet $NO_2/NO_x$ ratio module 314, an SCR catalyst inlet exhaust properties module 316, an SCR catalyst bed temperature module 318, an SCR catalyst inlet $NO_x$ module 320, an SCR catalyst space velocity module 322, and a $NO_x$ reduction reaction rate module 324.

The $NO_x$ reduction efficiency module 312 is operable to determine the maximum efficiency of $NO_x$ reduction on the SCR catalyst 152. Generally, the $NO_x$ reduction efficiency module 312 considers a desired $NO_x$ conversion efficiency and the condition of the SCR catalyst.

The desired $NO_x$ conversion efficiency can be any of various efficiencies and be dependent on the difference between the amount of $NO_x$ in the exhaust gas stream at the engine outlet with the desired amount of $NO_x$ in the exhaust gas stream at the tailpipe outlet. For example, in some implementations, the desired $NO_x$ conversion efficiency of the SCR catalyst 152 can be the efficiency necessary for achieving the desired tailpipe $NO_x$ level 306 at the SCR catalyst outlet. However, in embodiments having an AMOX catalyst, the desired $NO_x$ conversion efficiency of the SCR catalyst 152 can be higher than if no AMOX catalyst is being used because the AMOX catalyst can reduce ammonia slipping from the SCR catalyst. In some embodiments, the $NO_x$ reduction efficiency module 312 can determine the maximum $NO_x$ conversion efficiency of the SCR catalyst 152 as described in pending U.S. Provisional Patent Application No. 61/120,297, filed Dec. 5, 2008, which is incorporated herein by reference.

Accordingly, the $NO_x$ reduction efficiency module 312 is operable to compare the desired $NO_x$ conversion efficiency with the maximum $NO_x$ conversion efficiency of the SCR catalyst 152 and output the smaller of the two efficiencies to the feedforward ammonia target module 310. The feedforward ammonia target module 310 then utilizes the smaller of the desired and maximum $NO_x$ conversion efficiencies determined by the $NO_x$ reduction efficiency module 312 to determine the ammonia addition requirement 326. Generally, the lower the smaller $NO_x$ conversion efficiency, the lower the ammonia addition requirement 326. The $NO_x$ reduction efficiency module 312 can determine the maximum $NO_x$ conversion efficiency of the SCR catalyst 152 in various ways.

The condition of the SCR catalyst 152 affects the efficiency of the SCR catalyst. The more degraded the condition of the SCR catalyst, the lower the maximum efficiency of $NO_x$ reduction on the SCR catalyst 152. Accordingly, the $NO_x$ reduction efficiency module 312 is operable to compare the desired $NO_x$ conversion efficiency with the maximum $NO_x$ conversion efficiency of the SCR catalyst 152 and output the smaller of the two efficiencies to the feedforward ammonia target module 310. The feedforward ammonia target module 310 then utilizes the smaller of the desired and maximum $NO_x$ conversion efficiencies determined by the $NO_x$ reduction efficiency module 312 to determine the ammonia addition requirement 326. Generally, the lower the smaller NOx conversion efficiency, the lower the ammonia addition requirement 326.

The $NO_x$ reduction efficiency module 312 can determine the maximum $NO_x$ conversion efficiency of the SCR catalyst 152 in various ways, such as described in U.S. Patent Application No. 61/120,297, filed Dec. 15, 2008, which is incorporated herein by reference. Moreover, the condition of the SCR catalyst 152 can be indicated by an SCR catalyst degradation factor. The SCR catalyst degradation factor can be determined by an SCR catalyst degradation factor module, such as module 368 described below in relation to FIG. 11, according to any of various ways.

The SCR catalyst inlet $NO_2/NO_x$ ratio module 314 is operable to predict the $NO_2/NO_x$ ratio of the exhaust gas in the exhaust gas stream at the inlet of the SCR catalyst 152. In some implementations, the $NO_2/NO_x$ ratio is expressed as the following ratio:

$$\frac{NO_2}{NO + NO_2} \tag{1}$$

where NO is the mass concentration of nitrogen monoxide in a predetermined volume of exhaust gas and $NO_2$ is the mass concentration of nitrogen dioxide in the predetermined volume of exhaust gas.

The SCR catalyst inlet exhaust properties module 316 is operable to determine various properties of the exhaust gas at the inlet of the SCR catalyst 152. The properties can include, for example, the mass flow rate of the exhaust and the temperature of the exhaust. In some implementations, the exhaust gas properties are predicted based on predetermined exhaust property values for predetermined operating conditions of the engine system 10. For example, the SCR catalyst inlet exhaust properties module 316 can include an exhaust properties map, table or vector comparing predetermined exhaust property values with engine system operating conditions, such as the operating load and/or speed of the engine 11. In certain implementations, the SCR catalyst inlet exhaust properties module 316 determines the exhaust gas properties by processing input from any of various sensors known in the art, such as mass flow and temperatures sensors.

The SCR catalyst bed temperature module 318 is operable to determine the bed temperature of the SCR catalyst 152. The bed temperature of the SCR catalyst 152 can be determined based on one or more temperature sensors embedded in the SCR catalyst, such as temperature sensor 124D, or predicted by a module (see, e.g., AMOX catalyst bed temperature module 386 of FIG. 13) that uses various operating parameters of the system, such as the exhaust gas mass flow rate and temperature before and after the SCR catalyst 152. Accordingly, although the illustrated embodiments use an SCR catalyst bed temperature sensor 124D for determining the temperature of the SCR catalyst bed, in other embodiments, the sensor is replaced or supplemented with an SCR catalyst bed temperature module operable to predict or estimate the temperature of the SCR catalyst bed.

The SCR catalyst inlet $NO_x$ module 320 is operable to determine the concentration of $NO_x$ in the exhaust gas at the inlet of the SCR catalyst 152. The $NO_x$ concentration can be predicted based on predetermined exhaust conditions corresponding to predetermined operating conditions of the engine system 10. For example, the module 320 can access an exhaust properties map, table or vector such as described above to estimate the $NO_x$ concentration in the exhaust. Alternatively, or additionally, the concentration of $NO_x$ in the exhaust gas upon entering the SCR catalyst 152 can be measured using the first $NO_x$ sensor 164A positioned upstream of the SCR catalyst.

The SCR catalyst space velocity module 322 is operable to determine the space velocity of the SCR catalyst 152. The space velocity is the volume of gas, measured at standard conditions (STP), per unit time per unit volume of the catalyst reactor. Generally, the space velocity of the SCR catalyst 152 represents the inverse of the time spent by an exhaust gas $NO_x$ particle in the SCR catalyst or the amount of $NO_x$ in the exhaust gas stream that is reactable within the SCR catalyst over a given time. Accordingly, the space velocity of the SCR catalyst 152 typically is represented in terms of per unit time, e.g., 1/hour, 1,000/hour, etc. The space velocity of the SCR catalyst 152 is based on various exhaust gas and catalyst conditions. For example, the space velocity can be based at least partially on the volume and/or reaction, or bed, surface area of the SCR catalyst, and the density, viscosity and/or flow rate of the exhaust gas. In some implementations, the SCR catalyst space velocity module 322 determines the space velocity of the SCR catalyst 152 by receiving inputs concerning operating conditions of the engine system 10, and, based on the operation conditions, obtaining the space velocity of the SCR for the given conditions by accessing a table or map stored on the module. The table can include various predetermined space velocities obtained via experimental testing and calibration for a given SCR catalyst operating under the various operating conditions achievable by the engine system 10.

The $NO_x$ reduction reaction rate module 324 is operable to predict the rate at which ammonia reacts with and reduces $NO_x$ on the SCR catalyst 152. The predicted $NO_x$ reaction rate is at least partially dependent on the $NO_x$ composition or concentration of the exhaust gas and the frequency of the various types of $NO_x$ reduction reactions occurring on the SCR catalyst 152. Generally, $NO_x$ is reduced by ammonia in one of the following three most active stoichiometric chemical reactions:

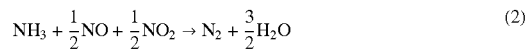

(2)

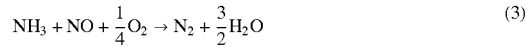

(3)

(4)

The predicted $NO_x$ reaction rate is also at least partially dependent on the ammonia concentration rate, the bed temperature of the SCR catalyst 152, and the space velocity of the SCR catalyst. Further, in some implementations, the predicted $NO_x$ reaction rate is also at least partially dependent on the degradation factor or condition of the SCR catalyst 152. The predicted $NO_x$ reaction rate can be expressed as the sum of a predicted $NO_x$ reaction rate for reducing NO according to Equations 2 and 3 above and a predicted $NO_x$ reaction rate for reducing $NO_2$ according to Equations 3 and 4 above.

Based at least partially on the desired $NO_x$ conversion efficiency, the $NO_2/NO_x$ ratio of the exhaust gas, the exhaust flow rate, the temperature and condition of the SCR catalyst 152 bed, the amount of $NO_x$ and $NH_3$ at the inlet of the SCR catalyst, and the $NO_x$ reduction reaction rate, the ammonia target module determines the ammonia addition requirement 326. In some embodiments, the ammonia addition requirement 326 is also at least partially based on an $NH_3$ storage modifier 352 determined by an $NH_3$ storage module 350 as will be described in more detail below (see FIG. 7).

Figure 5B:
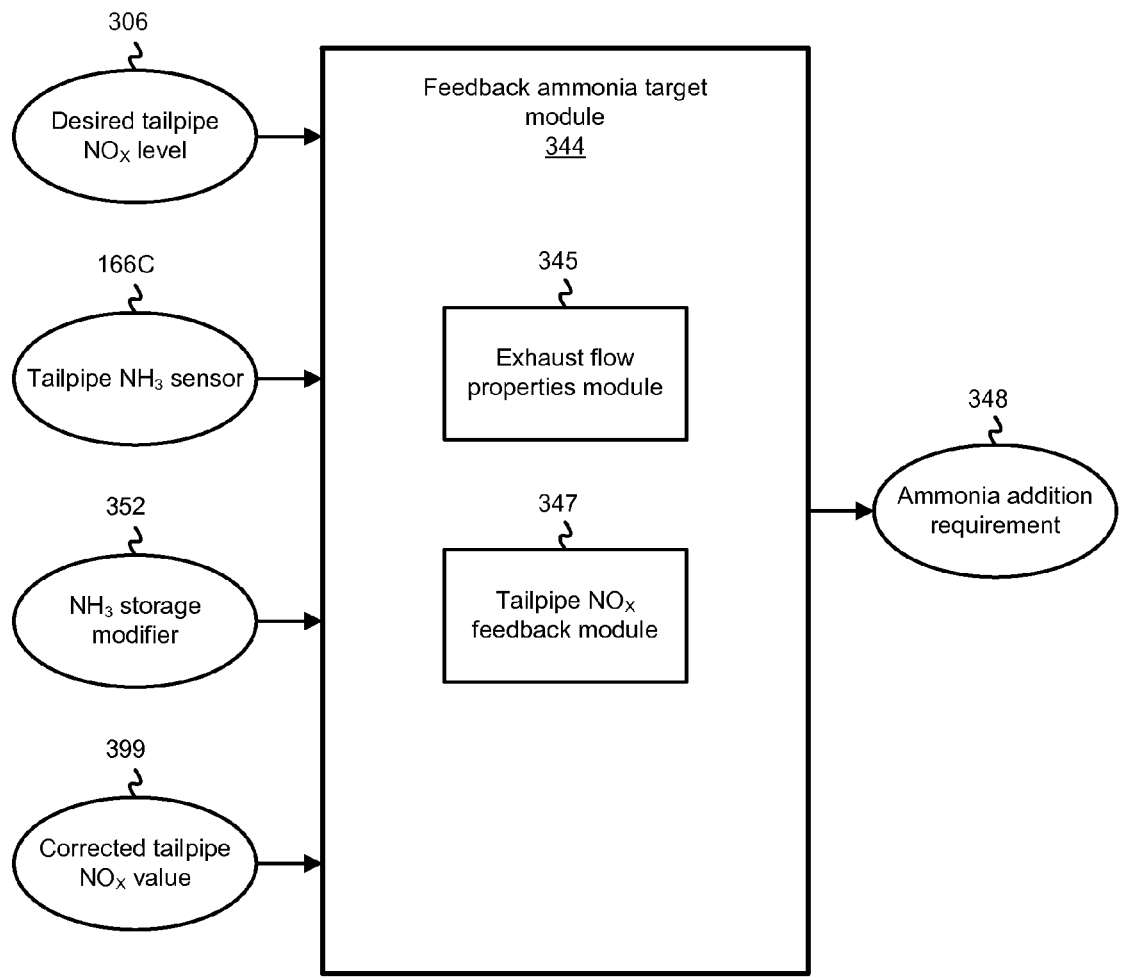
FIG. 5B is a schematic block diagram of a feedback ammonia target module of the controller of FIG. 3 according to one representative embodiment.

According to another embodiment shown in FIG. 5B, the ammonia addition requirement, e.g., ammonia addition requirement 348, can be determined by the feedback ammonia target module 344. The feedback ammonia target module 344 receives as input the desired tailpipe $NO_x$ level 306, the amount of $NH_3$ exiting the tailpipe as sensed by the tailpipe $NH_3$ sensor 166C, the $NH_3$ storage modifier 352, and a corrected tailpipe $NO_x$ value 399 (see FIG. 16). Further, the feedback ammonia target module 344 includes an exhaust flow properties module 345 and a tailpipe $NO_x$ feedback module 347. In contrast to the feedforward ammonia target module 310, the feedback ammonia target module 344 relies mainly on the properties of the exhaust gas stream after passing through the SCR catalyst 152 and adjusts the reductant dosing rate to compensate for errors and inconsistencies in the SCR system 150.

The exhaust flow properties module 345 is operable to determine various conditions of the exhaust gas stream, e.g., temperature, flow rate, etc., in a manner similar to that described above in relation to SCR catalyst inlet exhaust properties module 316.

The tailpipe $NO_x$ feedback module 347 is operable to determine a tailpipe $NO_x$ feedback value that can be utilized by the feedback ammonia target module 344 for determining the ammonia addition requirement 348. The tailpipe $NO_x$ feedback value accounts for inconsistencies in the SCR system 150, such as modeling errors, catalyst aging, sensor aging, reductant concentration variations, reductant injector delays, which can reduce the efficiency of the system. Therefore, the tailpipe $NO_x$ feedback module 396 is operable to modulate the tailpipe $NO_x$ feedback value to increase the efficiency of the SCR system 150 and achieve the desired $NO_x$ conversion efficiency despite inconsistencies that may be present in the system.

The tailpipe $NO_x$ feedback module 347 generates the tailpipe $NO_x$ feedback value by comparing the sensed amount of $NO_x$ as detected by the tailpipe $NO_x$ sensor 164D with the desired or targeted tailpipe $NO_x$ amount 306. Accordingly, the tailpipe $NO_x$ feedback value is at least partially dependent on the difference between the sensed tailpipe $NO_x$ and the targeted or desired tailpipe $NO_x$ 306. Generally, the greater the difference between the sensed tailpipe $NO_x$ and the targeted tailpipe $NO_x$ 306, the higher the ammonia addition requirement 348. For example, if the sensed amount of tailpipe $NO_x$ is relatively high compared to the targeted tailpipe $NO_x$ 306, then the feedback ammonia target module 344 can increase the ammonia addition requirement 348. As will be explained in more detail below, an increase in the ammonia addition requirement 348 can result in more reductant being added to the exhaust gas stream for increased $NO_x$ conversion on the SCR catalyst 152. Conversely, if the sensed amount of tailpipe $NO_x$ is relatively low compared to the targeted tailpipe $NO_x$ 306, then the feedback ammonia target module 344 can decrease the ammonia addition requirement, which may consequently result in less reductant being added to the exhaust gas stream to conserve reductant, and thus increase the efficiency of the SCR system 150.

In certain embodiments, because of the cross-sensitivity of some $NO_x$ sensors to ammonia, the feedback ammonia target module 344 is utilized by the SCR system 150 to generate the ammonia addition requirement only when ammonia is not slipping from the SCR system 150, e.g., slipping out of the tailpipe. Whether ammonia is slipping from the tailpipe can be sensed by the tailpipe $NH_3$ sensor 166C and/or predicted by the AMOX $NH_3$ conversion module 380, as will be described in more detail below.

In certain embodiments, the controller 130 includes a control logic selection algorithm (not shown) configured to select one of the ammonia addition requirements 326, 348 to act as the ammonia addition requirement for the SCR system 150 based at least partially on whether $NH_3$ is slipping from the tailpipe. In other words, the module used for determining the ammonia addition requirement for the SCR system 150 is switchable based on whether the SCR system is operating in a tailpipe $NH_3$ slip mode or a tailpipe $NH_3$ non-slip mode. More specifically, when $NH_3$ is slipping from the tailpipe, the ammonia addition requirement 326 determined by the feedforward ammonia target module 310 is communicated to the reductant target module 330 and used in the determination of the reductant injection requirement 332 (see FIG. 8). Conversely, when $NH_3$ is not slipping from the tailpipe, the ammonia addition requirement 348 determined by the feedback ammonia target module 344 is communicated to the reductant target module 330 and used in the determination of the reductant injection requirement 332. In some implementations, the control logic selection algorithm of the controller 130 determines the ammonia addition requirement based on a combination, e.g., an average, of the ammonia addition requirements 326, 348 regardless of whether ammonia is slipping from the tailpipe. In certain implementations, the ammonia addition requirement 326 can be adjusted according to the ammonia addition requirement 348.

In some embodiments, the feedback ammonia target module 344 includes a signal correction algorithm (not shown) configured to filter the signal from the tailpipe $NO_x$ sensor 164D such that the signal is suitable for yielding a more accurate $NO_x$ concentration at the tailpipe when ammonia is slipping from the tailpipe. In one embodiment, the signal correction algorithm can be configured as described in U.S. Provisional Patent Application No. 61/120,319, filed Dec. 5, 2008, which is incorporated herein by reference. Accordingly, in some implementations, the ammonia addition requirement 348 generated by the feedback ammonia target module 344 can be communicated to the reductant target module 330 during operation in the tailpipe $NH_3$ slip or non-slip mode.

As described above, the controller 130 can utilize the feedforward ammonia target module 310, the feedback ammonia target module 344, or both to determine an ammonia addition requirement for the SCR system 150. Once determined, the ammonia addition requirement, e.g., ammonia addition requirement 326, ammonia addition requirement 348, or combination of both, is communicated to the reductant target module 330, or more specifically, the inverse reductant hydrolysis module 334 of the reductant target module. As used hereafter, the ammonia addition requirement communicated to the reductant target module 330 will be referenced as the ammonia addition requirement 326. Nevertheless, it is recognized that any reference to the ammonia addition requirement 326 can be substituted with the ammonia addition requirement 348 or a combination of the ammonia addition requirements 326, 348.

Reductant Target Module

Figure 6:
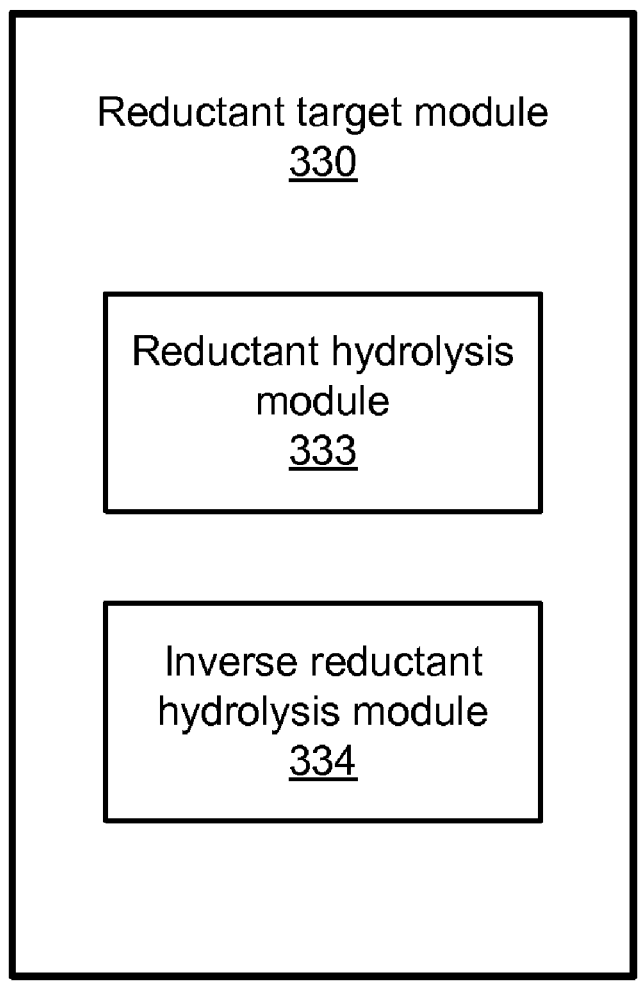
FIG. 6 is a schematic block diagram of a reductant target module of the controller of FIG. 3 according to one representative embodiment.

Referring to FIG. 6, the reductant target module 330 includes a reductant hydrolysis module 333 and an inverse reductant hydrolysis module 334. As will be described in more detail below, the reductant hydrolysis module 333 is operable to determine a current SCR catalyst inlet $NH_3$ flow rate 335 and a current SCR catalyst inlet HNCO flow rate 336 based on the current reductant dosing rate (see FIG. 7). The current SCR catalyst inlet $NH_3$ flow rate 335 and current SCR catalyst inlet HNCO flow rate 336 are then communicated to other various modules of the control system 150. In contrast to the reductant hydrolysis module 333, the inverse reductant hydrolysis module 334 is operable to receive the ammonia addition requirement 326 from the ammonia target module 310 and determine a reductant injection requirement or dosing rate 332, i.e., the amount of reductant necessary to achieve the ammonia addition requirement 326 (see FIG. 8). Based on the reductant injection requirement 332, the controller 130 commands the SCR system controls to inject an amount of reductant corresponding to the reductant injection requirement 332. In some embodiments, the reductant injection requirement is modified as described in U.S. Provisional Patent Application No. 61/120,304, filed Dec. 5, 2008, which is incorporated herein by reference.

The reductant can be any of various reductants known in the art. For example, in one implementation, the reductant is ammonia. In other implementations, the reductant is urea, which breaks down into ammonia and other components as will be described in more detail below.

Reductant Hydrolysis Module

Referring back to FIG. 7, the reductant hydrolysis module 333 includes an $NH_3$ conversion efficiency table 337, an isocyanic acid (HNCO) conversion efficiency table 338, and an SCR catalyst inlet exhaust properties module 339. The SCR catalyst inlet exhaust properties module 339 is operable to determine the mass flow rate of the exhaust gas stream in a manner similar to that described above in relation to SCR catalyst inlet exhaust properties module 316 of FIG. 5. The reductant hydrolysis module 333 is communicable in data receiving communication with the reductant delivery mechanism 190 for receiving a current reductant dosing rate 383 and the exhaust temperature sensor 124B for receiving the temperature of the exhaust.

Figure 9:
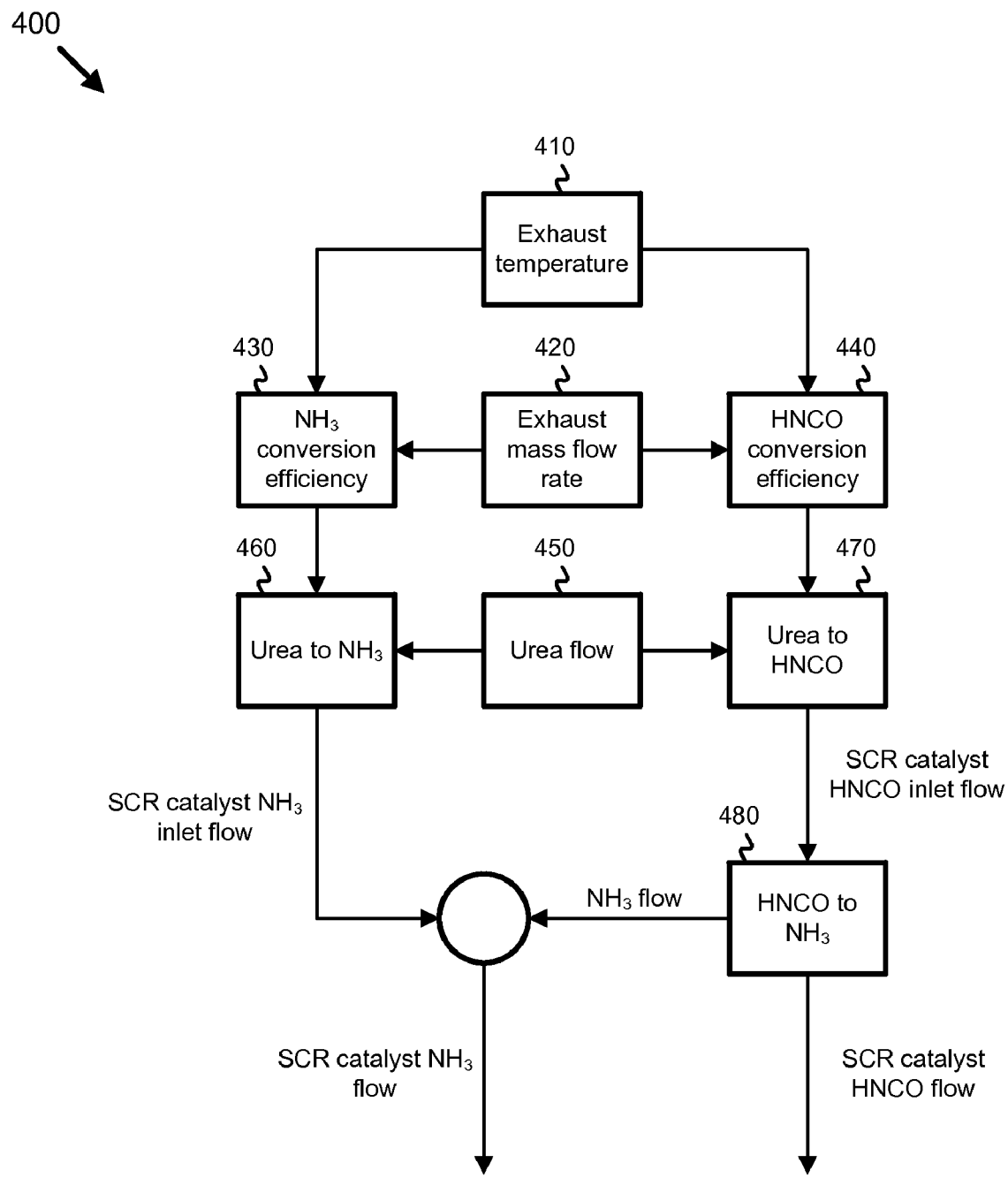
FIG. 9 is a schematic flow chart diagram of a control system operable to determine ammonia and isocyanic acid flow into an SCR catalyst according to one embodiment.

As described above, in implementations where the reductant is urea, the reductant hydrolysis module 333 is operable to determine the amount of ammonia and isocyanic acid entering the SCR catalyst 152. According to one embodiment, the reductant hydrolysis module 333 is operable to follow the schematic flow chart 400 of FIG. 9 to determine the current SCR catalyst inlet $NH_3$ and HNCO flow rates 335, 336, respectively. The exhaust temperature is sensed, such as by the temperature sensor 124B, or estimated, at 410 and the exhaust mass flow rate is estimated by the SCR catalyst inlet exhaust properties module 339 at 420. Based at least partially on the exhaust temperature determined at 410 and the exhaust mass flow rate determined at 420, the conversion efficiency of urea to $NH_3$ is determined at 430 and the conversion efficiency of urea to isocyanic acid (HNCO) is determined at 440. Accordingly, the conversion efficiencies of urea to $NH_3$ and isocyanic acid are a function of the exhaust gas temperature and mass flow rate. The $NH_3$ and HNCO conversion efficiencies are determined by comparing the exhaust gas temperature and mass flow rate to one or more predetermined efficiency values listed on $NH_3$ and HNCO conversion efficiency look-up tables 337, 338, respectively.

According to the reductant injection requirement 332 received by the SCR inlet ammonia and isocyanic acid module 360 from the reductant target module 330, urea is injected into the exhaust gas stream by a urea injector at 450. The urea is mixed with the exhaust gas stream flowing through an exhaust pipe between the urea injector and the surface of SCR catalyst 152. As the urea flows along the exhaust pipe, it reacts with the exhaust gas to form $NH_3$ at 460 and HNCO at 470. The $NH_3$ and HNCO in the exhaust gas stream then enter the SCR catalyst 152 as the current SCR catalyst inlet $NH_3$ flow rate 335 and current SCR catalyst inlet HNCO flow rate 336, respectively. After the HNCO enters the SCR catalyst 152, the catalyst bed promotes a reaction between at least a portion of the HNCO and water ($H_2O$) in the exhaust gas stream to form additional $NH_3$ at 480. The current SCR catalyst inlet $NH_3$ flow rate 335 and the current HNCO to $NH_3$ flow rate 341, i.e., the $NH_3$ from the conversion of HNCO to $NH_3$ occurring within the SCR catalyst 152 at 480, are combined to provide an estimation of the total amount of ammonia within the SCR catalyst, e.g., the current SCR catalyst $NH_3$ flow rate 343. The estimated amount of HNCO that is not converted to $NH_3$ at 480 flows through and out of the SCR catalyst 152 at an SCR catalyst outlet HNCO flow rate 349.

As discussed above, the amount of urea converted to $NH_3$ is at least partially dependent on the $NH_3$ conversion efficiency. In an ideal situation, the $NH_3$ conversion efficiency is 100% such that the all the urea converts to 2-parts ammonia and 1-part carbon dioxide without any intermediate conversion to HNCO according to the following equation:

$$NH_2\text{—}CO\text{—}NH_2(aq) + H_2O \rightarrow 2NH_3(g) + CO_2 \quad (5)$$

In actuality, the $NH_3$ conversion efficiency is typically less than 100% such that the urea converts to ammonia and isocyanic acid according to the following equation:

$$NH_2\text{—}CO\text{—}NH_2(s) \rightarrow NH_3(g) + HNCO(g) \quad (6)$$

The remaining isocyanic acid converts to ammonia and carbon dioxide $CO_2$ according to the HNCO conversion efficiency. In ideal situations, the HNCO conversion efficiency is 100% such that all the isocyanic acid converts to 1-part ammonia and 1-part carbon dioxide within the SCR catalyst 152 according to the following equation:

$$HNCO(g) + H_2O(g) \rightarrow NH_3(g) + CO_2(g) \quad (7)$$

Typically, however, the HNCO conversion efficiency is less than 100% such that some of the HNCO is converted to ammonia and carbon dioxide and the remaining portion of HNCO is unconverted within the SCR catalyst 152.

The flow rate of $NH_3$ into the SCR catalyst 152 ($\dot{n}_{NH_3}(s)$) per flow rate of injected urea ($\dot{n}_{urea}(s)$) is estimated according to the following equation:

$$\frac{\dot{n}_{NH_3}(s)}{\dot{n}_{urea}(s)} = \frac{1}{\tau s + 1}(1 - e^{-x/L})\eta_{NH_3}(\dot{m}, T) \quad (8)$$

where $\tau$ is the mixing time constant, s is a complex variable used for Laplace transforms, L is the characteristic mixing length, x is the distance from the urea injector to the SCR catalyst inlet or face, and $\eta_{NH_3}$ is the $NH_3$ conversion efficiency from urea, which is based on the mass flow rate ($\dot{m}$) and temperature (T) of the exhaust gas. The complex variable can be expressed as $\sigma + j\omega$, where $\sigma$ represents the amplitude and $\omega$ represents the frequency of a sinusoidal wave associated with a given urea dosing rate input. The mixing time constant is predetermined based at least partially on the Federal Test Procedure (FTP) heavy-duty transient cycle for emission testing of heavy-duty on-road engines. Assuming 100% conversion efficiency, the mixing time constant is tuned with the FTP data to eliminate transient mismatches. The characteristic length L is defined as the major linear dimension of the exhaust pipe that is substantially perpendicular to the exhaust gas flow. For example, for a cylindrical exhaust pipe, the major linear dimension is the diameter of the pipe. In some embodiments, the distance from the urea injector to the SCR catalyst face x is between about 5 and 15 times the characteristic length. In specific implementations, the distance x is about 10 times the characteristic length.

Similarly, the flow rate of isocyanic acid (HNCO) into the SCR catalyst 152 ($\dot{n}_{HNCO}(s)$) per flow rate of injected urea ($\dot{n}_{urea}(s)$) is estimated according to the following equation:

$$\frac{\dot{n}_{HNCO}(s)}{\dot{n}_{urea}(s)} = \frac{1}{\tau s + 1}(1 - e^{-x/L})\eta_{HNCO}(\dot{m}, T) \quad (9)$$

where $\eta_{HNCO}$ is the HNCO conversion efficiency from urea. The conversion efficiencies of urea to ammonia ($\eta_{NH_3}$) and urea to isocyanic acid ($\eta_{HNCO}$) is predetermined based on operating parameters of the engine system 10. In some implementations, the conversion efficiencies are tuned by comparing a measurement of the $NH_3$ and HNCO at the inlet of the SCR catalyst 152 with the expected amount of $NH_3$ and HNCO based on the stoichiometric reaction of Equation 6 while dosing urea into exhaust at specific mass flow rates and temperatures.

Inverse Reductant Hydrolysis Module

Figure 8:
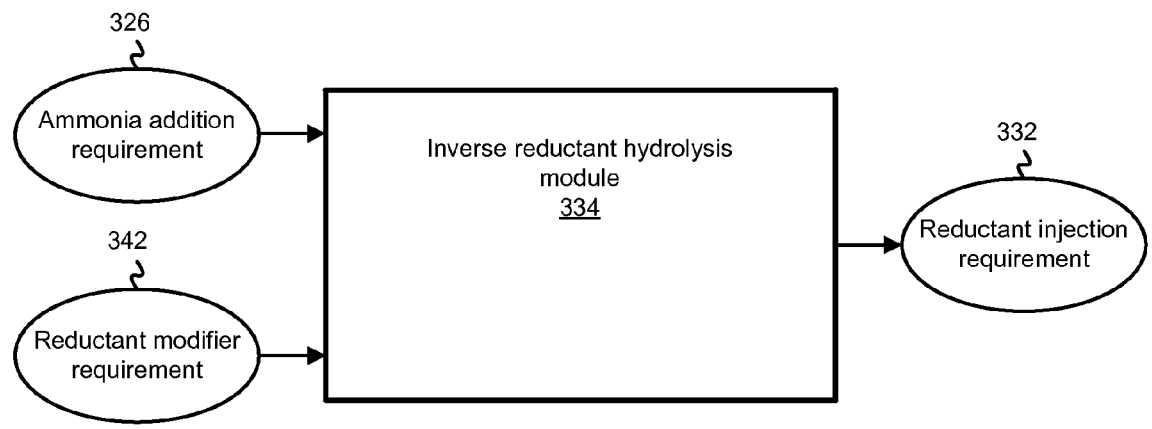
FIG. 8 is a schematic block diagram of an inverse reductant hydrolysis module of the reductant target module of FIG. 6 according to one representative embodiment.

Referring now to FIG. 8, based at least partially on the ammonia addition requirement 326 received from the ammonia target module 310, the inverse reductant hydrolysis module 334 of the reductant target module 330 is operable to determine the reductant injection requirement 332 to achieve the ammonia addition requirement 326 generated by the ammonia target module 310. In some implementations, the process used by the inverse reductant hydrolysis module 334 to determine the reductant injection requirement 332 is similar to the process illustrated in flow chart 400, but inverted. In other words, the same techniques used in flow chart 400 to determine the current SCR catalyst inlet $NH_3$ flow rate 335 can be used to determine the reductant injection requirement 332, but in a different order.

For example, in the flow chart 400, the actual urea dosing rate is known and used to determine the flow of $NH_3$ into the SCR catalyst 152. In contrast, in the process used by the inverse reductant hydrolysis module 334, the ammonia addition requirement 326, e.g., the desired or estimated flow of $NH_3$ into the SCR catalyst 152, is known and used to determine the corresponding reductant injection requirement, e.g., dosing rate, necessary to achieve the desired $NH_3$ flow rate. The reductant injection requirement 332 is determined by predicting the hydrolysis rates and conversion efficiencies of urea to $NH_3$ and HNCO based on the temperature and mass flow rate of the exhaust gas stream. For example, the inverse reductant hydrolysis module 334 can include an $NH_3$ conversion efficiency table, HNCO conversion efficiency table, and an SCR catalyst inlet exhaust properties module similar to the reductant hydrolysis module 333. Alternatively, the inverse reductant hydrolysis module 334 can access the $NH_3$ conversion efficiency table 337, HNCO conversion efficiency table 338, and output of the SCR catalyst inlet exhaust properties module 339 of the reductant hydrolysis module 333.

In some implementations, with the desired flow rate of $NH_3$ into the SCR catalyst 152 ($\dot{m}_{NH_3}(s)$), e.g., the ammonia addition requirement, known, the reductant injection requirement 332 is determined from Equation 8 above by solving for the flow rate of injected urea $\dot{m}_{urea}(s)$. In one specific implementation, the reduction injection requirement 332 expressed in terms of mL/hr of urea is approximately equal to:

$$\frac{mL}{hr} Urea \approx 1.85 * f(a) * \dot{m}NO_x \qquad (10)$$

where $\dot{m}NO_x$ is equal to the mass flow rate of the total amount of $NO_x$ in the exhaust gas stream expressed in terms of grams/hour and $f(a)$ is a non-dimensional piecewise function where a is equal to the $NO_2/NO_x$ ratio expressed above in Equation 1. When NO is greater than or equal to $NO_2$, i.e., $NO_2/NO_x \leq 0.5$, $f(a)$ is equal to about one, and when NO is less than or equal to $NO_2$, i.e., $NO_2/NO_x \geq 0.5$ $f(a)$ is equal to:

$$\frac{2(a+1)}{3} \qquad (11)$$

In another specific embodiment, the reduction injection requirement 332 is determined based on the ideal stoichiometric conversion of urea to ammonia and the ideal stoichiometric reduction of $NO_x$ on the SCR catalyst 152. When the level of NO in the exhaust gas stream is greater than or equal to the level of $NO_2$ in the exhaust gas, the amount of urea for reducing one gram of $NO_x$ is represented by Equation 12 below. When the level of NO in the exhaust gas is less than or equal to the level of $NO_2$ in the exhaust gas, the amount of urea for reducing one gram of $NO_x$ is represented by Equation 13 below, where a is equal to the $NO_2/NO_x$ ratio expressed above in Equation 1. As used in Equations 12 and 13, $MW_{Urea}$ is the molecular weight of the urea to be injected and $MW_{NOx}$ is the molecular weight of $NO_x$ in the exhaust gas stream.

$$0.5 * \left(\frac{MW_{Urea}}{MW_{NOx}}\right) \qquad (12)$$

$$0.5 \left(\frac{MW_{Urea}}{MW_{NOx}}\right) * \frac{2(a+1)}{3} \qquad (13)$$

Based on Equations 12 and 13, the flow rate of urea in terms of grams per second can be expressed in terms of the mass flow rate of $NO_x$ ($\dot{m}_{NOx}$) in the exhaust gas stream. For example, when the amount of NO in the exhaust gas stream is more than or equal to the amount of $NO_2$ in the exhaust gas stream, the flow rate of urea can be expressed according to the following equation:

$$\frac{\dot{m}_{NOx}}{0.5 * \left(\frac{MW_{Urea}}{MW_{NOx}}\right)} \qquad (14)$$

where $MW_{Urea}$ is the molecular weight of urea, and $MW_{NOx}$ is the molecular weight of $NO_x$ in the exhaust gas stream.

When the amount of NO in the exhaust gas stream is less than or equal to the amount of $NO_2$ in the exhaust gas stream, the flow rate of urea can be expressed according to the following equation:

$$\frac{\dot{m}_{NOx}}{0.5 * \left(\frac{MW_{Urea}}{MW_{NOx}}\right) \frac{2(a+1)}{3}} \qquad (15)$$

Figure 15:
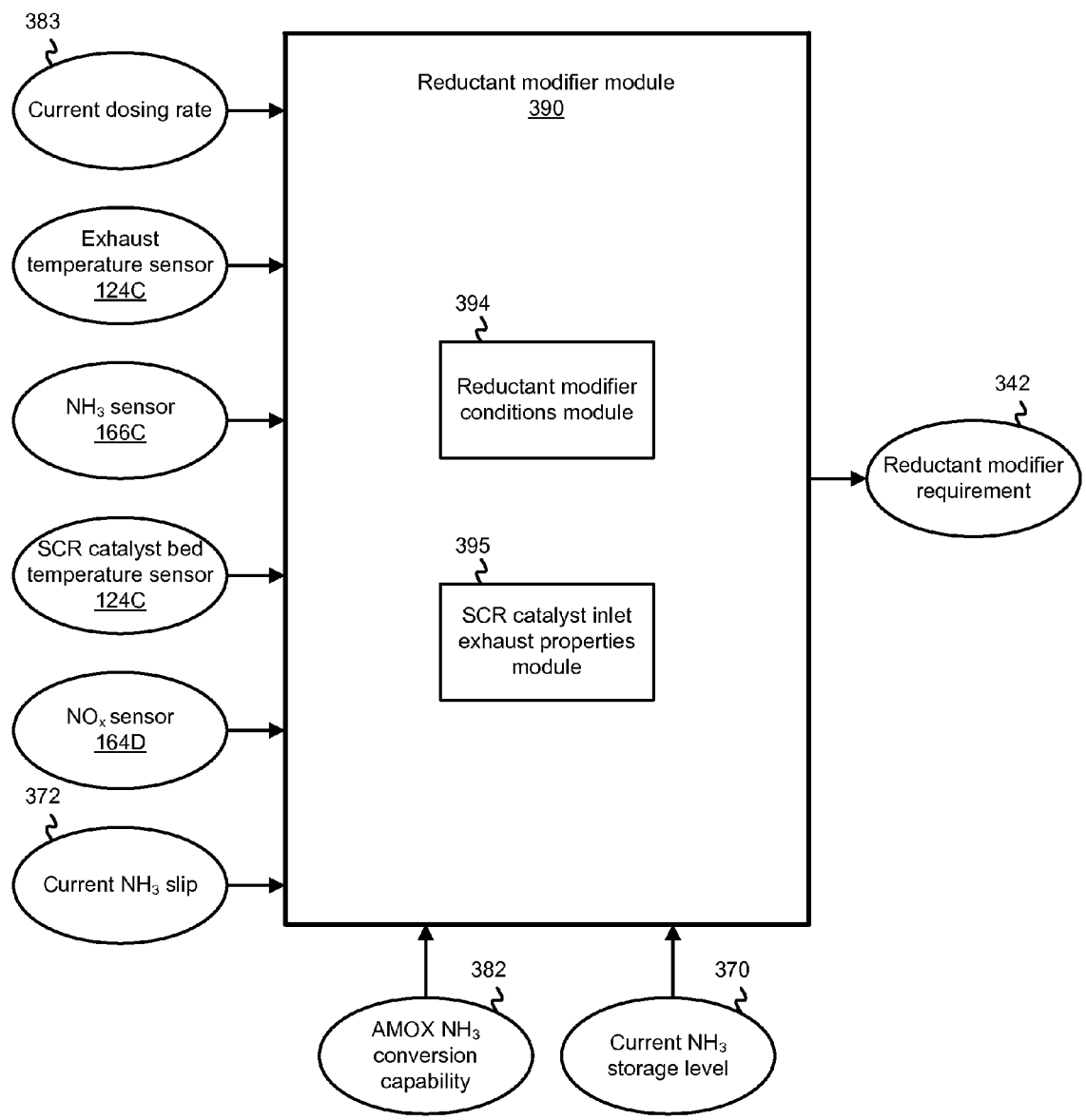
FIG. 15 is a schematic block diagram of a reductant modifier module of the controller of FIG. 3 according to one representative embodiment.

In some implementations, the inverse reductant hydrolysis module 334 is communicable in data receiving communication with the reductant modifier module 390 to receive a reductant modifier requirement 342 (see FIG. 15). As will be described in more detail below, the reductant modifier requirement 342 includes instructions for increasing or decreasing the reductant injection requirement 332 based on whether one or more reductant limiting conditions are present. Accordingly, the inverse reductant hydrolysis module 334 is operable to modify the reductant injection requirement 332 according to the reductant modifier requirement 342.

Ammonia Storage Module

Figure 10:
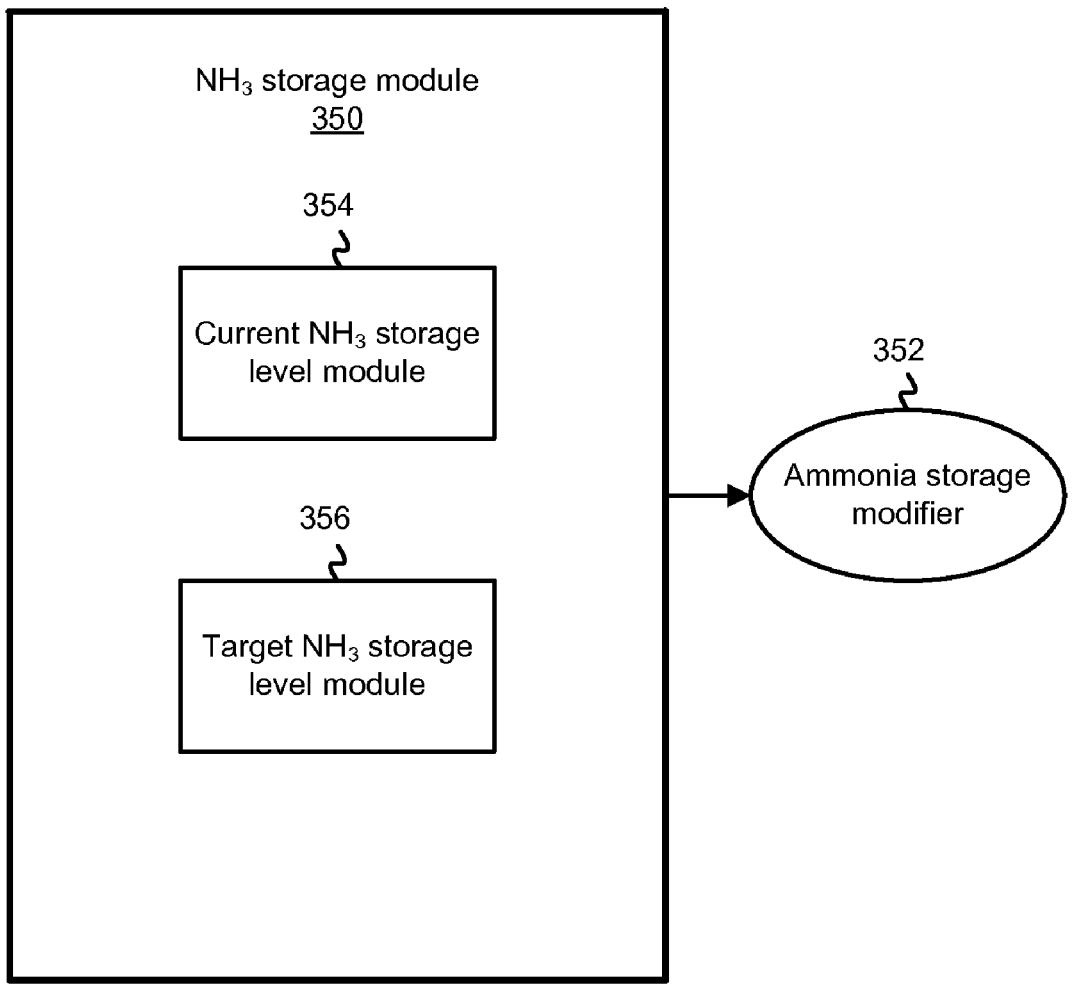
FIG. 10 is a schematic block diagram of an ammonia storage module of the controller of FIG. 3 according to one representative embodiment.

Referring to FIG. 10, the $NH_3$ storage module 350 is operable to determine an ammonia storage modifier or storage compensation command 352. Generally, the ammonia storage modifier 352 includes information regarding the state of ammonia storage on the SCR catalyst 152. More specifically, the ammonia storage modifier 352 includes instructions on whether ammonia entering the SCR catalyst 152 should be increased or decreased, e.g., whether the ammonia addition requirement should be increased or decreased. The ammonia target module 310 is communicable in data receiving communication with the $NH_3$ storage module 350 to receive the ammonia storage modifier 352 as an input value. Based on the ammonia storage modifier 352, the ammonia target module 310 is operable to adjust, e.g., increase or decrease, the ammonia addition requirement 326 to compensate for modulations in the ammonia storage level on the SCR catalyst 152 and maintain a sufficient amount of stored $NH_3$ on the SCR catalyst for transient operations of the engine 11.

As discussed above, the performance of the SCR system 150 is defined by the conversion efficiency of $NO_x$ in the exhaust gas stream and the amount of ammonia that has slipped out of the tail-pipe over both steady-state and transient duty cycles. During transient duty cycles, the response of conventional control systems that monitor only the $NO_x$ level at the tailpipe outlet typically are limited by the dynamics of the reductant dosing system, the cross-sensitivity of the $NO_x$ sensor to $NH_3$, and other factors. Accordingly, conventional control systems may have unstable feedback controls during transient duty cycles. To improve the response and feedback controls during transient duty cycles, the SCR system 150 utilizes $NH_3$ stored on the SCR catalyst to manage transient $NO_x$ spikes that may occur during transient operation or cycles of the engine 11. Further, $NH_3$ stored on the SCR catalyst 152 can be used to reduce $NO_x$ when engine system operating conditions, such as low SCR catalyst bed temperatures, require a reduction or elimination of reductant dosing. The $NH_3$ storage module 350 is configured to monitor and regulate the amount of ammonia stored on the SCR catalyst 152 such that a sufficient amount of stored $NH_3$ is maintained on the SCR catalyst to accommodate transient $NO_x$ variations and low catalyst bed temperatures as well as reduce $NH_3$ slip.

The NH$_3$ storage module 350 includes a current NH$_3$ storage level module 354 and a target NH$_3$ storage level module 356. The modules 354, 356 process one or more inputs received by the NH$_3$ storage module 350 as will be explained in more detail below.

Current Ammonia Storage Level Module

Figure 11:
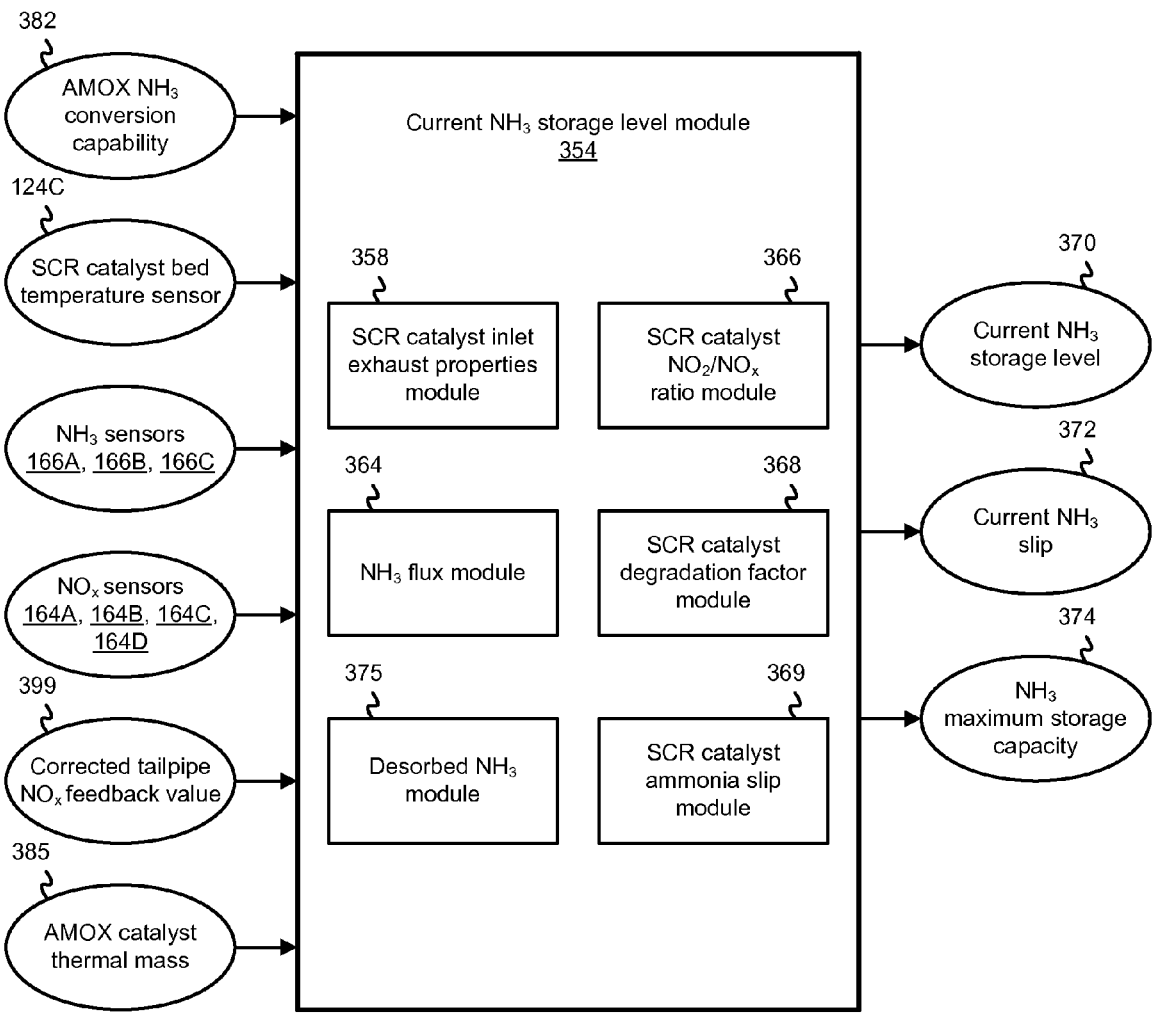
FIG. 11 is a schematic block diagram of a current ammonia storage level module of the ammonia storage module of FIG. 10 according to one representative embodiment.

Referring to FIG. 11, the current NH$_3$ storage level module 354 is communicable in data receiving communication with several sensors for receiving data sensed by the sensors. In the illustrated embodiment, the several sensors include at least the SCR catalyst bed temperature sensor 124C, NH$_3$ sensors 166A-C, and NO$_x$ sensors 164A-D. The current NH$_3$ storage level module 354 also is capable of receiving an AMOX NH$_3$ conversion capability 382 value and a corrected tailpipe NO$_x$ value 399 as will be described in further detail below.

The current NH$_3$ storage level module 354 also includes an SCR catalyst inlet exhaust properties module 358, an NH$_3$ flux module 364, an SCR catalyst inlet NO$_2$/NO$_x$ ratio module 366, an SCR catalyst degradation factor module 368, an SCR catalyst NH$_3$ slip module 369, and an NH$_3$ desorption module 375. Based on input received from the sensors 124C, 166A, -C, 164A-D, the AMOX NH$_3$ conversion capability 382 (if an AMOX catalyst is used), the tailpipe NO$_x$ feedback value 399, and operation of the modules 358, 364, 366, 368, 369, 375, the current NH$_3$ storage level module 354 is operable to determine the current NH$_3$ storage level 370 (e.g., an estimate of the current amount of NH$_3$ stored on the SCR catalyst 152 based at least partially on the SCR catalyst bed temperature), the current NH$_3$ slip 372 (e.g., an estimate of the current amount of NH$_3$ exiting the SCR catalyst), and the NH$_3$ maximum storage capacity 374 (e.g., an estimate of the maximum amount of NH$_3$ capable of being stored on the SCR catalyst based on current conditions). The fraction of the available storage on the SCR catalyst that is filled can be determined by dividing the current NH$_3$ storage level 370 by the NH$_3$ maximum storage capacity 374. In one embodiment, the amount of NH$_3$ stored on the SCR catalyst as detected by the NH$_3$ sensor 166B can be used in place of the current NH$_3$ storage level 370. Alternatively, in a feedback-type algorithm, the amount of NH$_3$ stored on the SCR catalyst detected by the NH$_3$ sensor 166B can be compared with the current NH$_3$ storage level and an average of the two, or the lower of the two (for conservative estimates), can be used as the current NH$_3$ storage level 370.

The SCR catalyst inlet exhaust properties module 358 is similar to SCR catalyst inlet exhaust properties module 316 of the ammonia target module 310. For example, the exhaust properties module 358 is operable to determine various properties of the exhaust, such as the temperature and flow rate of the exhaust.

The NH$_3$ flux module 364 is operable to determine the rate at which NH$_3$ flows into the SCR catalyst 152. The NH$_3$ flux module 364 can also process data concerning the amount of NH$_3$ present at the tailpipe outlet as sensed by the NH$_3$ sensor 166C. The NH$_3$ sensor 166C at the tailpipe outlet assists in the measurement and control of the tailpipe NH$_3$ slip by providing information regarding the tailpipe NH$_3$ slip to various modules of the controller 130. In some instances, the modules, e.g., the target NH$_3$ storage level module 356 and the reductant modifier module 390, adjust the urea dosing rate and the ammonia storage targets based at least partially on the tailpipe NH$_3$ slip information received from the NH$_3$ sensor.

The SCR catalyst inlet NO$_2$/NO$_x$ ratio module 366 is similar to the SCR catalyst inlet NO$_2$/NO$_x$ ratio module 314 of the ammonia target module 310. For example, the SCR catalyst inlet NO$_2$/NO$_x$ ratio module 366 is operable to predict the NO$_2$/NO$_x$ ratio of the exhaust gas in the exhaust gas stream according to Equation 1.

The SCR catalyst degradation factor module 368 is operable to determine a degradation factor or condition of the SCR catalyst 152 in a manner the same as or similar to the NO$_x$ reduction efficiency module 312 of the ammonia target module 310 described above. In one embodiment, the SCR catalyst degradation factor is determined as described in U.S. Provisional Patent Application No. 61/120,283, filed Dec. 5, 2008, which is incorporated herein by reference.

Figure 12:
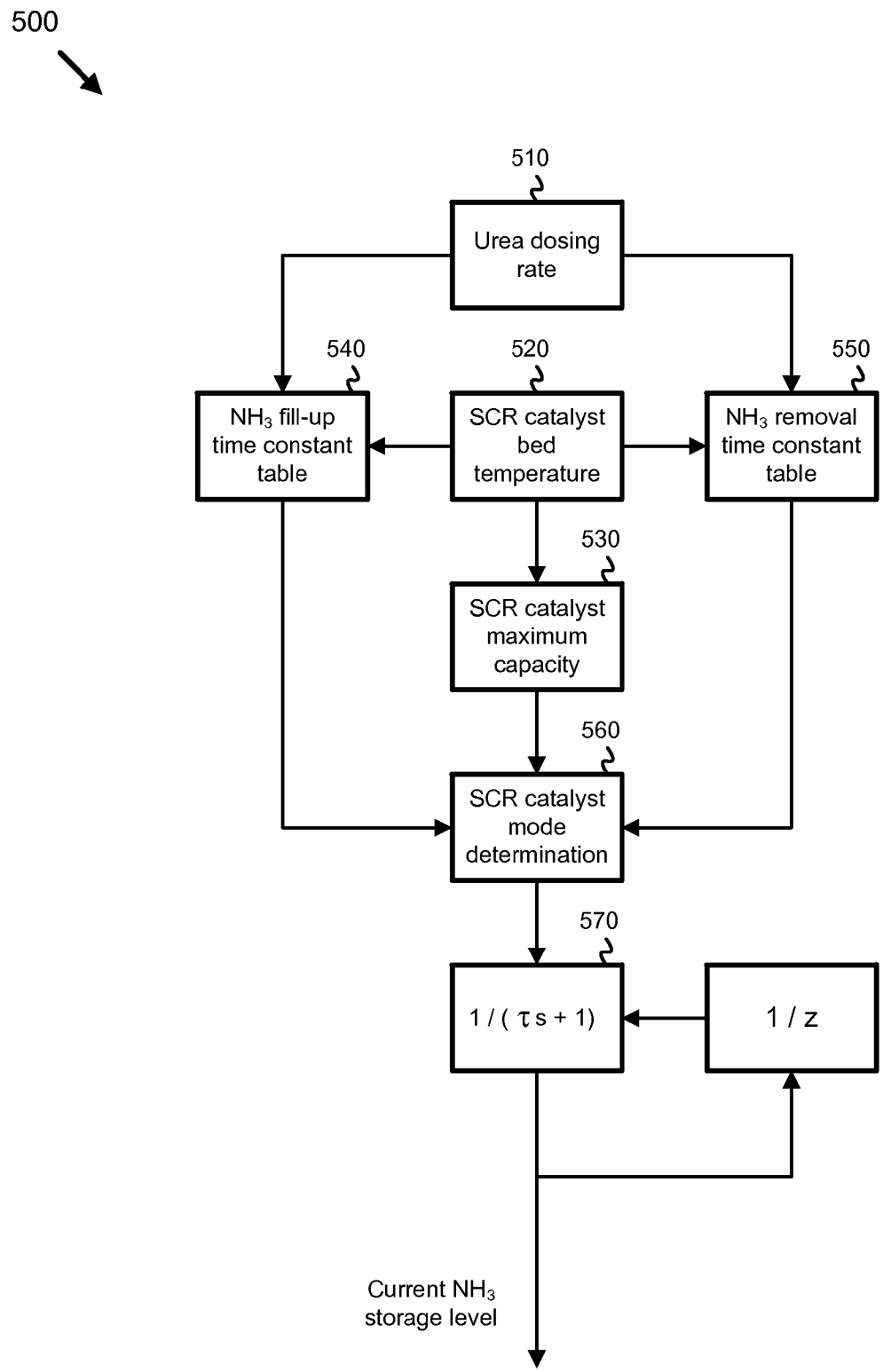
FIG. 12 is a schematic flow chart diagram of a control system operable to determine the storage level of ammonia on an SCR catalyst.

According to one embodiment, the current NH$_3$ storage level module 354 determines the estimated current NH$_3$ storage level 370 by utilizing, at least in part, the current condition of the SCR catalyst bed, the size and properties of the SCR catalyst bed, and the ammonia flux entering the SCR catalyst. Referring to FIG. 12, and according to one exemplary embodiment, the NH$_3$ storage level module 354 utilizes the schematic flow chart 500 to determine the current NH$_3$ storage level 370 on the SCR catalyst 152. The reductant target module 330 is operable to determine the reductant injection requirement 332, e.g., urea dosing rate, at 510. Alternatively, the current NH$_3$ storage level module 354 is communicable in data receiving communication with the reductant delivery mechanism 190 for receiving the current reductant dosing rate 383. The SCR catalyst bed temperature sensor 124C senses, or a bed temperature module estimates, the temperature of the SCR catalyst bed temperature at 520.

Based at least partially on the temperature of the SCR catalyst bed as determined at 520, the NH$_3$ maximum storage capacity 374 is generated by the current NH$_3$ storage level module 354 at 530. The NH$_3$ maximum storage capacity 374 is dependent on the temperature of the SCR catalyst bed and can be determined by comparing the SCR catalyst bed temperature against a pre-calibrated look-up table. The urea dosing rate, which corresponds to the ammonia flux entering the SCR catalyst 152, and SCR catalyst bed temperature are used to determine an NH$_3$ fill-up or adsorption time constant and the SCR catalyst bed temperature and NO$_x$ flux are used to determine an NH$_3$ removal or desorption time constant. The time constants can be retrieved from respective look-up tables 540, 550 stored on, for example, the current NH$_3$ storage level module 354.

A determination of the SCR catalyst mode is made at 560. Based on whether the SCR catalyst 152 is in an NH$_3$ fill-up mode or an NH$_3$ removal mode, the corresponding time constant ($\tau$) is used to calculate the current NH$_3$ storage level (NH$_3$Storage) at 570 according to the following first order dynamics equation:

$$\mathrm{NH_3 Storage} = \mathrm{NH_3 Storage}_{MAX}\left(\frac{1}{\tau s + 1}\right) \tag{16}$$

where NH$_3$Storage$_{MAX}$ is the NH$_3$ maximum storage capacity 374 of the SCR catalyst 152 and s is the complex variable used for Laplace transforms. In other words, if it is determined at 560 that more ammonia should be stored on the SCR catalyst 152, the NH$_3$ adsorption time constant determined at 540 is used in Equation 16 to determine the current NH$_3$ storage level 370. Alternatively, if it is determined at 560 that ammonia should be removed from the SCR catalyst 152, the NH$_3$ desorption time constant determined at 550 is used in Equation 16 to determine the current NH$_3$ storage level 370.

Accordingly, the current $NH_3$ storage level 370 is at least partially based on the ammonia flux, temperature of the catalyst and degradation of the catalyst.

In at least one embodiment, the storage mode, e.g., fill-up or removal mode, of the SCR catalyst 152 is determined by the $NH_3$ storage module 350 by comparing the $NH_3$ maximum storage capacity 374 with the current $NH_3$ storage level 370. If the $NH_3$ maximum storage capacity 374 is less than the current $NH_3$ storage level 370 then the SCR catalyst 152 is in the desorption mode. Similarly, if the $NH_3$ maximum storage capacity 374 is more than the current $NH_3$ storage level 370 then the SCR catalyst 152 is in the adsorption mode.

The look-up tables utilized at 540, 550 include a listing of the adsorption and desorption time constants, respectively, corresponding to various possible urea dosing rates and SCR catalyst bed temperatures. In certain implementations, the adsorption time constants can be calibrated using steady-state testing. For example, the engine 11 can be run at specific steady state modes such that the temperature of SCR catalyst bed reaches and is held at a specific temperature corresponding to each mode. Prior to reaching each mode, the SCR catalyst 152 is clean such that the catalyst bed does not contain stored ammonia, i.e., the amount of $NO_x$ coming out of the engine is the same as the amount of $NO_x$ coming out of the SCR catalyst. For each respective mode, the reductant target module 330 is operable to communicate to the reductant delivery mechanism 190 to inject an amount of reductant necessary to achieve 100% conversion of $NO_x$. The amount of reductant can vary for different stoichiometric reactions rates ranging, for example, between about 0.5 to about 2.0. The amount of time between the initial reductant dosing and ammonia slippage from the SCR catalyst 152 is determined for each mode at each stoichiometric reaction dosing rate and used to calibrate the adsorption time constants in the $NH_3$ fill-up time constant table.

The desorption time constants in the $NH_3$ removal time constant table can be calibrated during the same test used for calibrating the adsorption time constants. For example, after $NH_3$ begins to slip from the SCR catalyst 152 as described above, the $NH_3$ slip and $NO_x$ leaving the SCR catalyst are monitored until they stabilize or become constant. Once the $NH_3$ slip and SCR catalyst outlet $NO_x$ are stable, the urea dosing is discontinued and the amount of time between discontinuation of urea dosing and the SCR catalyst outlet $NO_x$ to equal the engine outlet $NO_x$ is determined for each mode at each stoichiometric reaction dosing rate.

If desired, the adsorption and desorption time constants can be further calibrated to compensate for transient operation of the engine 11. For example, the Fourier Transform Infrared (FTIR) measurements of ammonia slip values and the time between the beginning of a transient FTP cycle and slippage from the SCR catalyst can be used to fine-tune the adsorption and desorption time constants. More specifically, the time constants can be adjusted based on a least squares approach that can provide the best first order model fit to the transient data.

The target $NH_3$ storage level module 356 is operable to determine a target $NH_3$ storage level based at least in part on the $NH_3$ maximum storage capacity 374 determined by the current $NH_3$ storage level module 354. Generally, the target $NH_3$ storage level module 356 determines the target $NH_3$ storage level by multiplying the $NH_3$ maximum storage capacity 374 by an ammonia storage level fraction. The ammonia storage level fraction can be any of various fractions, such as fifty percent, seventy-five percent, ninety percent, and one-hundred percent. The ammonia storage level fraction is F determined based at least partially on the SCR catalyst degradation factor and user defined maximum allowable ammonia slip.

Once the current $NH_3$ storage level 370 and the target $NH_3$ storage level are determined, the $NH_3$ storage module 350 utilizes the current $NH_3$ storage level 370 as feedback and compares the current $NH_3$ storage level and the target $NH_3$ storage level. If the current $NH_3$ storage level is less than the target $NH_3$ storage level, the ammonia storage modifier 352 is set to a positive value. If the current $NH_3$ storage level 370 is more than the target $NH_3$ storage level, the ammonia storage modifier 352 is set to a negative value. The positive and negative values can vary depending on how much less or more the current $NH_3$ storage level 370 is compared to the target $NH_3$ storage level. The ammonia storage modifier 352 is communicated to the ammonia target module 310 (see FIG. 5). An ammonia storage modifier 352 with a positive value indicates to the ammonia target module 310 that the ammonia addition requirement 326 should be correspondingly increased. In contrast, an ammonia storage modifier 352 with a negative value indicates to the ammonia target module 310 that the ammonia addition requirement 326 should be correspondingly decreased.

The amount of $NH_3$ storage on the catalyst 152 can be controlled by controlling any of various inputs into the SCR system 150. For example, referring to FIG. 12, the amount of ammonia storage on the SCR catalyst 152 is dependent on the following separately controllable factors: the urea dosing rate, the SCR catalyst bed temperature, and the SCR catalyst maximum capacity. Accordingly, the controller 130 can be operable to selectively or cooperatively control the current $NH_3$ storage level on the SCR catalyst 152.

The ammonia storage modifier 352 also can be adjusted according to the current $NH_3$ storage slip 372, the presence or absence of an AMOX catalyst, such as AMOX catalyst 160, and if an AMOX catalyst is used, the conversion capability 382 of the AMOX catalyst.

Figure 13:
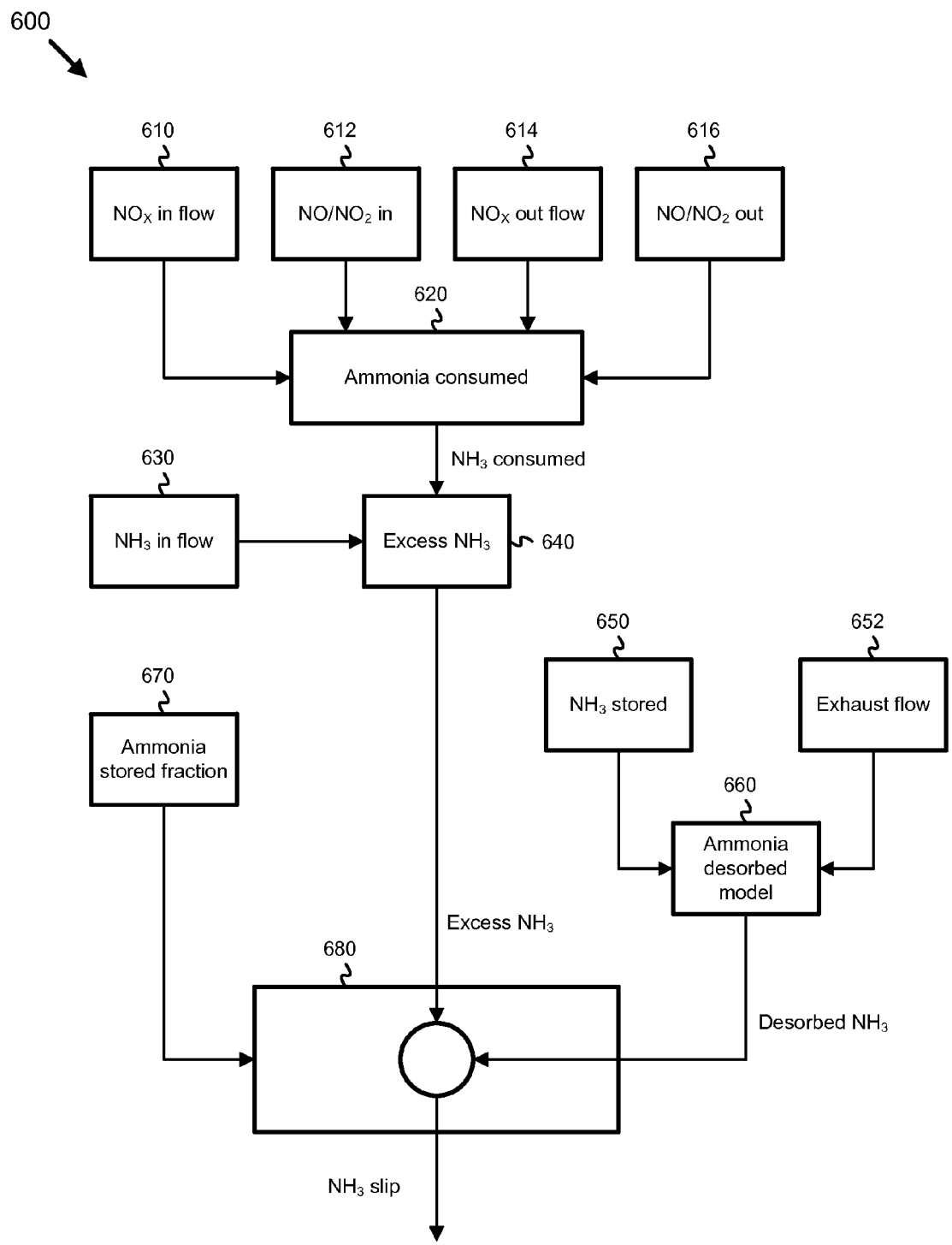
FIG. 13 is a schematic flow chart diagram of a control system operable to determine the amount of ammonia slip from an SCR catalyst.

According to one embodiment, the SCR catalyst ammonia slip module 369 determines the estimated current $NH_3$ slip 372 from the SCR catalyst 152 by utilizing, at least in part, the ammonia and $NO_x$ flux entering the catalyst, the size and properties of the SCR catalyst bed, and the ratio of NO to $NO_2$. Referring to FIG. 13, and according to one exemplary embodiment, the ammonia slip module 369 utilizes the schematic flow chart 600 to determine the current $NH_3$ slip 372 from the SCR catalyst 152. The amount of $NO_x$ at the inlet of the SCR catalyst 152 is determined at 610 and the amount of $NO_x$ at the outlet of the SCR catalyst is determined at 614. The $NO_x$ inlet amount can be sensed by the $NO_x$ sensor 164A and/or 164E and the $NO_x$ outlet amount can be sensed by the $NO_x$ sensor 164C or $NO_x$ sensor 164D. In certain implementations, the $NO_x$ levels within the SCR catalyst as sensed by the $NO_x$ sensor 164B can be used by the SCR catalyst ammonia slip module 369 to obtain an even more accurate estimation of the ammonia slipping from the SCR catalyst 152.

The $NO_x$ sensor 164B, when embedded within the SCR catalyst 152, provides several advantages over prior art systems. For example, placing the $NO_x$ sensor 164B inside the SCR catalyst 152 improves the monitoring of stored ammonia on the catalyst by reducing the signal-to-noise ratio of the $NO_x$ sensor. The $NO_x$ sensor 164B can be used with other $NO_x$ sensors in the exhaust aftertreatment system 100, e.g., $NO_x$ sensors 164C, 164E, to quantify the spatial distribution of stored ammonia on the SCR catalyst 152. In certain embodiments, the SCR catalyst 152 includes two spaced-apart ceramic catalyst elements or beds extending parallel to each other. The embedded NOx sensor 164B can be positioned between the beds, e.g., within the space between the beds, at any location along a length of the SCR catalyst 152. In certain instances, the embedded NOx sensor 164B is positioned between the beds at an approximately central location between the ends of the SCR catalyst 152.

To account for any degradation of the sensor 164D, the output of the $NO_x$ sensor 164D can be corrected by a corrected tailpipe $NO_x$ module 397. The ratio of NO to $NO_2$ in the exhaust gas stream at the inlet of the SCR catalyst 152 is determined at 612 and the ratio of NO to $NO_2$ in the exhaust gas stream at the outlet of the SCR catalyst is determined at 616. In some implementations, the SCR catalyst $NO_2/NO_x$ ratio module 366 is operable to determine the NO to $NO_2$ ratios at the inlet and outlet of the SCR catalyst 152, respectively.

At 620, the amount of ammonia consumed within the SCR catalyst 152 is calculated based on the net loss, e.g., conversion, of NO and $NO_2$ from the exhaust gas stream. In some implementations, the calculation is performed by the current $NH_3$ storage level module 354. Based at least partially on the flow of $NH_3$ into the SCR catalyst 152 determined at 630 and the amount of ammonia consumed within the SCR catalyst 152, the excess amount of $NH_3$ within the SCR catalyst is estimated at 640. As described above, the amount of $NH_3$ flowing into the SCR catalyst 152 can be determined by utilizing flow chart 400 of FIG. 10.

Further, based at least partially on the current $NH_3$ storage level 370 determined at 650, the flow rate of the exhaust gas stream into and through the SCR catalyst 152 determined at 652, and the temperature of the SCR catalyst bed determined at 653, the amount of ammonia desorbed from the bed of the SCR catalyst 152 is estimated at 660. Generally, desorption of ammonia occurs when there is a specific increase in the temperature of the SCR catalyst bed. The amount of temperature increase necessary to effect desorption of ammonia is at least partially dependent on the condition and type of SCR catalyst being used. As shown in FIG. 11, the current $NH_3$ storage level module 354 can include the desorbed $NH_3$ module 375, which is operable to estimate the amount of ammonia desorbed from the bed of the SCR catalyst 152. In certain implementations, the $NH_3$ storage level module 354 estimates the amount of ammonia desorbed from the SCR catalyst bed based on the excess $NO_x$ flux available for reduction reaction on the SCR catalyst surface.

Based at least partially on the excess amount of $NH_3$ within the SCR catalyst 152, the amount of $NH_3$ desorbed from the SCR catalyst bed, and the amount of $NH_3$ stored on the SCR catalyst relative to the $NH_3$ maximum storage capacity 374 of the catalyst, i.e., the fraction of the SCR catalyst occupied by stored ammonia, the amount of $NH_3$ slipping from the SCR catalyst is estimated at 680. The amount of $NH_3$ slipping from the SCR catalyst 152 is equal to the sum of the excess amount of $NH_3$ determined at 640 and the desorbed amount of $NH_3$ determined at 660. The fraction of the SCR catalyst occupied by stored ammonia is determined at 670 by dividing the $NH_3$ stored on the catalyst as determined at 650 by the $NH_3$ maximum storage capacity determined, for example, at 530 of flow diagram 500. Generally, if the total amount of $NH_3$ stored on the SCR catalyst 152 is greater than the $NH_3$ maximum storage capacity 374, i.e., the ammonia stored fraction determined at 670 is greater than one, then ammonia slip from the catalyst is occurring and the amount of slip is determined at 680. If the total amount of $NH_3$ within the SCR catalyst is less than the $NH_3$ maximum storage capacity 374, i.e., the ammonia stored fraction is less than one, then ammonia slip is not occurring and the amount of ammonia slip is not calculated at 680. In other words, the model used to compute the ammonia slip at 680 does not become active until the SCR catalyst 152 is full with ammonia, or the SCR catalyst bed temperature and rate of increase of the SCR catalyst bed temperatures are above predetermined thresholds.

The amount of $NH_3$ slip from the catalyst 152 can be controlled by controlling any of various inputs into the SCR system 150. For example, referring to FIG. 13, the amount of ammonia slip from the SCR catalyst 152 is dependent on the following separately controllable factors: the amount of $NH_3$ flowing into the SCR catalyst as determined at 630; the exhaust flow rate as determined at 652; and the current $NH_3$ storage level as determined using flow chart 500. Accordingly, the controller 130 can be operable to selectively or cooperatively control the $NH_3$ slip from the SCR catalyst.

If the current $NH_3$ storage slip 372 is relatively high, such as when the temperature of the SCR catalyst bed exceeds a predetermined level, then the $NH_3$ storage module is operable to decrease the ammonia storage modifier 352. In contrast, if the current $NH_3$ storage slip 372 is relatively low, then the $NH_3$ storage module is operable to increase or hold steady the ammonia storage modifier 352.

AMOX Ammonia Conversion Module

Figure 14:
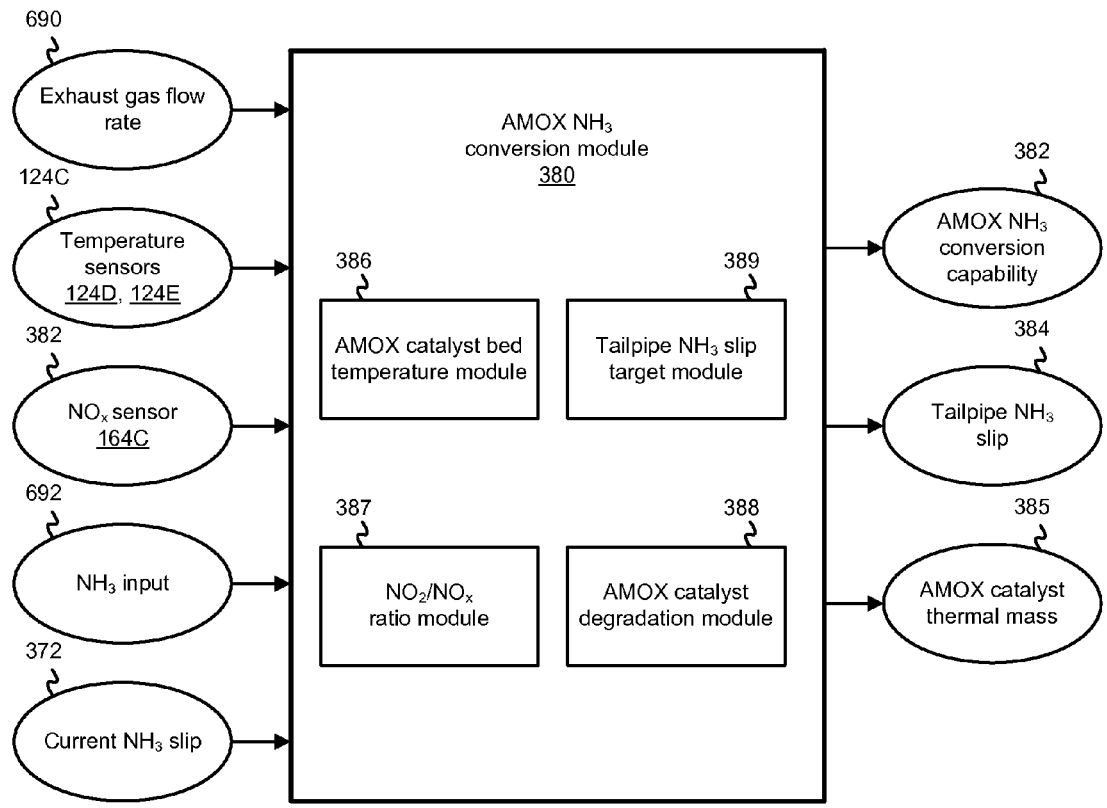
FIG. 14 is a schematic block diagram of an AMOX catalyst ammonia conversion module of the controller of FIG. 3 according to one representative embodiment.

According to one embodiment shown in FIG. 14, the AMOX $NH_3$ conversion module 380 determines an AMOX $NH_3$ conversion capability or efficiency 382, a tailpipe $NH_3$ slip 384 and an AMOX catalyst thermal mass 385. Generally, the $NH_3$ conversion capability 382 represents an estimate of the ability of the AMOX catalyst 160 to convert $NH_3$ to $N_2$ and other less harmful or less noxious components. The tailpipe $NH_3$ slip 384 represents an estimate of the amount of $NH_3$ exiting the AMOX catalyst 160. As will be described in more detail below, the AMOX thermal mass 385 is a measure of the AMOX catalyst's ability to conduct and store heat.

The AMOX $NH_3$ conversion module 380 receives input regarding the exhaust gas flow rate 690 entering the AMOX catalyst 160 and the amount of $NH_3$ entering the AMOX catalyst. In some implementations, the exhaust gas flow rate 700 is determined by the SCR catalyst inlet exhaust properties module 358 of current $NH_3$ storage level module 354 (see FIG. 11) or other similar module. The amount of $NH_3$ entering the AMOX catalyst 160 can be represented by an $NH_3$ input 690 and/or the current $NH_3$ slip 372. More specifically, in some implementations, the AMOX $NH_3$ conversion module 380 is communicable in data receiving communication with the current $NH_3$ storage level module 354 to receive the current $NH_3$ slip 372. In these implementations, the amount of $NH_3$ entering the AMOX catalyst 160 can be set to the current $NH_3$ slip 372. In some implementations, the control system 150 can include an $NH_3$ sensor between the SCR catalyst 152 and the AMOX catalyst 160. In these implementations, the amount of $NH_3$ entering the AMOX catalyst 160 can be set to the output of the $NH_3$ sensor. Alternatively, in certain instances, the amount of $NH_3$ entering the AMOX catalyst 160 can be set to a combination of the current $NH_3$ slip 372 and the output of the $NH_3$ sensor, such as an average of the current $NH_3$ slip 372 and the output of the $NH_3$ sensor. The AMOX $NH_3$ conversion module 380 can also be communicable in data receiving communication with various other sensors, such as temperature sensors 124D, 124E and $NO_x$ sensor 164C.

The AMOX $NH_3$ conversion module 380 includes several modules including, but not limited to, an AMOX catalyst bed temperature module 386, an $NO_2/NO_x$ ratio module 387, an AMOX catalyst degradation module 388, and a tailpipe $NH_3$ slip target module 389.

The AMOX catalyst bed temperature module 386 is operable to estimate the temperature of the AMOX catalyst bed. In one implementation, the AMOX catalyst bed temperature module 386 utilizes the input from the temperature sensors 124D, 124E to determine the difference between the temperature of the exhaust at the inlet of the AMOX catalyst 160 and the temperature of the exhaust at the outlet of the AMOX catalyst. Based at least partially on the temperature differential and mass flow rate properties of the exhaust gas stream, the AMOX catalyst bed temperature module 386 calculates the temperature of the AMOX catalyst bed. Alternatively, or in addition to estimating the AMOX catalyst bed temperature as described above, the SCR system 150 can include a temperature sensor (not shown) coupled to the AMOX catalyst 160. The AMOX catalyst bed temperature module 386 can utilize the output of the AMOX catalyst temperature sensor to determine the temperature of the AMOX catalyst bed.

Similar to the SCR catalyst $NO_2/NO_x$ ratio module 366 of the current $NH_3$ storage level module 354, the $NO_2/NO_x$ ratio module 387 of the AMOX $NH_3$ conversion module 380 is operable to determine the ratio of $NO_2$ to $NO_x$ according to Equation 1 above, where $NO_2$ is the amount of nitrogen dioxide at the inlet of the AMOX catalyst 160 and $NO_x$ is the amount of nitrogen oxide at the inlet of the AMOX catalyst as sensed by the $NO_x$ sensor 164C.

Similar to the SCR catalyst degradation factor module 368 of current $NH_3$ storage level module 354, the AMOX catalyst degradation module 388 is operable to determine an AMOX catalyst degradation factor indicating the condition of the AMOX catalyst. In certain implementations, the catalyst degradation factor is determined by an algorithm that compares the conversion efficiency of the "aged" AMOX catalyst at predetermined engine operating conditions and urea dosing rates with the conversion efficiency of a "fresh" AMOX catalyst under the same predetermined conditions and dosing rates.

The tailpipe $NH_3$ slip target module 389 is operable to determine a tailpipe $NH_3$ slip target, i.e., the desired amount of $NH_3$ allowed to exit the AMOX catalyst 160. The tailpipe $NH_3$ slip target is based at least partially on a desired average amount of $NH_3$ slip from the AMOX catalyst and/or a desired maximum amount of $NH_3$ slip from the AMOX catalyst. In some instances, both the desired average amount of $NH_3$ slip from the AMOX catalyst and desired maximum amount of $NH_3$ slip from the AMOX catalyst are used to ensure that actual tailpipe slip levels remain below a human detectable threshold. Further, the tailpipe $NH_3$ slip target can be based on other factors, such as current emissions standards and customer-based specifications.

Based at least partially on at least one of the flow rate of exhaust, $NO_x$, and ammonia entering the AMOX catalyst 160, the temperature of the AMOX catalyst bed, the ratio of $NO_2/NO_x$ at the inlet of the AMOX catalyst, the catalyst degradation factor, and the tailpipe $NH_3$ slip target, the AMOX $NH_3$ conversion module 380 estimates the AMOX $NH_3$ conversion capability 382, the tailpipe $NH_3$ slip 384, and the AMOX catalyst thermal mass 385. For example, in some implementations, the AMOX $NH_3$ conversion capability 382 and the tailpipe $NH_3$ slip 384 are dependent on the amount of $NO_x$ entering the AMOX catalyst, the temperature of the AMOX catalyst, and a space velocity of the AMOX catalyst. Further, in some instances, the AMOX catalyst thermal mass 385 is based at least partially on the geometric dimensions of the AMOX catalyst, and the material properties of the AMOX catalyst, such as the thermal conductivity and volumetric heat capacity of the AMOX catalyst. In some instances, the AMOX $NH_3$ conversion capability 382, the tailpipe $NH_3$ slip 384, and the AMOX catalyst thermal mass 385 can be estimated by accessing a multi-dimensional, pre-calibrated look-up table stored on the controller 130.

Generally, the higher the AMOX catalyst conversion capability 382, the more tolerance the SCR system 150 has to $NH_3$ slipping from the SCR catalyst 152. Accordingly, if the AMOX catalyst conversion capability 382 is relatively high, more $NH_3$ can be allowed to slip from the SCR catalyst 152. However, with more $NH_3$ slipping from the SCR catalyst 152, more $NH_3$ storage sites on the surface of the SCR catalyst 152 may be vacant, thus requiring an increase in the ammonia addition requirement 326. In such an instance, the $NH_3$ storage module 350 can increase the ammonia storage modifier 352, which in turn can increase the ammonia addition requirement 326. In contrast, when the AMOX catalyst conversion capability 382 is relatively low, less $NH_3$ slippage from the SCR catalyst 152 is tolerated, resulting in less $NH_3$ removed from storage on the SCR catalyst. If more $NH_3$ slips from the SCR catalyst 152 and the AMOX catalyst conversion capability 382 is relatively low, the tailpipe $NH_3$ slip may correspondingly increase. Therefore, in these instances, the $NH_3$ storage module 350 can decrease or hold steady the ammonia storage modifier 352 to decrease or hold-steady the ammonia addition requirement 326, and/or the AMOX $NH_3$ conversion module 380 can modulate the effectiveness of the AMOX catalyst 160, such that tailpipe $NH_3$ slip is controlled.

In some implementations, the AMOX catalyst thermal mass value 385 is F c dependent on the material properties of the AMOX catalyst bed, such as thermal conductivity and volumetric heat capacity. Generally, the thermal mass 385 is a measure of the AMOX catalyst's ability to conduct and store heat. The AMOX $NH_3$ conversion module 380 can communicate the AMOX catalyst thermal mass value 385 to the $NH_3$ storage module 350, which can use the thermal mass value in its determination of the ammonia storage modifier 352.

As described above, the AMOX $NH_3$ conversion capability and AMOX catalyst thermal mass 385 is communicated to and processed by various other modules of the controller 130. For example, the AMOX $NH_3$ conversion capability 382 and AMOX catalyst thermal mass 385 is received by the $NH_3$ storage module 350 and used to determine the ammonia storage modifier 352 (see FIG. 10). Further, the AMOX $NH_3$ conversion capability 382 is used by the corrected tailpipe $NO_x$ module 399 to determine the tailpipe $NO_x$ feedback value 399 (see FIG. 16).

The tailpipe $NH_3$ slip 384 determined by the AMOX embedded model $NH_3$ conversion module 380 can be communicated to other modules of the controller 130. For example, the determined tailpipe $NH_3$ slip 384 can be communicated to the reductant modifier module 390 (see FIG. 15) and corrected tailpipe $NO_x$ module 397 (see FIG. 16) to replace or supplement the tailpipe $NH_3$ slip measurement input communicated from the $NH_3$ sensor 166C. For example, in certain instances, the input value for the tailpipe $NH_3$ into the modules 390, 397 can be an average of the determined tailpipe $NH_3$ slip 384 and the tailpipe $NH_3$ slip measurement from the sensor 166C to provide a more accurate indication of the actual amount of $NH_3$ slipping from the tailpipe.

Reductant Modifier Module

Referring to FIG. 15, the reductant modifier module 390 is operable to determine a reductant modifier requirement 342 based at least in part on whether any of F various reductant limiting conditions have been met. The reductant modifier module 390 includes a reductant modifier conditions module 394 and an SCR catalyst inlet exhaust properties module 395. Generally, the reductant modifier module 390 is operable to either reduce reductant dosing, prevent reductant dosing or leave reductant dosing unchanged when certain predetermined conditions of the exhaust aftertreatment system 100 are met.

The reductant modifier conditions module 394 is operable to monitor the operating conditions of the engine system 10 and determine if one or more reductant limiting conditions are met. In some embodiments, the reductant limiting conditions include, but are not limited to, an exhaust gas temperature limit, an ammonia slip reductant rate limit, and an SCR catalyst bed temperature limit. In some embodiments, the reductant limiting conditions can include the degradation of the reductant doser 192. The degradation of the reductant doser 192 can be determined by any of various methods, such as described in U.S. Provisional Patent Application No. 61/120,304 discussed above.

Reductant dosing at high exhaust gas temperatures can cause cyanuric acid and polymers (e.g., melamine) to form on the injector and exhaust pipe walls, which can lead to performance degradation of and damage to the system. For example, the formation of melamine can clog the nozzle. To prevent cyanuric acid from forming, the reductant modifier module 390, including the reductant modifier conditions module 394, monitors the exhaust gas temperature and prevents reductant dosing, e.g., via instructions in the reductant modifier requirement 342, if the exhaust gas temperature exceeds a predetermined exhaust gas temperature limit. The current exhaust gas temperature can be sensed by at least one of the temperature sensors, e.g., exhaust temperature sensor 124C and/or predicted by an SCR catalyst inlet exhaust properties module 395 similar to module 358.

Reductant dosing at high SCR catalyst storage levels and SCR catalyst bed temperature ramps can cause ammonia to slip from the SCR catalyst 152. To reduce ammonia slip in these situations, the reductant modifier module 390 monitors the current $NH_3$ storage level 370 and the modulations of the SCR catalyst bed temperature as sensed by the temperature sensor 124D (or predicted by an SCR catalyst bed temperature module as described above). If the current $NH_3$ storage level 370 exceeds a predetermined $NH_3$ storage level associated with $NH_3$ slip, or if the modulation in SCR catalyst bed temperature exceeds a predetermined SCR catalyst bed temperature change, then the reductant modifier module reduces the reductant dosing rate, e.g., via instructions in the reductant modifier requirement, such that $NH_3$ slip from the SCR catalyst 152 is controlled.

The reductant modifier module 390 is also operable to prevent reductant dosing in the event a specific component or components of the SCR system 150 has malfunctioned or is otherwise not ready for operation.

Corrected Tailpipe $NO_x$ Module

Figure 16:
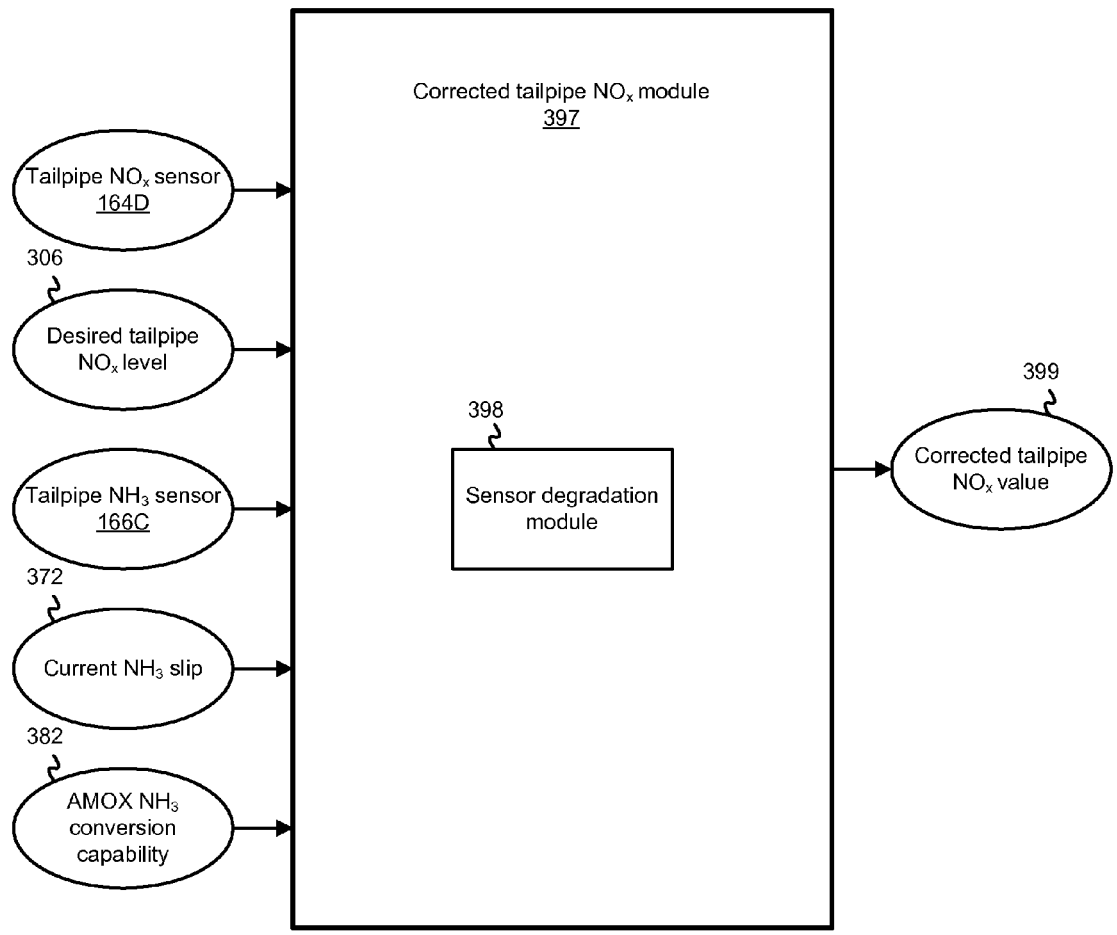
FIG. 16 is a schematic block diagram of a corrected tailpipe $NO_x$ module of the reductant modifier module of FIG. 15 according to one representative embodiment.

Referring to FIG. 16, the corrected tailpipe $NO_x$ module 397 of the controller 130 is operable to determine the corrected tailpipe $NO_x$ value 399. The corrected tailpipe $NO_x$ module 397 is communicable in data receiving communication with the tailpipe $NO_x$ sensor 164D and tailpipe $NH_3$ sensor 166C. The corrected tailpipe $NO_x$ module 397 is also communicable in data receiving communication with the current $NH_3$ storage level module 354 to receive the estimated current $NH_3$ slip 372 or the estimated amount of $NH_3$ exiting the SCR catalyst 152. Further, the corrected tailpipe $NO_x$ module 397 is communicable in data receiving communication with the AMOX $NH_3$ conversion module 380 to receive the AMOX $NH_3$ conversion capability 382. The corrected tailpipe $NO_x$ module 397 also includes a sensor degradation module 398 that is operable to determine a tailpipe $NO_x$ sensor degradation factor based at least partially on the type of sensor, age of sensor, and operating conditions of the engine system 10. In some instances, the tailpipe $NO_x$ sensor degradation factor is determined by an algorithm that compares the $NO_x$ sensor measurements at pre-determined operating conditions having known $NO_x$ values. The degradation factor indicates an amount, e.g., a percentage, the measured $NO_x$ sensor value should be adjusted to account for degradation of the $NO_x$ sensor and inaccuracies associated with the degraded $NO_x$ sensor measurements. In some implementations, the corrected tailpipe $NO_x$ value is about is about 10% higher than the measured tailpipe $NO_x$ value.

The corrected tailpipe $NO_x$ module 397 processes the sensed tailpipe $NO_x$ amount, the sensed tailpipe $NH_3$ amount, the estimated $NH_3$ slip 372, the $NO_x$ sensor degradation factor, and the AMOX conversion capability 382 to determine the corrected tailpipe $NO_x$ value 399.

The corrected tailpipe $NO_x$ value 399 can replace the sensed amount of $NO_x$ detected by the tailpipe $NO_x$ sensor 164D in the reductant modifier requirement 342 calculation by the reductant modifier module 390 for a more accurate indication of the amount of $NO_x$ leaving the tailpipe and a more accurate reductant modifier requirement. Additionally, the corrected tailpipe $NO_x$ value 399 can be communicated to and processed by the current $NH_3$ storage level module 354.

Figure 17A:
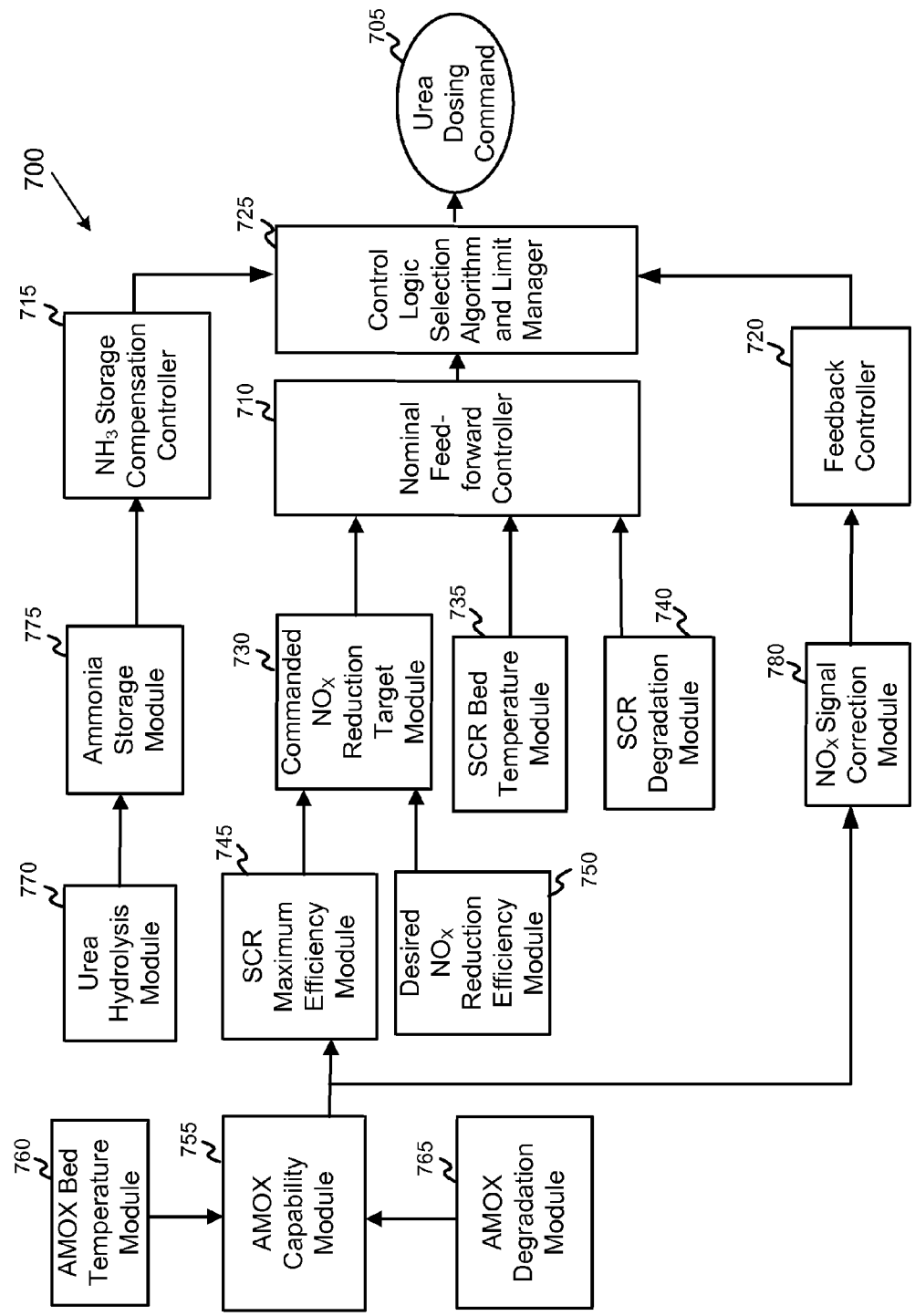
FIG. 17A is a schematic flow diagram of a $NO_x$ reduction controls strategy according to one representative embodiment.

Referring to FIG. 17A, a block diagram illustrating a controls strategy 700 for determining a urea dosing command 705 according to the optimum $NO_x$ conversion mode discussed above is shown. The controls strategy 700 includes a nominal feedforward controller 710, an ammonia storage compensation controller 715, and a feedback controller 720. Outputs from the controllers 710, 715, 720 are received by a control logic selection algorithm and limit manager 725, which determines the urea dosing command 705 based at least partially on the outputs. In specific implementations, the feedforward controller 710 includes the feedforward ammonia target module 310 and reductant target module 330, the ammonia storage compensation controller 715 includes the $NH_3$ storage module 350, the feedback controller 720 includes the feedback ammonia target module 344, and the control logic selection algorithm and limit manager 725 includes the reductant modifier module 390. In certain implementations, the output of the feedforward controller 710 includes the ammonia addition requirement 326, the output of the ammonia storage compensation controller 715 includes the ammonia storage modifier 352, and the output from the feedback controller 720 includes the ammonia addition requirement 348. Each of the ammonia addition requirement 326, ammonia storage modifier 352, and ammonia addition requirement 348 corresponds with a specific reductant dosing amount. Accordingly, the control logic selection algorithm and limit manager 725 compares the reductant dosing amounts associated with the ammonia addition requirement 326, ammonia storage modifier 352, and ammonia addition requirement 348 to determine the final or commanded urea dosing amount 705. In certain implementations, the limit manager 725 includes a module to determine the degradation of the doser 192 and factor the degradation of the doser into the final urea dosing amount to account for any degradation of the doser.

The controls strategy 700 also includes a commanded $NO_x$ reduction target module 730, and SCR bed temperature module 735, and an SCR degradation module 740. According to one embodiment, the commanded $NO_x$ reduction target module 730 includes the $NO_x$ reduction target module 300 and provides the nominal feedforward controller 710 with the $NO_x$ reduction requirement 304. The SCR bed temperature module 735 can include the SCR catalyst bed temperature module 318 and provides a predicted temperature of the SCR catalyst bed to the nominal feedforward controller 710. Alternatively, the SCR bed temperature module 735 includes a SCR catalyst temperature sensor to provide the nominal feedforward controller 710 with a sensed SCR catalyst temperature. The SCR degradation module 740 can include the SCR catalyst degradation factor module 368 and supply the nominal feedforward controller 710 with an SCR catalyst degradation indicator. The nominal feedforward controller 710 can utilize the $NO_x$ reduction requirement 304, temperature of the SCR catalyst bed, and SCR catalyst degradation indicator to determine the ammonia addition requirement 326.

The controls strategy 700 also includes an SCR maximum efficiency module 745 and desired $NO_x$ reduction efficiency module 750. The SCR maximum efficiency module 745 can include the $NO_x$ reduction efficiency module 312 and provide the commanded $NO_x$ reduction target module 730 with the maximum efficiency of $NO_x$ reduction on the SCR catalyst 152. The desired $NO_x$ reduction efficiency module 750 can determine and provide to the commanded $NO_x$ reduction target module 730 a desired NOx conversion efficiency as discussed above. The commanded $NO_x$ reduction target module 730 can utilize the maximum efficiency of $NO_x$ reduction on the SCR catalyst 152 and the desired $NO_x$ conversion efficiency to determine the $NO_x$ reduction requirement 304. The SCR maximum efficiency module 745 can determine the maximum efficiency of $NO_x$ reduction on the SCR catalyst 152 based on an $NH_3$ conversion capability of the AMOX catalyst 160 received from an AMOX capability module 755. The AMOX capability module 755 can include the AMOX $NH_3$ conversion module 380 in some embodiments. As shown, AMOX capability module 755 receives input from an AMOX catalyst bed temperature module 760 and an AMOX catalyst degradation module 765. The AMOX catalyst bed temperature module 760 can include the AMOX catalyst bed temperature module 386 and provide a prediction of the AMOX catalyst bed temperature as input to the AMOX capability module 755. Similarly, the AMOX catalyst degradation module 765 can include the AMOX catalyst degradation module 388 and provide a prediction of the degradation of the AMOX catalyst as input to the AMOX capability module 755.

The controls strategy 700 can also include a urea hydrolysis module 770 and an ammonia storage module 775. The urea hydrolysis module 770 can include the reductant hydrolysis module 333 in some embodiments and provide an estimation of the amount of $NH_3$ and HNCO entering the SCR catalyst 152 to the ammonia storage module 775. The ammonia storage module 775 can include the current $NH_3$ storage level module 354 and provide the $NH_3$ storage compensation controller 715 with the amount of ammonia stored on the SCR catalyst. The $NH_3$ storage compensation controller 715 can determine the ammonia addition requirement 326 based at least partially on the amount of ammonia stored on the SCR catalyst.

Further, the controls strategy 700 includes a $NO_x$ signal correction module 780. In one embodiment, the $NO_x$ signal correction module 780 includes the corrected tailpipe $NO_x$ module 397 and provides the feedback controller 720 with a corrected tailpipe $NO_x$ value 399. The feedback controller 720 determines the ammonia addition requirement 348 based at least partially on the corrected tailpipe $NO_x$ value 399.

As shown in FIG. 17A, the SCR degradation module 740, AMOX degradation module 765, $NO_x$ signal correction module 780, which can include the corrected tailpipe $NO_x$ module 397 for determining the degradation of a $NO_x$ sensor, and limit manager 725, which can include a module for determining the degradation of the reductant doser 192, are independent or decentralized modules. As opposed to a centralized or localized module in which the degradation of the SCR catalyst, AMOX catalyst, $NO_x$ sensor, and reductant doser are determined together as a function of each other at the same level, the decentralized degradation modules of the strategy 700 determine the degradation of the SCR catalyst, AMOX catalyst, $NO_x$ sensor, and reductant doser independent of each other at different levels. Because the modules are decentralized, they can be independently calibrated and updated at the same time or different times. Accordingly, decentralized degradation modules provide enhanced flexibility in comparison to one centralized module.

In certain embodiments, the nominal feedforward controller 710, ammonia storage compensation controller 715, and feedback controller 720 are selectively enabled at different operating conditions for optimal performance. For example, the feedback controller can be enabled during a steady state operating mode when there is no ammonia slip and the aftertreatment system is still not meeting the desired tailpipe emissions. In contrast, the ammonia storage compensation controller can be enabled during transient operating mode at catalyst bed temperatures between 200° C. and 350° C., and disabled at catalyst bed temperatures above 400° C. Generally, the feed-forward controller computes the urea dosing rate based on the stoichiometry of the NO and $NO_2$ reduction reactions taking place on the SCR catalyst surface.

In one specific implementation, the feedforward controller 710 runs continuously and adjusts the urea dosing rate based on exhaust NO and $NO_2$ emissions rate estimates, a desired $NO_x$ reduction efficiently, a desired ammonia slip, an SCR catalyst bed temperature, an SCR catalyst space velocity, an SCR catalyst $NO_x$ reduction capability, an SCR catalyst degradation, an AMOX catalyst bed temperature, an AMOX catalyst space velocity, an AMOX catalyst ammonia slip reduction capacity, an AMOX catalyst degradation, and the urea solution properties.

In one specific implementation, the feedback controller 720 compensates for errors in SCR catalyst inlet $NO_x$ concentration estimates, errors in exhaust mass flow rate estimates, discrepancies between commanded and actual urea injection rates, deterioration of SCR catalytic activity due to aging, deterioration of AMOX catalytic activity due to aging, and errors in urea solution concentration measurements.

In one specific implementation, the ammonia storage compensation controller 715 adjust the amount of urea dosing rate to actively manipulate the amount of ammonia stored in the SCR catalyst to take advantage of the $NO_x$ reduction potential of stored ammonia. The ability to reduce $NO_x$ using stored ammonia is especially valuable at low diesel exhaust gas temperatures when the injection of urea is impractical and during fast transients when the urea dosing system response may not be adequate.

Exemplary Method for Reducing $NO_x$ Emissions

Figure 17B:
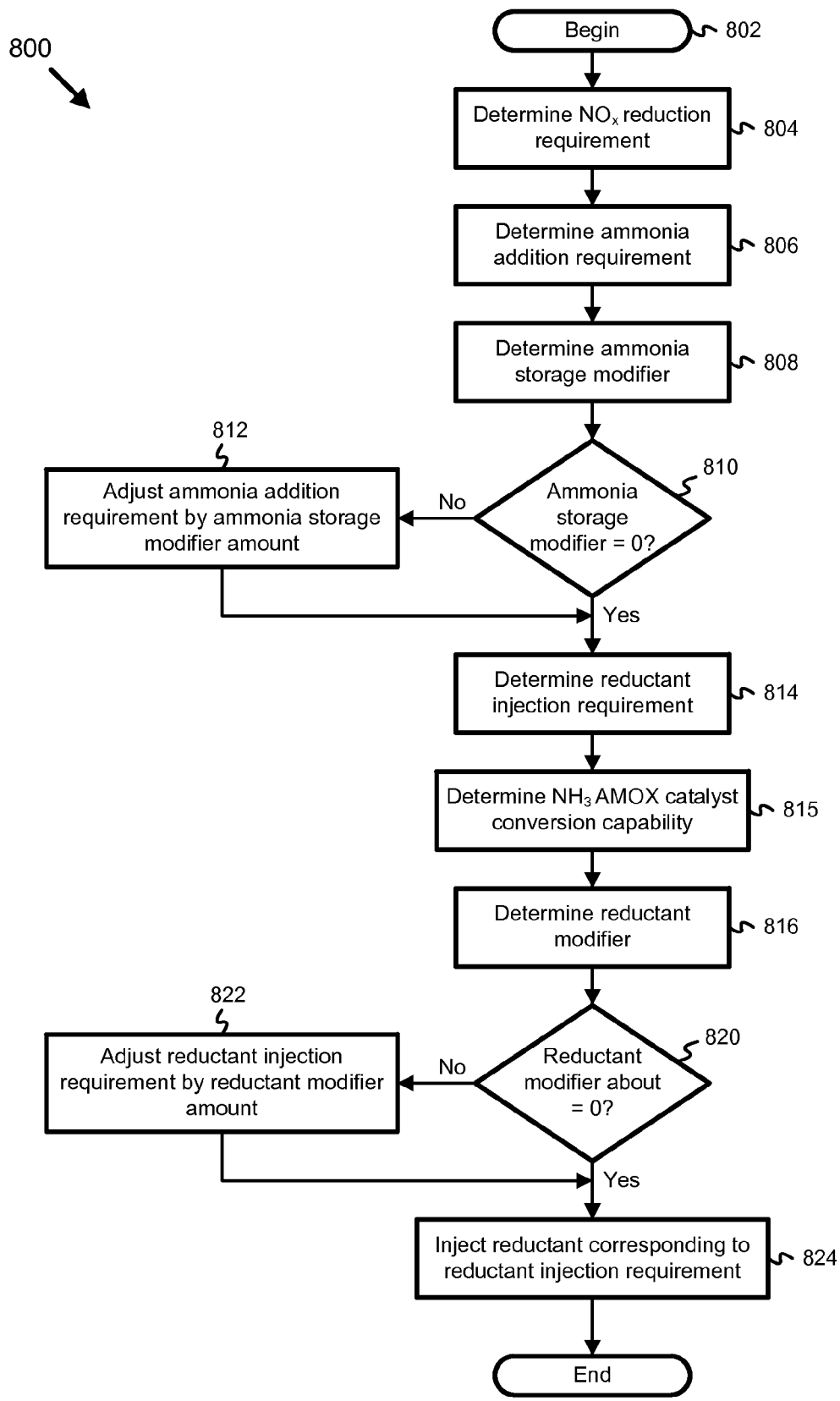
FIG. 17B is a method of reducing $NO_x$ emissions using ammonia storage on an SCR catalyst.

Referring to FIG. 17, and according to one representative embodiment, a method 800 for reducing $NO_x$ emissions using ammonia storage on an SCR catalyst is shown. The method 800 starts at 802 and includes determining 804 a $NO_x$ reduction requirement. In some implementations, determining 804 a $NO_x$ reduction requirement includes operating the $NO_x$ reduction target module 300 to estimate the $NO_x$ reduction requirement 304. The method 800 also includes determining 806 an ammonia addition requirement. In some implementations, determining 806 an ammonia addition requirement includes operating the ammonia target module 310 to estimate the ammonia addition requirement 326. The method 800 further includes determining 808 an ammonia storage modifier. In some implementations, determining 808 an ammonia storage modifier includes operating the $NH_3$ storage module 350 to estimate the ammonia storage modifier 352.

After an ammonia storage modifier is determined, the method 800 includes comparing 810 the ammonia storage modifier to a predetermined value, such as zero. If the ammonia storage modifier is greater than or less than the predetermined value, then the method 800 includes adjusting 812, such as by adding, the ammonia addition requirement determined at 808 by an amount corresponding to the ammonia storage modifier amount. If the ammonia storage modifier is approximately equal to the predetermined value, then the ammonia addition requirement determined at 808 is not adjusted. The method 800 includes determining 814 a reductant injection requirement 814 based on either the ammonia addition requirement determined at 808 or the adjusted addition requirement determined at 812. In some implementations, determining 814 a reductant injection requirement includes operating the reductant target module 330 to calculate the reduction injection requirement 332. The method 800 can also include determining 815 an AMOX catalyst $NH_3$ conversion capability 382 by operation of the AMOX $NH_3$ conversion module 380.

The method 800 further includes determining 816 a reductant modifier. In some implementations, determining 816 a reductant modifier includes operating the reductant modifier module 390 to calculate the reductant modifier requirement 342. After a reductant modifier is determined, the method 800 includes comparing 820 the reductant modifier to a predetermined value, such as zero. If the reductant modifier is greater than or less than the predetermined value, then the method 800 includes adjusting 822 the reductant injection requirement determined at 816 by an amount corresponding to the reductant modifier amount. If the reductant modifier is approximately equal to the predetermined value, then the reductant injection requirement determined at 808 is not adjusted. The method includes injecting 824 an amount of reductant corresponding to the reductant injection requirement determined at either 816 or 822 into the exhaust gas stream.

Reference Tracking Mode

As discussed above, the controller 130 is configured to control the $NO_x$ reduction on the SCR catalyst 152 using a reference tracking mode. Generally, the reference tracking mode is designed to allow the exhaust aftertreatment system 100 to manipulate the properties of engine exhaust at least partially through the engine's control system to provide exhaust properties conducive to efficient $NO_x$ reduction on the SCR catalyst 152. In other words, instead of the exhaust aftertreatment system adjusting itself in a reactionary manner to the exhaust properties exiting the engine to reduce $NO_x$ as in the optimum $NO_x$ conversion mode, in the reference tracking mode, the exhaust aftertreatment commands the engine to recalibrate itself to generate desired exhaust properties that result in a reduction or elimination of exhaust aftertreatment system adjustments necessary to convert $NO_x$. In this manner, $NO_x$ reduction efficiency is increased, more precise control over the amount of $NO_x$ reduced on the SCR catalyst 15 is achieved, and the occurrence of reducing more $NO_x$ than is necessary is reduced or eliminated.

Referring to FIG. 3, the controller 130 includes an exhaust aftertreatment system module 910, a powertrain module 920, and a combustion module 930. The controller 130 receives inputs 102 from various sensors of the engine system 10 and generates commands to engine controls 167. Generally, the commands are communicated to various components of the engine system 10 and the components actuate according to the commands such that desired operating parameters are achieved. As will be described in more detail below, the commands are based at least partially on desired engine system outputs and exhaust conditions determined by an exhaust conditions optimization module 1120 of the powertrain module 920.

Figure 18:
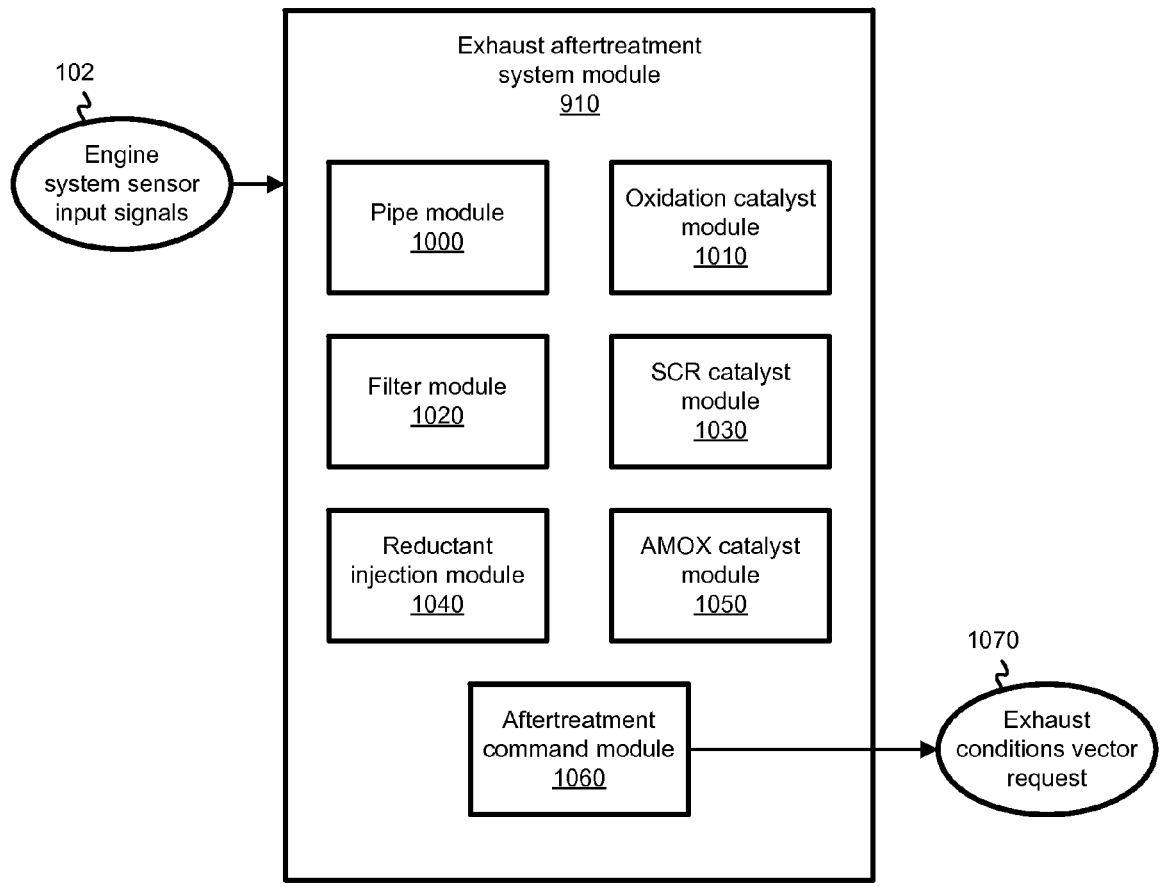
FIG. 18 is a schematic block diagram of an exhaust aftertreatment system module of the controller of FIG. 3 according to one representative embodiment.

Referring to FIG. 18, the exhaust aftertreatment system module 910 includes a pipe module 1000, an oxidation catalyst module 1010, a filter module 1020, an SCR catalyst module 1030, a reductant injection module 1040, and an AMOX catalyst module 1050. Each module receives input signals 102 from various sensors of the engine system 10 and interprets the signals to determine various operating conditions of the respective aftertreatment components. Based on the operating conditions, the modules 1010, 1020, 1030, 1040, 1050 control the respective components of the exhaust aftertreatment system 100.

The pipe module 1000 determines the properties of the exhaust gas stream flowing into, out of, and through the pipe 160 by receiving inputs from any of various sensors positioned upstream, downstream, or along the pipe. In certain implementations, the pipe module 1000 is configured to determine the temperature of exhaust entering the pipe 160, the temperature of exhaust exiting the pipe, and the temperature of the wall of the pipe. In some implementations, the pipe module 1000 is configured to generate an exhaust conditions request based on the determined properties of the exhaust gas flowing through the pipe 160.

The oxidation catalyst module 1010 reports a condition of the oxidation catalyst 140 to the aftertreatment command module 1060 and generates an exhaust condition request representing exhaust conditions that would result in a desired oxidation efficiency of the catalyst.

The filter module 1020 controls the timing, duration, and intensity of regeneration events on the PM filter 142 in a manner similar to that described in the incorporated particulate filter applications. In certain instances, the regeneration events on the PM filter 142 are controlled according to the exhaust conditions of the exhaust gas stream. Therefore, the filter module 1020 is configured to generate an exhaust condition request representing exhaust conditions that would result in a desired particulate matter filtration efficiency and desired regeneration event characteristics.

The SCR catalyst module 1030 and reductant injection module 1040 operate cooperatively to control the reduction of $NO_x$ in the exhaust gas stream in a manner similar to that described in the incorporated U.S. patent applications. In certain instances, the SCR catalyst module 430 determines the amount of reductant necessary to achieve a desired $NO_x$ reduction efficiency and $NO_x$ emissions at the tailpipe based at least partially on the exhaust conditions of the exhaust gas stream. Based at least partially on the amount of reductant determined by the SCR catalyst module 1030, the reductant injection module 1040 controls the injection of reductant into the exhaust gas stream. The SCR catalyst module 1030 is configured to generate an exhaust condition request representing desired exhaust conditions that would result in a desired and/or optimum SCR system efficiency and performance. The exhaust condition request generated by the SCR catalyst module 1030 may include the desired exhaust conditions exiting an upstream exhaust aftertreatment component, such as a DOC and/or DPF. In certain implementations, the $NO_x$ conversion efficiency of the SCR system 150 may be highest when the exhaust temperature entering the SCR catalyst 152 is about 350° C. and the $NO_2/NO_x$ ratio of the exhaust entering the SCR catalyst is about 0.5. Accordingly, in this implementation, the SCR catalyst module 1030 would request these exhaust conditions in an attempt to achieve the highest $NO_x$ conversion efficiency. As will be described in more detail below, the request may be granted or modified by the exhaust conditions optimization module 1120 depending on various trade-offs based on the feasibility of the request at least partially in view of the current operating conditions of the engine.

The AMOX catalyst module 1050 reports a condition of the AMOX catalyst 160 to the aftertreatment command module 1060 and generates an exhaust condition request representing exhaust conditions that would result in a desired ammonia reduction efficiency of the catalyst.

Desirably, each system component module 1000, 1010, 1020, 1030, 1050 determines an exhaust condition request based on the desired or optimum performance of the corresponding component irrespective of the requests from other modules. For example, the SCR catalyst module 1030 generates a request for exhaust conditions associated with optimum performance of the SCR system 150 regardless of exhaust property requests generated by other system component modules. In some embodiments, the requested exhaust conditions are determined based on characteristic performance curves or tables for each of the exhaust aftertreatment components. The characteristic performance curve or table for each component can be obtained experimentally and stored in the controller 130 (e.g., in the corresponding component module of the controller).

Based on the exhaust properties determined by the pipe module 1000 and exhaust condition requests received from the modules 1000, 1010, 1020, 1030, 1050, the aftertreatment command module 1060 generates an exhaust conditions vector request 1070. The exhaust conditions vector request 1070 represents the exhaust conditions estimated to facilitate a desired overall efficiency and performance of the aftertreatment system 100. In more specific implementations, the exhaust conditions vector request 1070 represents exhaust aftertreatment system exhaust conditions conducive to meeting or exceeding exhaust emissions standards. Generally, the aftertreatment command module 1060 generates the exhaust conditions vector request 1070 by weighing, e.g., averaging, exhaust condition requests from the modules 1000, 1010, 1020, 1030, 1050. The exhaust condition vector request 1070 generated by the exhaust aftertreatment system 1000 is communicated to the powertrain module 920. As the performance, e.g., efficiency, of the components of the exhaust aftertreatment system 100 are a function of the exhaust conditions, controlling the exhaust conditions based at least partially on the exhaust conditions requested by the exhaust aftertreatment system components as represented by the exhaust conditions vector request 1070 promotes the performance of the exhaust aftertreatment system.

Figure 19:
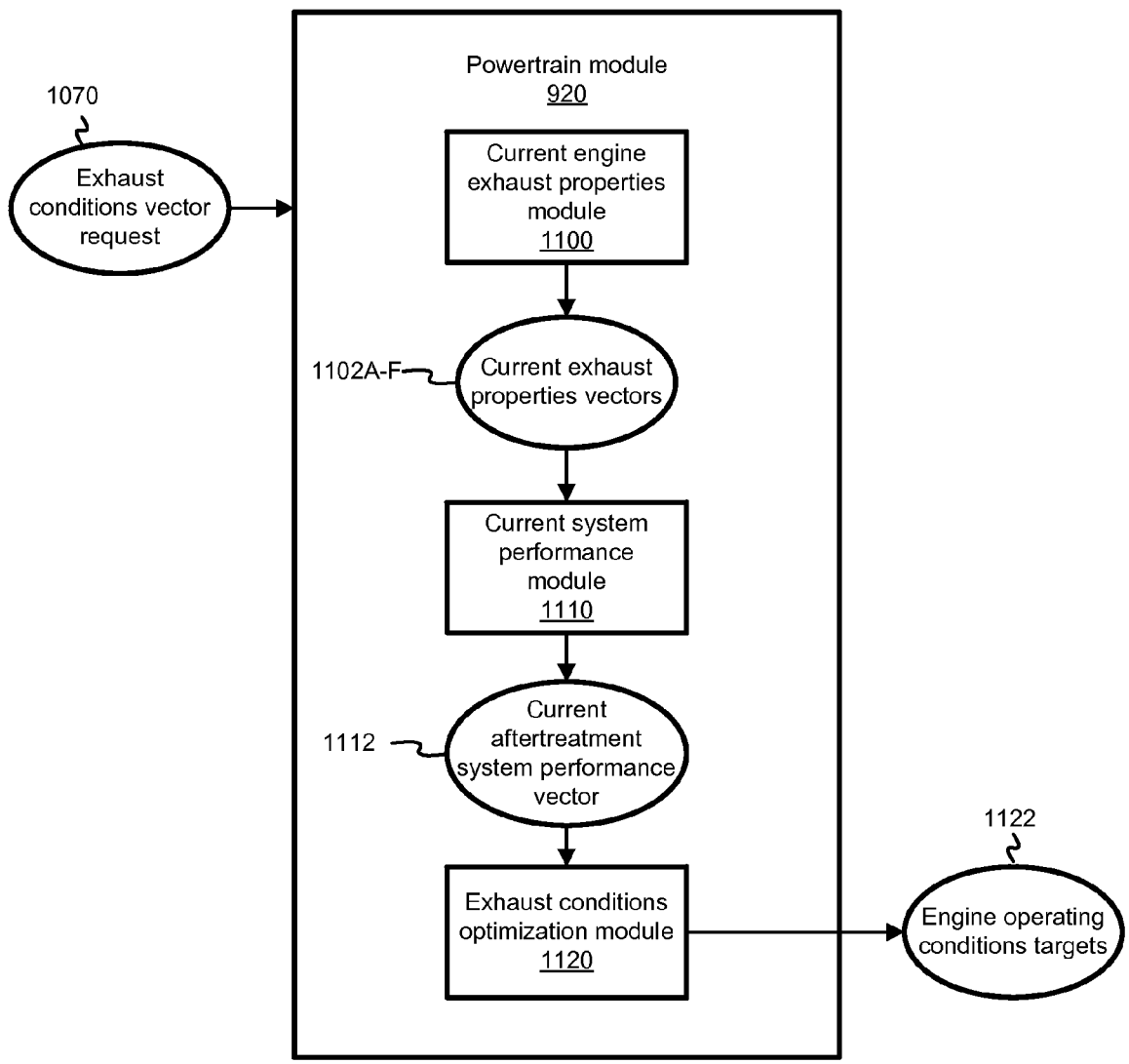
FIG. 19 is a schematic block diagram of a powertrain module of the controller of FIG. 3 according to one representative embodiment.

Referring to FIG. 19, the current engine exhaust properties module 1100 of the powertrain module 920 is configured to estimate the current conditions of the exhaust flowing into and through the exhaust aftertreatment system 100. More specifically, the engine exhaust properties module 1100 estimates the present state of the engine exhaust at various stages of the aftertreatment system 100. The present state of the engine exhaust at each stage can be represented as one of a plurality of current exhaust properties vectors or arrays 1102 each including various estimated properties of the exhaust at a respective stage. The various estimated properties of the exhaust can include data concerning specific exhaust properties parameters, such as, for example, exhaust temperature, exhaust mass flow rate, exhaust pressure, and combustion byproduct or mass fractions if various gas species (e.g., NO, $O_2$, UHC, $NO_2$, particulate matter, $SO_2$, $H_2O$, $CO_2$, CO, $H_2$, etc.). The engine exhaust properties module 1100 can estimate the various current exhaust properties at each stage via physical sensors, such as described above, from virtual sensors using modeling techniques commonly known in the art, or both.

In operation, the current engine exhaust properties module 1100 first determines the exhaust properties vector 1102 of the exhaust at a first stage, i.e., the engine exhaust properties vector 1102A. The first stage includes the exhaust exiting the engine 11 and entering the pipe 160 of the exhaust aftertreatment system 100. At a second stage, e.g., after the pipe 160 but before the oxidation catalyst 140, the engine exhaust properties vector 1102A is updated with the exhaust conditions at the second stage by the current engine exhaust properties module 1100 to create a pipe exhaust properties vector 1102B. At a third stage, e.g., after the oxidation catalyst 140 but before the PM filter 142, the pipe exhaust properties vector 1102B is updated with the exhaust conditions at the third stage by the current engine exhaust properties module 1100 to create an oxidation catalyst exhaust properties vector 1102C. At a fourth stage, e.g., after the PM filter 142 but before the SCR catalyst 152, the oxidation catalyst exhaust properties vector 1102C is updated with the exhaust conditions at the fourth stage by the current engine exhaust properties module 1100 to create a filter exhaust properties vector 1102D. At a fifth stage, e.g., after the SCR catalyst 152 but before the AMOX catalyst 160, the filter catalyst exhaust properties vector 1102D is updated with the exhaust conditions at the fifth stage by the current engine exhaust properties module 1100 to create an SCR exhaust properties vector 1102E. At a sixth stage, e.g., after the AMOX catalyst 160, the SCR catalyst exhaust properties vector 1102E is updated with the exhaust conditions at the sixth stage by the current engine exhaust properties module 1100 to create a tailpipe exhaust properties vector 1102F. Accordingly, in this manner, the engine exhaust properties vector 1102 is continually updated as the exhaust travels from the engine 11 to the tailpipe.

In certain embodiments, the exhaust properties vectors 1102A-1102F at the various stages along the exhaust aftertreatment system are determined using physical sensors and/or virtual sensors. Physical sensors, such as temperature, pressure, oxygen, ammonia, mass flow, and $NO_x$ sensors, can be strategically placed throughout the exhaust aftertreatment system to directly measure at least some of the exhaust properties of one or more of the vectors. Other exhaust properties, such as $NO_2$, can be determined using virtual sensors based on controls models of component and system performance. The virtual sensors can be embedded in the controller 130 to run in real time.

The current system performance module 1110 determines a current aftertreatment system performance vector 1112 based at least partially on the current exhaust properties vectors 1102A-102F (e.g., input from the pipe module 1000, oxidation catalyst module 1010, filter module 1020, SCR catalyst module 1030, reductant injection module 1040, and AMOX catalyst module 1050). The current aftertreatment system performance vector 1112 represents the maximum operating efficiency or capability of each of the components of the aftertreatment system.

The exhaust conditions optimization module 1120 generates engine operating conditions targets 1122. The engine operating conditions targets 1122 represent the engine operating conditions necessary to achieve desired system outputs, e.g., engine output exhaust properties, and desired system inputs, e.g., exhaust aftertreatment system component inlet and outlet exhaust properties. The engine operating conditions targets 1122 are a function of the current exhaust properties (as expressed in the current exhaust properties vectors 1102A-F), the current aftertreatment system performance capability (as expressed in the current aftertreatment performance vector 1112), the exhaust conditions requested by the exhaust aftertreatment system 100 (as expressed in the exhaust conditions vector request 1070), and an objective factor controlling the optimization of the exhaust properties. The objective factor can be any of various factors or combination of factors. For example, in the illustrated embodiments, the objective factor is cost (e.g., cost of fuel and/or urea), performance (e.g., drivability and/or emissions), or combination of both. Generally, the exhaust conditions vector request 1070 represents exhaust aftertreatment system exhaust conditions conducive to meeting or exceeding exhaust emissions standards.

In one specific embodiment, the exhaust conditions optimization module 1120 generates the engine operating conditions targets 1122 by utilizing a control algorithm that compares the current exhaust gas properties with the requested exhaust conditions modified according to the objective factor to determine the desired aftertreatment system performance. The algorithm then compares the desired aftertreatment system performance with the aftertreatment system capability, which can be predetermined and embedded in the controller 130 or determined in real time by the current aftertreatment system performance module 1110 of the controller. If the aftertreatment system is capable of achieving the desired aftertreatment system performance, then the controller 130 commands, e.g., recalibrates, the engine system according to the targets 1122. But if the aftertreatment system is not capable of achieving the desired aftertreatment system performance, then the objective factor is adjusted to modify the desired aftertreatment system performance to fall within the constraints of the system capability.

Figure 20:
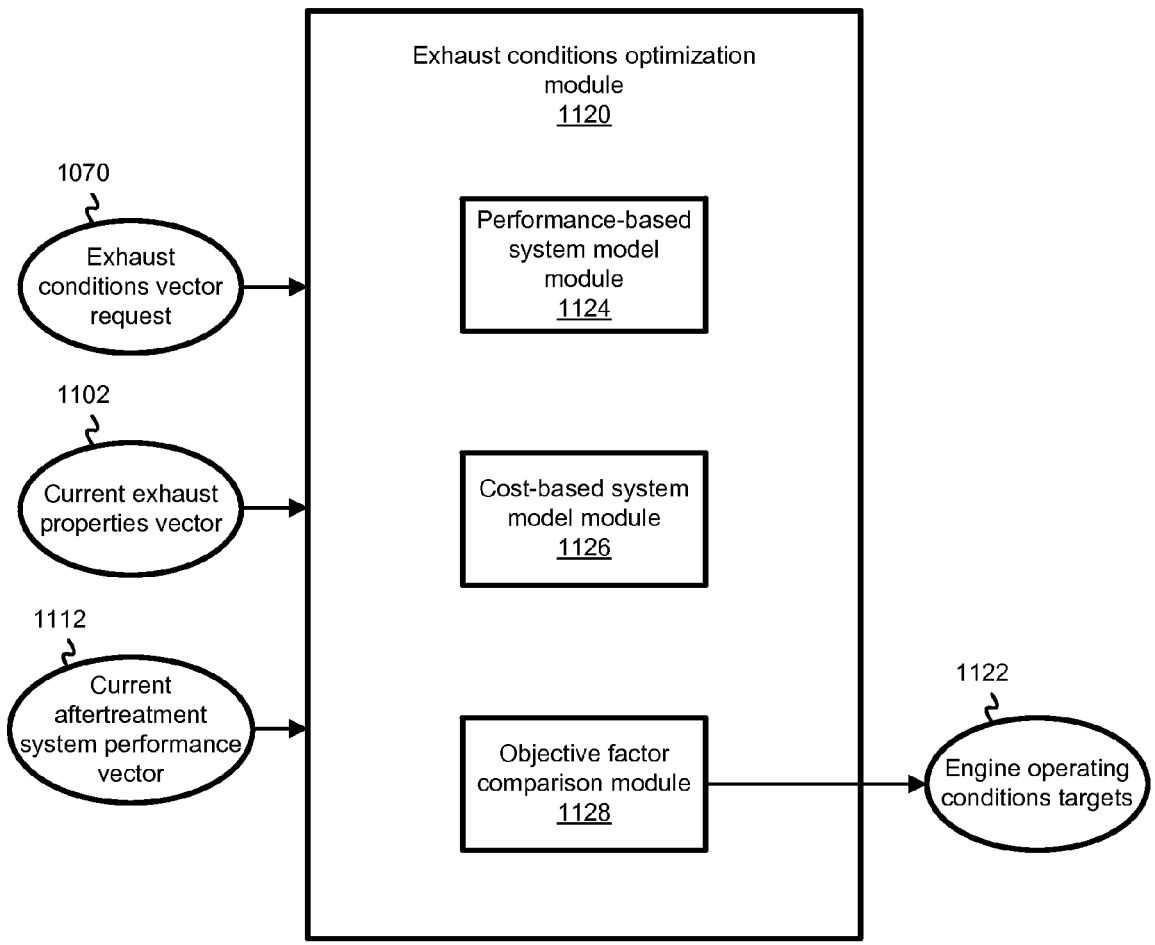
FIG. 20 is an exhaust conditions optimization module of the powertrain module of FIG. 19 according to one representative embodiment.
Figure 21:
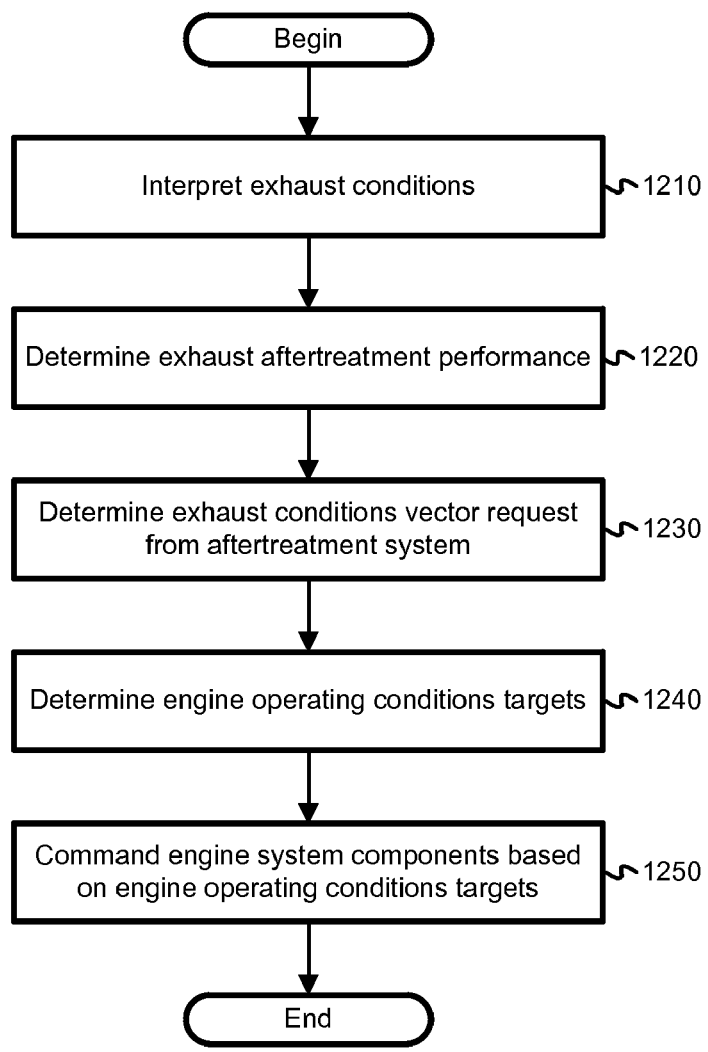
FIG. 21 is a schematic flow chart diagram of a method for controlling the operating conditions of the engine system of FIG. 1 according to one representative embodiment.

Referring to FIG. 20, the exhaust conditions optimization module 1120 includes a performance-based system model module 1124, a cost-based system model module 1126, and an objective factor comparison module 1128. The performance-based system model module 1124 is configured to model the engine system 10 as a function of the performance of the engine system. For example, the performance-based system model module 1124 can determine the engine system operating conditions necessary to achieve a maximum performance of the engine system 10, e.g., maximum power or torque of the engine and maximum emissions reduction efficiency of the exhaust aftertreatment system 100, while meeting or exceeding emissions standards. The cost-based system model module 1126 is configured to model the engine system 10 as a function of the cost to operate the engine system. For example, the cost-based system model module 1126 can determine the engine system operating conditions necessary to operate the engine system 10 at a minimum cost, e.g., minimum fuel consumption by the engine 11, minimum exhaust fuel injection for regeneration events on the PM filter 142, and minimum reductant for reducing $NO_x$ on the SCR catalyst 152, while meeting or exceeding emissions standards. As used herein, the term "maximum" can also mean "improved" and the term "minimum" can also mean "reduced." In other words, the terms "maximum" and "minimum" do not necessarily mean the extreme upper and lower ends of parameter value ranges.

The performance-based system model module 1124 and cost-based system model module 11266 each model the engine system 10 to estimate the outputs and inputs of the system 10 based on various engine operating conditions. The outputs of the engine 11 of the engine system 10 include, among other outputs, the exhaust properties, fuel consumption, and power of the engine. The outputs of the exhaust aftertreatment system 100 include, among other outputs, the SCR catalyst bed temperature, the tailpipe $NO_x$, the AMOX catalyst conversion capability, the particulate filter loading, the reductant consumption, and the fuel consumption associated with regeneration events. The above outputs are merely exemplary of any of various desired performance parameters known in the art.

Generally, the operating conditions determined by the modules 1124, 1126 include the properties required to operate the engine 11 and the properties of the exhaust generated by the engine. The properties required to operate the engine 11 are directly related to the performance of the engine and the cost of operating the engine. The properties of the exhaust are directly related to the performance of the exhaust aftertreatment system 100 and the cost of operating the exhaust aftertreatment system. Because the operation of the engine 11 directly affects the properties of the exhaust, the operating conditions for operating the engine 11 are controlled not only for achieving desired outputs in view of the operating cost and/or performance of the engine, but for achieving desired exhaust conditions in view of the operating cost and/or performance of the exhaust aftertreatment system 100 as well.

The objective factor comparison module 1128 is configured to determine the relative importance of cost versus performance in the operation of the engine system 10. Moreover, the objective factor comparison module 1128 determines the engine operating conditions targets 1122 based on the results of the comparative importance of cost versus performance. For example, if the comparison module 1128 determines that cost is the only consideration, then the engine operating conditions targets 1122 are calculated by the exhaust conditions module 1120 to represent the operating conditions determined by the cost-based system model module 1126. In contrast, if the comparison module 1128 determines that performance is the only consideration, then the engine operating conditions targets 1122 represent the operating conditions determined by the performance-based system model module 11124.

Alternatively, the comparison module 1128 may determine that both cost and performance are important. In such instances, the importance of each of cost and performance are weighted according to their respective level of importance. The engine operating conditions targets 1122 would be a weighted average of the operating conditions determined by the cost-based system model module 1126 and the performance-based system model module 1124. In one specific example, the cost of operating the engine system may be 25% of the total importance and the performance of the engine may be 75% of the total importance. Therefore, the performance-based operating conditions would have more effect on the operating conditions targets 1122 than the cost-based operating conditions, e.g., by a ratio of 3-to-1.

In certain implementations, the relative importance of cost versus performance is determined manually. For example, an operator of the engine system 10 can manually choose to operate the engine system for maximum performance or minimum cost, such as by switching an on-board switch or engaging another type of user interface. In some implementations, the relative importance of cost versus performance can be determined automatically via application of a simple regression model algorithm based on various operating parameters, such as current or future driving conditions, fuel cost, reductant cost, engine type, driving loads, emissions standards, ambient environment conditions in which an engine will be operated, customer preferences for a vehicle or vehicle fleet, etc. Alternatively, an appropriate trade-off between cost and performance for an engine family could be determined before an engine of the engine family is in operation based on predicted duty cycles of the engine family and/or customer input.

Referring back to FIG. 3, the combustion module 930 generates the engine controls commands for commanding the engine controls 167 based on the engine operating conditions targets 1122. As described above, the commands are communicated to various components of the engine system 10 and the components actuate in response to the commands to produce the engine operating conditions targets 1122. The commands can be any of various commands corresponding to any of various components. For example, the commands can include an air intake handling command, a fuel injection command, an EGR system command, a turbine bypass valve command, and a compressor bypass valve command. The air intake handling command instructs the intake manifold to regulate the amount of air entering the cylinders 113 according to a commanded air intake flow rate. The fuel injection command instructs the fuel injector mechanisms to achieve desired fuel-related operating conditions, such as fuel injection rate, main injection timing, rail pressure, pilot fueling, pilot timing, post fueling, and post timing. The EGR system command instructs the EGR valve 132 to regulate the amount of EGR gas entering the cylinders 113 according to a commanded EGR gas flow rate. The turbine bypass valve command instructs the bypass valve 119 to regulate the amount of exhaust flowing through the turbine according to a commanded turbine exhaust flow rate. The compressor bypass valve command instructs the bypass valve 152 to regulate the amount of air and EGR gas flowing through the compressor according to a commanded compressor exhaust flow rate. In other implementations, the commands 304 can include any of various other commands for controlling any of various other engine system components affecting the engine output and exhaust properties.

Figure 7:
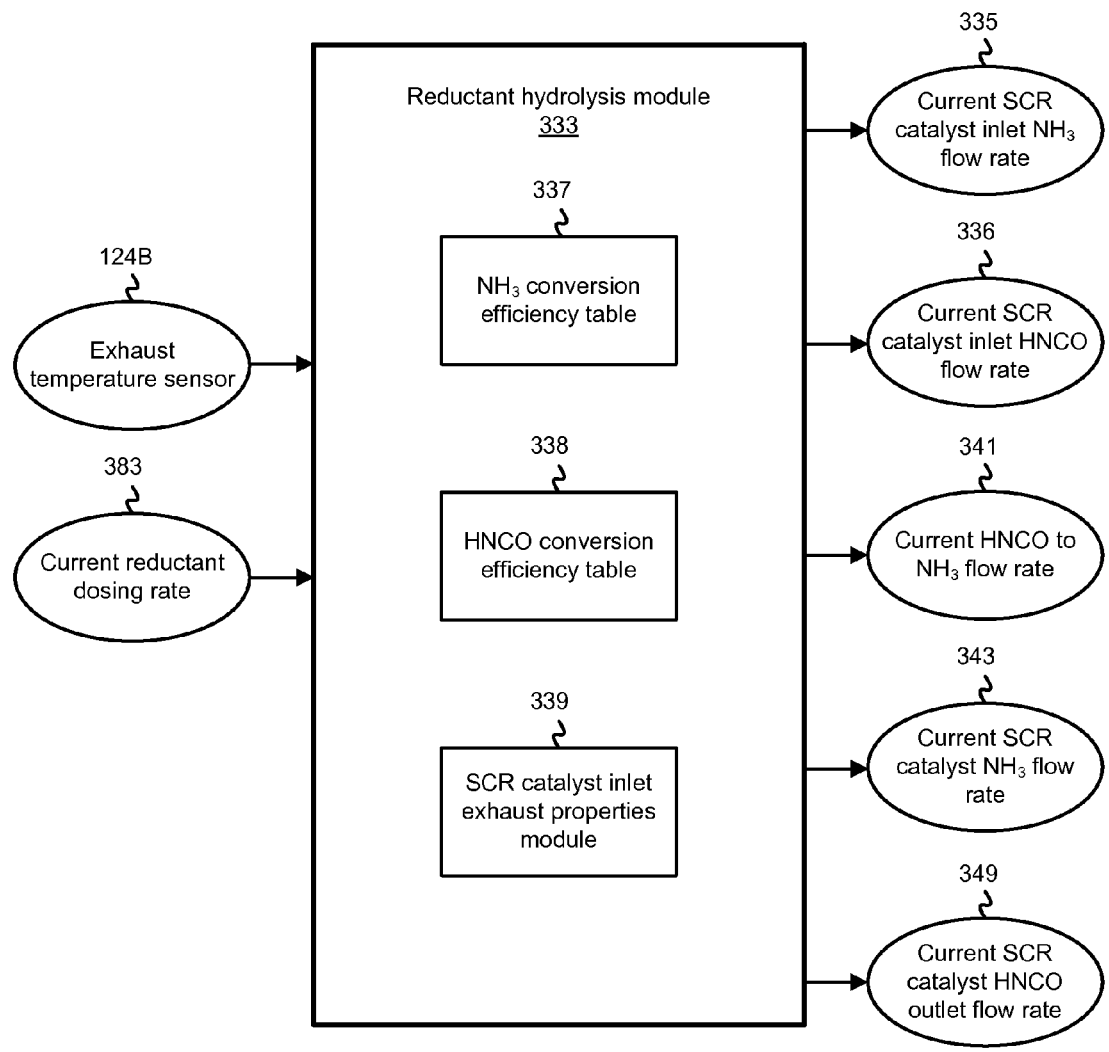
FIG. 7 is a schematic block diagram of a reductant hydrolysis module of the reductant target module of FIG. 6 according to one representative embodiment.

Referring to FIG. 7, a method 1200 for controlling the operating properties of an engine system having an exhaust aftertreatment system can include interpreting 1210 the current conditions of exhaust generated by the engine 11. The method 1200 includes determining 1220 the current performance of the aftertreatment system 100. Additionally, the method 1200 includes determining 1230 an exhaust conditions vector request from the aftertreatment system 100 that would result in tailpipe exhaust conditions in compliance with emissions regulations. Based at least partially on the exhaust conditions vector request, the method 1200 determines 1240 engine operating conditions targets. Additionally, the method 1200 commands 1250 various components of the engine system 10 based on the engine operating conditions targets.

Figure 22:
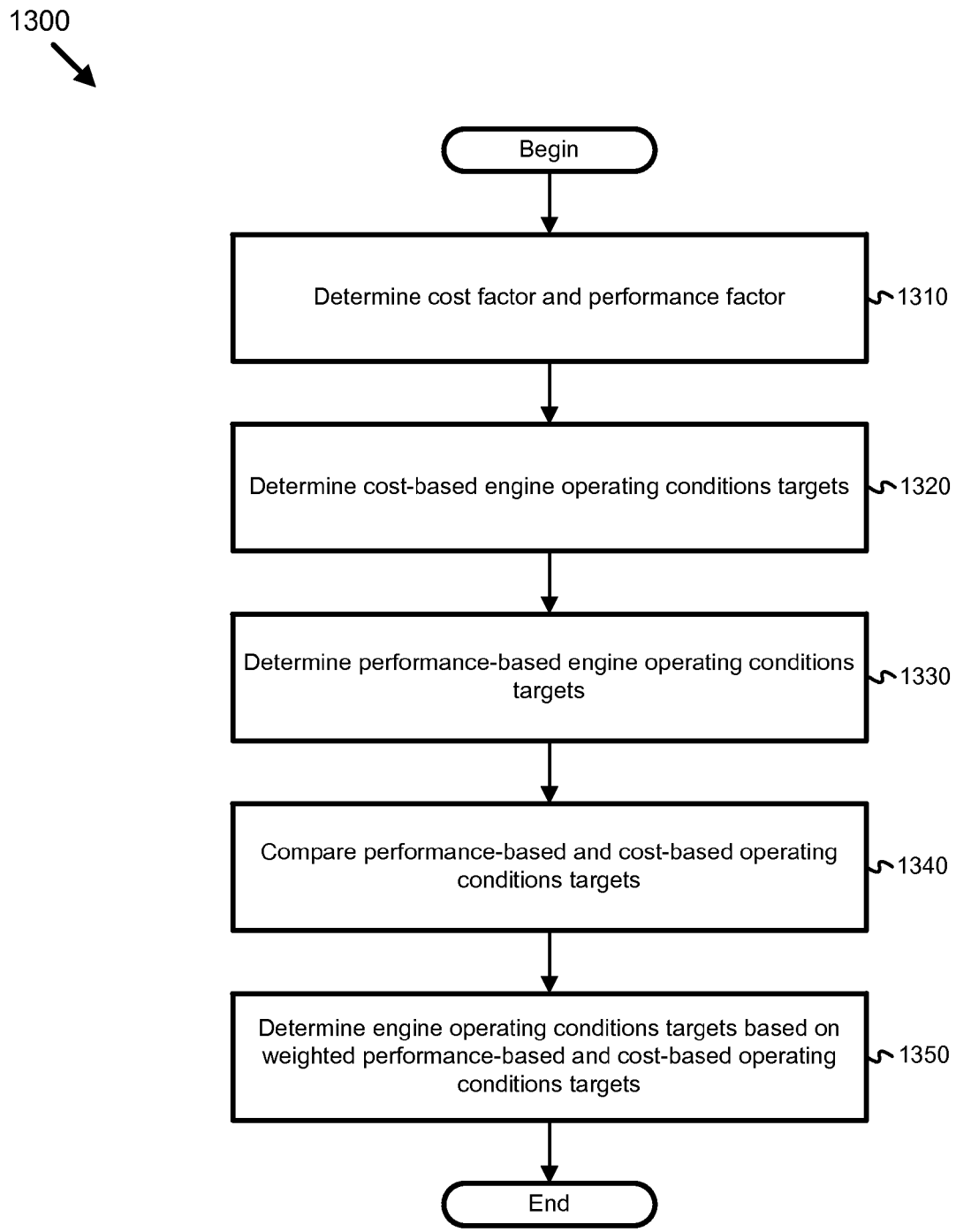
FIG. 22 is a schematic flow chart diagram of a method for determining engine operating conditions targets based at least partially on the relative importance of the cost of operating the engine system of FIG. 1 and the performance of the engine system of FIG. 1.

According to one specific embodiment shown in FIG. 22, a method 1300 for determining the engine operating conditions targets includes determining 1310 a cost factor and a performance factor. The cost and performance factors can represent the relative importance of controlling the cost of operating the engine system 10 and the performance of the engine system. The method 1300 continues with determining 1320 cost-based engine operating conditions targets and determining 1330 performance-based engine operating conditions targets. The cost-based engine operating conditions targets represent the operating conditions of the engine system that result in the lowest engine system operating costs while meeting or exceeding regulated exhaust emissions standards. Similarly, the performance-based engine operating conditions targets represent the operating conditions of the engine system that result in the highest engine system performance while meeting or exceeding regulated exhaust emissions standards.

The method 1300 continues by weighing 1340 the performance-based engine operating conditions targets against the cost-based engine operating conditions targets according to a comparison between the cost and performance factors. In some embodiments, the weighting between performance-based and cost-based targets can be represented by a performance-to-cost ratio, or any other comparative indicator. In one embodiment, the performance-to-cost ratio can be 0.5. In other embodiments, the performance-to-cost ratio can be more or less than 0.5. Generally, the performance-to-cost ratio can be determined based on any of various factors as discussed above using any of various techniques, such as a simple estimate or a complex algorithm. In one particular implementation, the performance-based and cost-based engine operating conditions targets are weighted by comparing the amount of fuel and/or urea remaining in the respective on-board tanks with the current market price of fuel and urea, as well as the need for the engine to produce a high power output for a particular application. In another particular implementation, the relative importance between performance-based and cost-based targets can be determined using the trade-off relationship between fuel economy and power represented by the following equation:

$$G(bsfc, bmep) = a_1(bsfc - bsfc_{opt}) - a_2(bmep - bmep_{opt})^2 \qquad (1)$$

where G is the objective factor function, bsfc is the brake specific fuel consumption, which is a measure of engine fuel economy, $bsfc_{opt}$ is the optimum brake specific fuel consumption, bmep is the brake mean effective pressure, which is a measure of engine power, $bmep_{opt}$ is the optimum brake mean effective pressure, and $a_1$ and $a_2$ are weighting coefficients. The weighting coefficients $a_1$ and $a_2$ represent relative importance of operating the engine system in the cost-based operating mode and performance-based operating mode, respectively.

The method 1300 further includes determining 1350 engine operating conditions targets based on the weighted performance-based and cost-based operating conditions targets that meets or exceeds the regulated exhaust emissions standards.

Converting $NO_x$ in the reference tracking mode is preferred during steady-state driving conditions of the engine 11 (e.g., freeway driving) because the aftertreatment system controller modules are able to more responsively and accurately control the calibration changes on the engine. If the duty cycle of the engine is frequently changing, such as during transient driving conditions (e.g., city driving), the exhaust output of the engine is also frequently changing. Accordingly, during transient operating conditions, it may be difficult for the aftertreatment system control modules to accurately and efficiently control the calibration of the engine due to the transient nature of the output of the engine.

Figure 23:
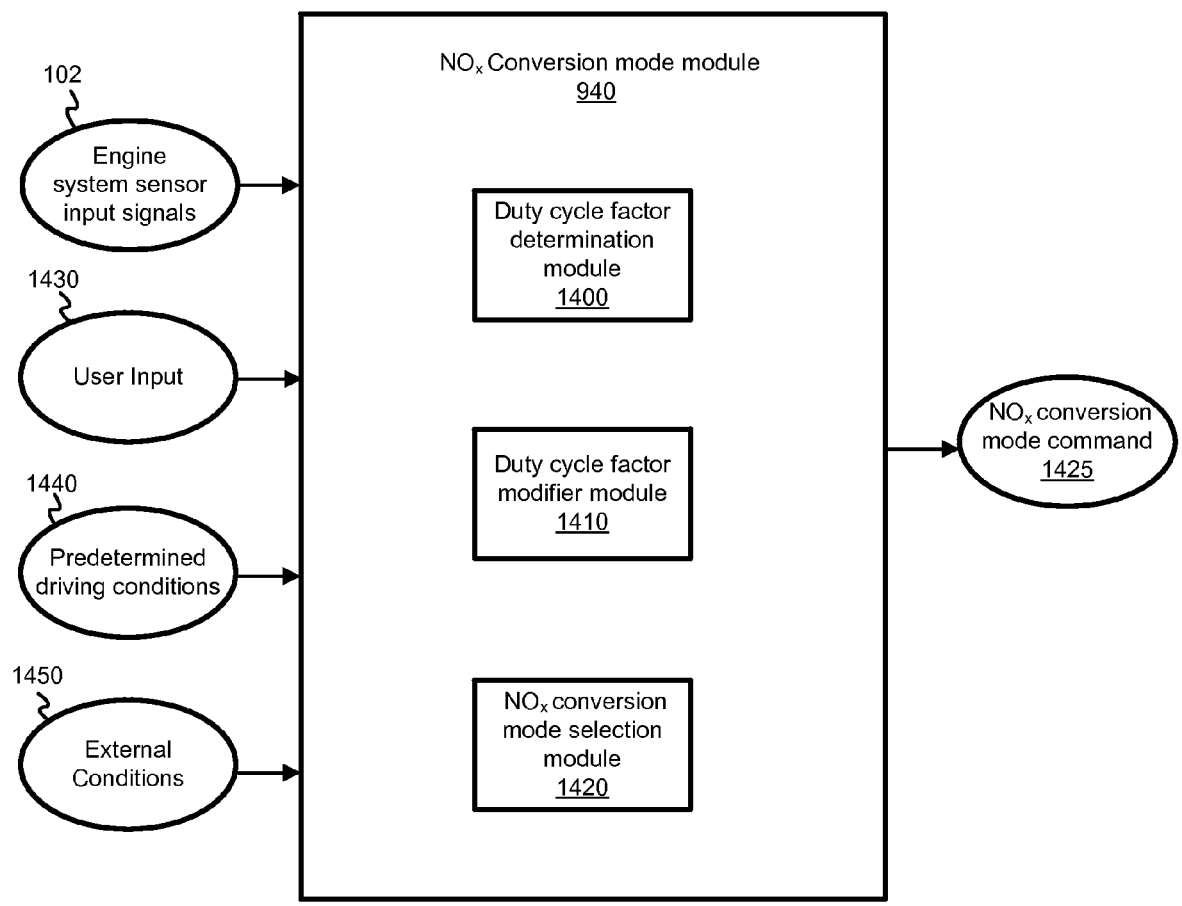
FIG. 23 is a schematic block diagram of a $NO_x$ conversion mode module of the controller of FIG. 3 according to one representative embodiment.

Referring to FIG. 23, the controller 130 also includes a $NO_x$ conversion mode module 940 configured to determine the proper mode for converting $NO_x$ based at least partially on the driving conditions of the engine. The $NO_x$ conversion mode module 940 includes a duty cycle factor determination module 1400, a duty cycle factor modifier module 1410, and a $NO_x$ conversion mode selection module 1420. Based on output from the duty cycle factor determination module 1400 and duty cycle factor modifier module 1410, the $NO_x$ conversion mode selection module 1420 generates a $NO_x$ conversion mode command 1425. The $NO_x$ conversion mode command 1425 includes instructions for the controller 130 to control the conversion of $NO_x$ by the SCR system 150 according to one of the maximum $NO_x$ conversion mode or reference tracking $NO_x$ conversion mode.

The duty cycle factor determination module 1400 is configured to determine a duty cycle factor based on one or more inputs. The duty cycle factor can be any of various representations of the type of driving undergone by the engine. For example, in one embodiment, the duty cycle factor can be a number within a range between and including a number representing only highway driving conditions and a number representing only city driving conditions. The definition of what driving conditions constitute city driving conditions and highway driving conditions can be customized as desired by one of ordinary skill in the art in view of this disclosure. In one specific implementation, the number representing only highway driving conditions can be one, the number representing only city driving conditions can be ten, and the duty cycle factor can be any number between and including one and ten based on the predicted type of driving conditions in which the engine will be operated. For example, if the duty cycle factor determination module 1400 predicts the engine will be operated only during highway operating conditions, the module will assign a value of one to the duty cycle factor. Alternatively, if the duty cycle factor determination module 1400 predicts the engine will be operated only during city operating conditions, the module will assign a value of ten to the duty cycle factor.

If, however, the duty cycle factor determination module 1400 predicts the engine will be operated during both highway and city operating conditions, the module will assign a value between one and ten to the duty cycle factor based on a predicted relative time at which the engine will be operated at highway and city driving conditions, respectively. For example, if the engine will be operated at highway and city driving for equal amounts of time, then the duty cycle factor determination module 1400 will assign a value of five to the duty cycle factor. Similarly, if the engine will be operated at both highway and city driving conditions, the duty cycle factor determination module 1400 would assign a value between one and five to the duty cycle factor if the engine will be operating more during highway driving conditions than city driving conditions, or a value between five and ten to the duty cycle factor if the engine will be operating more during city driving conditions than highway driving conditions. Other representations of the duty cycle factor can be used, such as a percentage of the time an engine will be operated during one of the city and highway driving conditions.

The operating conditions categorized as city driving conditions and the operating conditions categorized as highway driving conditions can be predetermined as desired. The predetermined or predefined operating conditions associated with city and highway driving as selected by an engine manufacturer, distributer, or end user can be chosen based on any number of factors, including cost considerations, performance considerations, the applications for which a vehicle will be used, ambient environment conditions, etc. In some implementations, the operating conditions associated with city and highway driving conditions can be predefined according to a selected combination of engine speed and fueling and/or a selected combination of exhaust mass flow rate and exhaust gas temperature. Additionally, the operating conditions associated with city and highway driving conditions need not be constant during operation of an engine, and may be adjusted based on past, present, and/or predicted future operating characteristics, such as monitored driving patterns.

The duty cycle factor determination module 1400 predicts the driving conditions during which the engine will be operated based on one or more inputs. In the illustrated embodiment, the inputs include the engine system sensor input signals 102, user input 1430, and predetermined driving conditions 1440.

The duty cycle factor determination module 1400 can interpret and compare current and past engine system sensor input signals 102 to determine historical driving condition trends. Based on the driving condition trends, the duty cycle factor determination module 1400 can predict probable future driving conditions and determine a driving condition trend duty cycle factor.

The duty cycle factor determination module 1400 can also determine a user input duty cycle factor based on the user input 1430. The user input 1430 can include user inputted information such as known or future driving condition changes. For example, a driver of a vehicle may input the type of driving that will be undergone for a particular period of time. Additionally, a driver may input a change from one driving condition to another driving condition based on an expected or unexpected deviation from a current change or path. The user input 1430 may also include uploaded driving conditions for an upcoming route.

Also, the duty cycle factor determination module 1400 can determine a predetermined duty cycle factor based on predetermined driving conditions 1440. The predetermined driving conditions 1440 can be based on the type of vehicle and uploaded to the controller 130 prior to initial use of the engine. For example, the predetermined driving conditions 1440 can be set to highway driving conditions if the vehicle in which the engine is housed will be used primarily for highway driving, such as a semi-trailer truck. Alternatively, the predetermined driving conditions 1440 can be set to city driving conditions if the vehicle in which the engine is housed will be used primarily for city driving, such as a parcel delivery truck.

In certain embodiments, the duty cycle factor determination module 1400 determines the duty cycle factor by combining, e.g., averaging, the driving condition trend, user input, and predetermined duty cycle factors. In other embodiments, the duty cycle factor determination module 1400 determines the duty cycle factor based on a hierarchal system. More specifically, the duty cycle factor determination module 1400 can be configured to assign as the duty cycle factor for the engine 11 according to the relative importance of historical trends, user input, and predetermined driving conditions. In one embodiment, a historical trend duty cycle factor outweighs a predetermined driving conditions duty cycle factor, and a user input duty cycle factor outweighs a historical trends duty cycle factor. Accordingly, if a historical trend, predetermined driving conditions, and user input duty cycle factors are determined, the duty cycle factor determination module 1400 assigns the user input duty cycle factor as the duty cycle factor for the engine 11. The specific hierarchy between the duty cycle factors can be arranged and rearranged as desired.

Referring again to FIG. 23, the duty cycle factor modifier module 1410 receives the determined duty cycle factor for the engine 11 and modifies it according to external conditions 1450 as necessary. In certain implementations, the external conditions 1450 include the current market value of fuel, reductant, or other consumable materials. The external conditions 1450 may affect the selection of $NO_x$ conversion mode because such conditions may positively or negatively affect the cost, performance, or efficiency of the $NO_x$ conversion events by the SCR system 150. For example, because operating under the maximum $NO_x$ conversion mode may result in more reductant consumption than operating under the reference tracking mode, rising costs of reductant may decrease the desirability of $NO_x$ conversion in the maximum $NO_x$ conversion mode. Conversely, if the cost of reductant decreases, the desirability of operating in the maximum $NO_x$ conversion mode may be more desirable. Additionally, more fuel for increasing the exhaust temperature entering the SCR system 150 may be required when operating in the maximum $NO_x$ conversion mode. Therefore, the cost of fuel may affect the mode used to convert $NO_x$. The affect of these and other external conditions on the selection of which $NO_x$ conversion mode to implement can be determined by one of skill in the art in view of this disclosure. Based on the impact the external conditions 1450 may have on the $NO_x$ conversion modes, the duty cycle factor modifier 1410 modifies, e.g., increases or decreases, or does not modify the duty cycle factor determined by the duty cycle factor determination module 1400 to determine a final duty cycle factor.

Based on the final duty cycle factor determined by the duty cycle factor modifier module 1410, the $NO_x$ conversion mode selection module 1420 generates the $NO_x$ conversion mode command 1425. In one embodiment, the $NO_x$ conversion module 940 generates a maximum $NO_x$ conversion mode command 1425 if the final duty cycle factor indicates the engine will be operated predominantly under city driving conditions more than highway driving conditions. For example, in the duty cycle factor scale between one and ten discussed above, the $NO_x$ conversion mode selection module 1420 may generate a maximum $NO_x$ conversion mode command 1425 if the factor is greater than about five. Similarly, in this embodiment, the $NO_x$ conversion mode selection module 1420 generates a reference tracking $NO_x$ conversion mode command 1425 if the final duty cycle factor indicates the engine will be operated predominantly under highway driving conditions more than city driving conditions. For example, in the duty cycle factor scale between one and ten discussed above, the $NO_x$ conversion mode selection module 1420 may generate a maximum $NO_x$ conversion mode command 1425 if the factor is less than about five. Alternatively, in another embodiment, the $NO_x$ conversion mode selection module 1420 is configured to generate a maximum $NO_x$ conversion mode command 1425 even if the engine will be operated predominantly under highway driving conditions because operating in the reference tracking $NO_x$ conversion mode during city driving may be less effective than operating in the maximum $NO_x$ conversion mode during highway driving. For example, in the duty cycle factor scale between one and ten discussed above, the $NO_x$ conversion mode selection module 1420 may generate a maximum $NO_x$ conversion mode command 1425 if the factor is between about two and ten (e.g., between about 20% and 100% city driving conditions) in one embodiment, about three and ten in another embodiment, and about four and ten in yet another embodiment.

Figure 24:
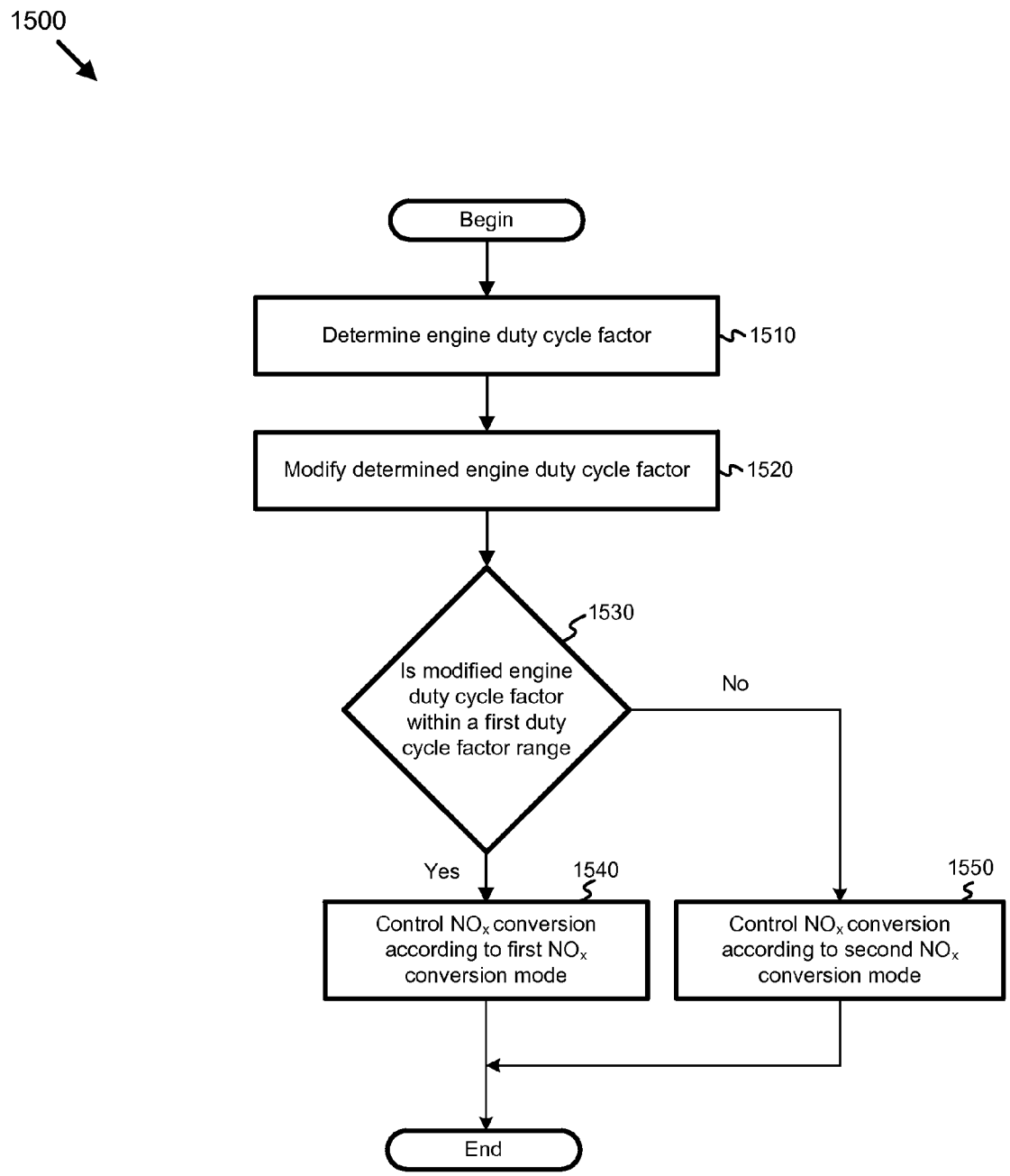
FIG. 24 is a schematic flow chart diagram of one embodiment of a method for controlling $NO_x$ conversion in an SCR system according to one of two $NO_x$ conversion modes.

Referring to FIG. 24, a method 1500 for selecting and controlling a $NO_x$ conversion mode for converting $NO_x$ in an SCR system according to one embodiment is shown. The method 1500 begins by determining an engine duty cycle factor at 1510 and modifying the determined engine duty cycle factor at 1520. In one implementation, determining an engine duty cycle factor 1510 is performed by the duty cycle factor determination module 1400 and modifying the determined engine duty cycle factor 1520 is performed by the duty cycle factor modifier module 1410. The method 1500 then determines whether the modified or final engine duty cycle factor is within a first duty cycle factor range at 1530. The first duty cycle factor range can be any of various desired ranges on any of various corresponding scales as discussed above. If the modified engine duty cycle factor is within the first duty cycle factor range, the method 1500 proceeds to control $NO_x$ conversion in the SCR system according to a first $NO_x$ conversion mode (e.g., a maximum $NO_x$ conversion mode or reference tracking $NO_x$ conversion mode) at 1540. If, however, the modified engine duty cycle factor is not within the first duty cycle factor range, the method 1500 proceeds to control $NO_x$ conversion in the SCR system according to a second $NO_x$ conversion mode (e.g., the other of the maximum or reference tracking $NO_x$ conversion modes) at 1550. The method 1500 then ends.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set or may be distributed over different locations including over different storage devices. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring F c period of unspecified duration between enumerated steps of the depicted method. Additionally, the order in which a particular method occurs may or may not strictly adhere to the order of the corresponding steps shown.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for controlling $NO_x$ conversion in a selective catalytic reduction (SCR) system of an exhaust aftertreatment system coupled to an internal combustion engine, comprising:
   a duty cycle factor module configured to determine a duty cycle factor of the internal combustion engine, the duty cycle factor representing predicted driving conditions of a vehicle in which the internal combustion engine is housed; and
   a $NO_x$ conversion mode selection module configured to command $NO_x$ conversion in the SCR system according to a first $NO_x$ conversion mode if the duty cycle factor is within a duty cycle factor range and according to a second $NO_x$ conversion mode if the duty cycle factor is not within the duty cycle factor range, wherein operation in each of the first and second $NO_x$ conversion modes comprises generating a reductant injection command;
   wherein according to the first $NO_x$ conversion mode, the reductant injection command is generated based on a first model, and according to the second $NO_x$ conversion mode, the reductant injection command is generated based on a second model different than the first model.

2. The apparatus of claim 1, wherein the first $NO_x$ conversion mode comprises a maximum $NO_x$ conversion mode and the second $NO_x$ conversion mode comprises a reference tracking $NO_x$ conversion mode.

3. The apparatus of claim 2, wherein the predicted driving conditions comprise one of city driving conditions, highway driving conditions, and a combination of city and highway driving conditions.

4. The apparatus of claim 3, wherein the duty cycle factor range comprises duty cycle factors representing predominantly city driving conditions.

5. The apparatus of claim 3, wherein the duty cycle factor range comprises duty cycle factors representing combination city and highway driving conditions.

6. The apparatus of claim 2, wherein:
   the maximum $NO_x$ conversion mode comprises recalibrating the aftertreatment system in response to engine exhaust properties generated by the internal combustion engine; and
   the reference tracking $NO_x$ conversion mode comprises recalibrating the internal combustion engine in response to requests from the exhaust aftertreatment system.

7. The apparatus of claim 2, wherein the maximum $NO_x$ conversion mode comprises determining a reductant dosing command based at least partially on outputs from $NH_3$ storage compensation controls, nominal feedforward controls, and feedback controls.

8. The apparatus of claim 7, wherein the output from the $NH_3$ storage compensation controls is based at least partially on outputs from a urea hydrolysis model and an ammonia storage model.

9. The apparatus of claim 7, wherein the output from the nominal feedforward controls is based at least partially on outputs from a commanded $NO_x$ reduction target model, an SCR bed temperature model, and an SCR catalyst degradation model.

10. The apparatus of claim 9, wherein the output from the commanded $NO_x$ reduction target model is based at least partially on outputs from an SCR maximum efficiency model and a desired $NO_x$ reduction efficiency model.

11. The apparatus of claim 9, wherein the output from the SCR maximum efficiency model is based at least partially on an output from an ammonia oxidation catalyst (AMOX) capability model, the output from the ammonia oxidation catalyst capability model being based at least partially on an AMOX catalyst bed temperature model and an AMOX catalyst degradation model.

12. The apparatus of claim 7, wherein the output from the feedback controls is based at least partially on an output from a $NO_x$ signal correction model, the output from the $NO_x$ signal correction model being based at least partially on an AMOX capability model.

13. The apparatus of claim 2, wherein the maximum $NO_x$ conversion mode comprises determining a reductant dosing command based at least partially on outputs from an SCR catalyst degradation module, an AMOX catalyst degradation module, and a urea doser degradation module, the SCR catalyst, AMOX catalyst, and urea doser degradation modules being decentralized and independent modules.

14. The apparatus of claim 2, wherein converting $NO_x$ according to the maximum $NO_x$ conversion mode comprises reducing a maximum possible amount of $NO_x$ from an exhaust gas stream, and wherein converting $NO_x$ according to the reference tracking $NO_x$ conversion mode comprises reducing a selectively variable amount of $NO_x$ from an exhaust gas stream less than the maximum possible amount of $NO_x$.

15. The apparatus of claim 2, wherein reference tracking $NO_x$ conversion mode comprises at least one of regulating an engine air intake flow rate, a fuel injection event, an exhaust gas recirculation flow rate, a turbine exhaust flow rate, and compressor exhaust flow rate to achieve a desired engine output exhaust temperature.

16. The apparatus of claim 1, wherein the duty cycle factor module determines the duty cycle factor based at least partially on at least one of driving condition historical trends, user input, predetermined driving conditions, and current market values of fuel and reductant.

17. A method for controlling $NO_x$ conversion in a selective catalytic reduction (SCR) system of an exhaust aftertreatment system coupled to an internal combustion engine, comprising:

determining a duty cycle factor based at least partially on whether the engine will be operating under highway driving conditions, city driving conditions, or a combination of highway and city driving conditions;

comparing the duty cycle factor to a predetermined duty cycle factor range corresponding to highway driving conditions;

controlling $NO_x$ conversion in the SCR system according to a reference tracking $NO_x$ conversion mode if the duty cycle falls within the predetermined duty cycle factor range, wherein controlling $NO_x$ conversion in the SCR system according to the reference tracking $NO_x$ conversion mode comprises generating a reductant injection command based on a first model; and controlling $NO_x$ conversion in the SCR system according to an optimal $NO_x$ conversion mode if the duty cycle does not fall within the predetermined duty cycle factor range, wherein controlling $NO_x$ conversion in the SCR system according to the optimal $NO_x$ conversion mode comprises generating a reductant injection command based on a second model different than the first model.

18. The method of claim 17, wherein the predetermined duty cycle factor range represents a range between approximately 80% and 100% highway driving conditions.

19. An engine system having an internal combustion engine generating an exhaust gas stream, comprising:

a selective catalytic reduction (SCR) catalyst that reduces $NO_x$ emissions in the exhaust gas stream by converting $NO_x$ in the exhaust gas stream to other compounds in the presence of a reductant;

a reductant injector that injects reductant into the exhaust gas stream upstream of the SCR catalyst according to a reductant injection command;

a controller comprising:

a duty cycle factor module configured to determine a duty cycle factor of the internal combustion engine, the duty cycle factor representing predicted driving conditions of a vehicle in which the internal combustion engine is housed; and a $NO_x$ conversion mode selection module configured to command $NO_x$ conversion in the SCR system according to a first $NO_x$ conversion mode if the duty cycle factor is within a duty cycle factor range and according to a second $NO_x$ conversion mode if the duty cycle factor is not within the duty cycle factor range;

wherein according to the first $NO_x$ conversion mode, the reductant injection command is generated based on a first model, and according to the second NOx conversion mode, the reductant injection command is generated based on a second model different than the first model.

20. The engine system of claim 19, further comprising an ammonia sensor embedded within the SCR catalyst, the ammonia sensor configured to detect an amount of ammonia stored on the SCR catalyst.

* * * * *